United States Patent
Jiang et al.

(10) Patent No.: US 12,476,900 B2
(45) Date of Patent: Nov. 18, 2025

(54) COMMUNICATION METHOD AND SYSTEM APPLIED TO METRO TRANSPORT NETWORK MTN OR SLICING PACKET NETWORK SPN

(71) Applicant: Huawei Technologies Co., Ltd., Shenzhen (CN)

(72) Inventors: Yuanlong Jiang, Shenzhen (CN); Yongjian Hu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 346 days.

(21) Appl. No.: 18/317,650

(22) Filed: May 15, 2023

(65) Prior Publication Data
US 2023/0283541 A1    Sep. 7, 2023

Related U.S. Application Data

(63) Continuation of application No. PCT/CN2021/123670, filed on Oct. 14, 2021.

(30) Foreign Application Priority Data

Nov. 16, 2020 (CN) .......................... 202011282559.X

(51) Int. Cl.
*H04L 45/00* (2022.01)
*H04L 41/0654* (2022.01)

(52) U.S. Cl.
CPC .......... *H04L 45/22* (2013.01); *H04L 41/0654* (2013.01)

(58) Field of Classification Search
CPC ............ H04N 21/4622; H04N 21/2402; H04L 67/568; H04L 65/80; H04L 45/50; H04J 14/0205; G02B 6/12033
See application file for complete search history.

(56) References Cited

U.S. PATENT DOCUMENTS 10,750,260 B1 * 8/2020 Gareau ............... H04Q 11/0071
10,797,816 B1 * 10/2020 Gorshe ............... H04L 43/0847
(Continued)

FOREIGN PATENT DOCUMENTS

CN         111211957 A     5/2020
EP          3618350 A1     3/2020
(Continued)

OTHER PUBLICATIONS

Wang D et al, "OSPF for routing information exchange across metro/core optical networks", Optical Networks Magazine, Sep. 1, 2002, total 10 pages, XP001161643.
(Continued)

*Primary Examiner* — Mahran Y Abu Roumi
(74) *Attorney, Agent, or Firm* — Slater Matsil, LLP

(57) ABSTRACT

Embodiments of this application disclose a communication method and system applied to an MTN or an SPN. An MTN communication system includes a third communication apparatus connected to the first communication apparatus and the second communication apparatus by using a first MTN path and a second MTN path respectively. If the second MTN path is available, the third communication apparatus transmits data stream corresponding to a first client by using the second MTN path. If the second MTN path is unavailable, the third communication apparatus transmits the data stream corresponding to the first client by using the first MTN path, to ensure normal transmission of the data stream. In addition, the third communication apparatus may further implement load sharing.

20 Claims, 15 Drawing Sheets

(56) References Cited

U.S. PATENT DOCUMENTS

| | | | |
|---|---|---|---|
| 2008/0192820 A1* | 8/2008 | Brooks | G06F 11/34 |
| | | | 348/E7.071 |
| 2012/0151042 A1* | 6/2012 | Garg | H04N 21/4622 |
| | | | 709/224 |
| 2017/0366255 A1* | 12/2017 | Sharma | H04B 10/032 |
| 2018/0013511 A1* | 1/2018 | Hussain | H04J 14/0205 |
| 2019/0280797 A1* | 9/2019 | Zha | H04Q 11/0062 |
| 2021/0058496 A1* | 2/2021 | Mok | H04L 69/22 |
| 2021/0076111 A1* | 3/2021 | Shew | H04L 45/66 |
| 2021/0273826 A1* | 9/2021 | Ye | H04L 12/437 |
| 2023/0254389 A1* | 8/2023 | Gorshe | H04L 69/324 |
| | | | 370/474 |
| 2023/0412493 A1* | 12/2023 | Wen | H04L 47/28 |

FOREIGN PATENT DOCUMENTS

| | | | |
|---|---|---|---|
| JP | 2014131130 A | | 7/2014 |
| JP | 2016086316 A | | 5/2016 |

OTHER PUBLICATIONS

IEEE Std 802.3™-2018, IEEE Standard for Ethernet, LAN/MAN Standards Committee of the, IEEE Computer Society, Approved Jun. 14, 2018, total 5600 pages.

"Flex Ethernet Implementation Agreement 2.1", IA OIF FLEXE-02.1, Jul. 2019, total 56 pages.

"Flex Ethernet Implementation Agreement 2.0", IA OIF-FLEXE-02.0, Jun. 2018, total 51 pages.

ITU-T G.8023, "Characteristics of equipment functional blocks supporting Ethernet physical layer and Flex Ethernet interfaces", Jun. 2018, total 56 pages.

ITU-T G.8312, "Interfaces for metro transport networks", Dec. 2020, total 30 pages.

P.Calhoun et al., "Diameter Base Protocol", Network Working Group Request for Comments: 3588, Sep. 2003, total 147 pages.

* cited by examiner

| Bit | Field |
|---|---|
| 65 | Data6 |
| 64 | Data6 |
| 63 | Data6 |
| 62 | Data6 |
| 61 | Data6 |
| 60 | Data6 |
| 59 | Data6 |
| 58 | Data6 |
| 57 | Data5 |
| 56 | Data5 |
| 55 | Data5 |
| 54 | Data5 |
| 53 | Data5 |
| 52 | Data5 |
| 51 | Data5 |
| 50 | Data5 |
| 49 | Data4 |
| 48 | Data4 |
| 47 | Data4 |
| 46 | Data4 |
| 45 | Data4 |
| 44 | Data4 |
| 43 | Data4 |
| 42 | Data4 |
| 41 | 0x0 |
| 40 | 0x0 |
| 39 | 0x0 |
| 38 | 0x0 |
| 37 | 0xC |
| 36 | 0xC |
| 35 | 0xC |
| 34 | 0xC |
| 33 | Data3 |
| 32 | Data3 |
| 31 | Data3 |
| 30 | Data3 |
| 29 | Data3 |
| 28 | Data3 |
| 27 | Data3 |
| 26 | Data3 |
| 25 | Data2 |
| 24 | Data2 |
| 23 | Data2 |
| 22 | Data2 |
| 21 | Data2 |
| 20 | Data2 |
| 19 | Data2 |
| 18 | Data2 |
| 17 | Data1 |
| 16 | Data1 |
| 15 | Data1 |
| 14 | Data1 |
| 13 | Data1 |
| 12 | Data1 |
| 11 | Data1 |
| 10 | Data1 |
| 9 | 0x4B |
| 8 | 0x4B |
| 7 | 0x4B |
| 6 | 0x4B |
| 5 | 0x4B |
| 4 | 0x4B |
| 3 | 0x4B |
| 2 | 0x4B |
| 1 | 1 |
| 0 | 0 |

COMMUNICATION METHOD AND SYSTEM APPLIED TO METRO TRANSPORT NETWORK MTN OR SLICING PACKET NETWORK SPN

CROSS-REFERENCE TO RELATED APPLICATIONS

This application is a continuation of International Application No. PCT/CN2021/123670, filed on Oct. 14, 2021, which claims priority to Chinese Patent Application No. 202011282559.X, filed on Nov. 16, 2020. The disclosures of the aforementioned applications are hereby incorporated by reference in their entireties.

TECHNICAL FIELD

This application relates to the field of communication technologies, and in particular, to a communication method and system applied to a metro transport network (MTN) or a slicing packet network (SPN).

BACKGROUND

Flexible Ethernet (FlexE) is a technology that supports services of various Ethernet media access control (MAC) rates. The technology binds one or more Ethernet physical (PHY) links to provide flexible channelized subrates. For example, each 100GBASE-R PHY is divided into data bearer channels corresponding to 20 slots, and a bandwidth corresponding to each slot is 5 Gbps. Each 50GBASE-R PHY is divided into data bearer channels corresponding to 10 slots. An Ethernet frame of an original data stream of a flexible Ethernet client (FlexE Client) is divided by using a code block encoded by 64/66 bytes as a unit, and then each code block is scheduled, through a flexible Ethernet shim (FlexE Shim), to several slots of one or more PHYs in a flexible Ethernet group (FlexE Group) for sending.

In a new transport technology, for example, an MTN technology, an Ethernet frame service may be forwarded from one end of a network to another end of the network by using one-hop or multi-hop nodes in a form of a series of 64 B/66 B code blocks, and finally restored to the Ethernet frame service. Each hop node in the network can receive the 64 B/66 B code blocks, and forward the 64 B/66 B code blocks to a next-hop node according to a specific path. However, when the forwarding path is faulty, the service is interrupted, and service transmission is affected. For example, as shown in FIG. 1, a network device PE1 and a network device PE2 are connected by using a working path and a protection path. When the working path works normally, the PE1 and the PE2 transmit a service stream by using the working path. When the working path is faulty, a service is adjusted from the working path to the protection path, and the PE1 and the PE2 transmit the service stream by using the protection path. However, when the PE2 node is faulty or a fault occurs between the PE2 and a CE2, service transmission is interrupted, affecting transmission of the service stream. In addition, in a network architecture shown in FIG. 1, when service traffic between the PE1 and the PE2 is heavy, transmission load of the PE1 is heavy, leading to a loss of the service traffic.

SUMMARY

Embodiments of this application provide a communication method and system applied to a network (for example, an MTN or an SPN). In this way, service interruptions caused by forwarding path faults can be resolved and load sharing can be implemented, improving network reliability.

According to a first aspect, this application provides a multi-homing communication method in a network. The network includes a first communication apparatus, a second communication apparatus, and a third communication apparatus, the third communication apparatus is connected to the first communication apparatus and the second communication apparatus by using a first MTN path and a second MTN path respectively, and the method includes: transmitting a data stream corresponding to a first client by using the second MTN path.

In an example, the method may be performed by the third communication apparatus. In a scenario in which load sharing is implemented, the third communication apparatus transmits a data stream corresponding to a second client by using the first MTN path. In this implementation, the third communication apparatus may separately transmit data streams by using different MTN paths based on different clients, so as to perform load sharing when service traffic is heavy, thereby improving data transmission quality.

Optionally, in a scenario in which the second MTN path is unavailable, the third communication apparatus may further transmit the data stream corresponding to the first client by using the first MTN path. In this implementation, when the second MTN path is unavailable, the third communication apparatus may start a protection path, that is, the first MTN path, to transmit the data stream corresponding to the first client by using the first MTN path, so as to ensure normal transmission of the data stream, and improve reliability of service transmission.

Optionally, before the data stream corresponding to the first client is transmitted by using the first MTN path, it may be determined, based on a first indication sent by the second communication apparatus, that the second MTN path is faulty, where the first indication indicates that the second MTN path is faulty. In this implementation, the second communication apparatus may detect that the second MTN path is faulty, and send the first indication to the first communication apparatus or the third communication apparatus, so that the first communication apparatus or the third communication apparatus may know that the second MTN path is faulty, thereby implementing MTN path switching.

Optionally, the first communication apparatus receives the first indication from the second communication apparatus, so as to determine, based on the first indication, that the second MTN path is faulty.

Optionally, the first indication is carried in a dual-homing coordination DHC message.

Optionally, after receiving the first indication, the first communication apparatus realizes that the second MTN path is faulty. In this case, the first communication apparatus sends a second indication to the third communication apparatus, to indicate the third communication apparatus to switch a transmission path of the data stream corresponding to the first client (client) from the second MTN path to the first MTN path.

Optionally, the second indication is included in an automatic protection switching APS message.

Optionally, the third communication apparatus may directly receive the first indication sent by the second communication apparatus, so as to determine, based on the first indication, that the second MTN path is faulty.

Optionally, the first indication is included in an operation, administration and maintenance OAM message.

Optionally, when the second communication apparatus is faulty, the second MTN path is faulty. In this case, the first communication apparatus may detect that the second communication apparatus is faulty, and send indication information to the third communication apparatus. The indication information indicates the third communication apparatus to switch the second MTN path to the first MTN path, so as to send the data stream by using the first MTN path.

Optionally, the third communication apparatus may also detect that the second MTN path is faulty. In this case, the third communication apparatus may send a third indication to indicate that the second MTN path is faulty.

Optionally, the third communication apparatus may send the third indication to the first communication apparatus. The first communication apparatus determines, based on the third indication, that the second MTN path is faulty.

Optionally, the third indication is included in an automatic protection switching APS message.

Optionally, the third communication apparatus may send the third indication to the second communication apparatus, so that the second communication apparatus may determine, based on the third indication, that the second MTN path is faulty, and then start a third MTN path, thereby avoiding a problem that a service cannot be normally transmitted because the second MTN path is faulty.

Optionally, the third indication is included in an operation, administration and maintenance OAM message.

Optionally, before the data stream corresponding to the first client is transmitted by using the first MTN path, the second communication apparatus sends a first indication to the first communication apparatus or the third communication apparatus, where the first indication indicates that the second MTN path is faulty.

Optionally, the first indication is carried in a dual-homing coordination DHC message or an operation, administration and maintenance OAM message.

Optionally, the network further includes a fourth communication apparatus, and the fourth communication apparatus is connected to the first communication apparatus and the second communication apparatus by using a first path and a second path respectively.

Optionally, when the first communication apparatus and the second communication apparatus are communicatively connected by using the third MTN path, the second path is available, and the second MTN path is unavailable, the data stream corresponding to the first client is transmitted by using the first MTN path, the third MTN path, and the second path. In this implementation, when the second MTN path is unavailable, the third communication apparatus may start the first MTN path, the first communication apparatus may start the third MTN path, and a data stream is transmitted between the first communication apparatus and the fourth communication apparatus by using the first MTN path, the third MTN path, and the second path, to ensure normal transmission of the data stream.

Optionally, when the first communication apparatus and the second communication apparatus are communicatively connected by using the third MTN path, the second MTN path is available, and the second path is unavailable, the data stream corresponding to the first client is transmitted by using the second MTN path, the third MTN path, and the first path. In this implementation, when the second path is unavailable, to ensure transmission of the data stream, the first communication apparatus may start the first path, and the data stream corresponding to the first client may be transmitted between the third communication apparatus and the fourth communication apparatus by using the second MTN path, the third MTN path, and the first path. Starting a path may be setting the path to an active state, which may be used for forwarding a data stream. For example, starting the first path is setting a status of the first path to an active state, for forwarding a data stream.

Optionally, when both the second path and the second MTN path are unavailable, to ensure normal transmission of the data stream, the third communication apparatus switches from the second MTN path to the first MTN path, and the fourth communication apparatus switches from the second path to the first path, so that the data stream corresponding to the first client is transmitted between the third communication apparatus and the fourth communication apparatus by using the first MTN path and the first path.

According to a second aspect, this application provides a multi-homing communication method in a network. The network includes a first communication apparatus, a second communication apparatus, and a third communication apparatus, the third communication apparatus is connected to the first communication apparatus and the second communication apparatus by using a first path and a second path respectively, and the first communication apparatus and the second communication apparatus are connected by using a first MTN path. The method may be performed by the third communication apparatus or the second communication apparatus and include: when the second path is available, transmitting a data stream corresponding to a first client (client) by using the second path; and when the second path is unavailable, transmitting the data stream corresponding to the first client by using the first path and the first MTN path.

Optionally, when the second path is available, the transmitting a data stream corresponding to a first client by using the second path includes: transmitting the data stream corresponding to the first client by using the first MTN path and the second path. In this embodiment, a data stream may be transmitted between the third communication apparatus and the first communication apparatus by using the first MTN path and the second path.

Optionally, when the second path is unavailable, the second communication apparatus may detect that the second path is unavailable, and send indication information to the first communication apparatus, to determine that the second path is faulty, where the indication information indicates that the second path is faulty. After determining that the second path is faulty, the first communication apparatus may start the first path.

Optionally, the indication information is carried in a dual-homing coordination DHC message.

Optionally, the network further includes a fourth communication apparatus, and the fourth communication apparatus is connected to the first communication apparatus and the second communication apparatus by using a second MTN path and a third MTN path respectively.

Optionally, when the second path is unavailable, the transmitting the data stream corresponding to the first client by using the first path and the first MTN path includes: when the third MTN path is available and the second path is unavailable, transmitting the data stream corresponding to the first client by using the third MTN path, the first MTN path, and the first path.

Optionally, when the second path is available, the transmitting a data stream corresponding to a first client (client) by using the second path includes: when the third MTN path is unavailable and the second path is available, transmitting the data stream corresponding to the first client by using the second MTN path, the first MTN path, and the second path.

According to a third aspect, this application provides a communication method in a network. The network includes a first communication apparatus, a second communication apparatus, and a third communication apparatus, the third communication apparatus is connected to the first communication apparatus and the second communication apparatus by using a first MTN path and a second MTN path respectively, and the method includes: when the second MTN working path is unavailable, configuring a status of the first MTN path to an active state. Specifically, the status of the first MTN path is configured from an inactive state to an active state.

Optionally, before the configuring a status of the first MTN path to an active state, the method further includes: determining, based on a first indication sent by the second communication apparatus, that the second MTN path is faulty, where the first indication indicates that the second MTN path is faulty.

Optionally, before the determining that the second MTN path is faulty, the method includes: receiving, by the first communication apparatus, the first indication from the second communication apparatus.

Optionally, the first indication is carried in a dual-homing coordination DHC message.

Optionally, after the receiving the first instruction, the method further includes: sending, by the first communication apparatus, a second indication to the third communication apparatus, to indicate the third communication apparatus to configure the first MTN path to be in an active state.

Optionally, the second indication is included in an automatic protection switching APS message.

Optionally, before the determining that the second MTN path is faulty, the method includes: receiving, by the third communication apparatus, the first indication from the second communication apparatus.

Optionally, the first indication is carried in an operation, administration and maintenance OAM message.

Optionally, before the configuring a status of the first MTN path to an active state, the method further includes: receiving, by the third communication apparatus, indication information sent by the first communication apparatus, where the indication information instructs the third communication apparatus to configure the first MTN path to be in an active state.

Optionally, before a data stream corresponding to a first client is transmitted by using the first MTN path, the method further includes: determining, based on a third indication sent by the third communication apparatus, that the second MTN path is faulty, where the third indication indicates that the second MTN path is faulty.

Optionally, the third indication is sent by the third communication apparatus to the first communication apparatus.

Optionally, the third indication is included in an automatic protection switching APS message.

Optionally, the third indication is sent by the third communication apparatus to the second communication apparatus.

Optionally, the third indication is included in an operation, administration and maintenance OAM message.

Optionally, before the determining that the second MTN path is faulty, the method includes: sending, by the second communication apparatus, a first indication to the first communication apparatus or the third communication apparatus, where the first indication indicates that the second MTN path is faulty.

Optionally, the first indication is carried in a dual-homing coordination DHC message or an operation, administration and maintenance OAM message.

Optionally, the network further includes a fourth communication apparatus, and the fourth communication apparatus is connected to the first communication apparatus and the second communication apparatus by using a first path and a second path respectively.

Optionally, the first communication apparatus and the second communication apparatus are communicatively connected by using a third MTN path, and the method further includes: when the second path is available, configuring the third MTN path to be in an active state.

Optionally, the first communication apparatus and the second communication apparatus are communicatively connected by using a third MTN path, and the method further includes: when the second path is unavailable, configuring the first path to be in an active state.

According to a fourth aspect, this application provides a first communication apparatus applied to a network. The network includes a first communication apparatus, a second communication apparatus, and a third communication apparatus, and the third communication apparatus is connected to the first communication apparatus and the second communication apparatus by using a first path and a second path respectively. Optionally, both the first path and the second path are MTN paths. Optionally, the first communication apparatus and the second communication apparatus are also connected by using an MTN path. The first communication apparatus includes a transceiver unit and a processing unit. The transceiver unit is configured to perform a receiving and sending operation performed by the first communication apparatus in the method according to any one of the first aspect, the second aspect, and the third aspect, and the processing unit is configured to perform another operation other than the receiving and sending operation performed by the first communication apparatus in the method according to any one of the first aspect, the second aspect, and the third aspect.

According to a fifth aspect, this application provides a first communication apparatus applied to a network. The network includes the first communication apparatus, a second communication apparatus, and a third communication apparatus, and the third communication apparatus is connected to the first communication apparatus and the second communication apparatus by using a first path and a second path respectively. Optionally, both the first path and the second path are MTN paths. Optionally, the first communication apparatus and the second communication apparatus are also connected by using an MTN path. The first communication apparatus includes a memory and at least one processor. The memory is configured to store program code. The at least one processor is configured to run instructions in the program code, so that the first communication apparatus performs one or more operations performed by the first communication apparatus in the method according to any one of the first aspect, the second aspect, and the third aspect.

According to a sixth aspect, this application provides a first communication apparatus applied to a network. The network includes the first communication apparatus, a second communication apparatus, and a third communication apparatus, and the third communication apparatus is connected to the first communication apparatus and the second communication apparatus by using a first path and a second path respectively. Optionally, both the first path and the second path are MTN paths. Optionally, the first communication apparatus and the second communication apparatus are also connected by using an MTN path. The first communication apparatus includes a communication interface and a processor. The communication interface is configured to perform a receiving and sending operation performed by the first communication apparatus in the method according to any one of the first aspect, the second aspect, and the third aspect, and the processor is configured to perform another operation other than the receiving and sending operation performed by the first communication apparatus in the method according to any one of the first aspect, the second aspect, and the third aspect. According to a seventh aspect, this application provides a second communication apparatus applied to a network. The network includes a first communication apparatus, the second communication apparatus, and a third communication apparatus, and the third communication apparatus is connected to the first communication apparatus and the second communication apparatus by using a first path and a second path respectively. Optionally, both the first path and the second path are MTN paths. Optionally, the first communication apparatus and the second communication apparatus are also connected by using an MTN path. The second communication apparatus includes a transceiver unit and a processing unit. The transceiver unit is configured to perform a receiving and sending operation performed by the second communication apparatus in the method according to any one of the first aspect, the second aspect, and the third aspect, and the processing unit is configured to perform another operation other than the receiving and sending operation performed by the second communication apparatus in the method according to any one of the first aspect, the second aspect, and the third aspect.

According to an eighth aspect, this application provides a second communication apparatus applied to a network. The network includes a first communication apparatus, the second communication apparatus, and a third communication apparatus, and the third communication apparatus is connected to the first communication apparatus and the second communication apparatus by using a first path and a second path respectively. Optionally, both the first path and the second path are MTN paths. Optionally, the first communication apparatus and the second communication apparatus are also connected by using an MTN path. The second communication apparatus includes a memory and at least one processor. The memory is configured to store program code. The at least one processor is configured to run instructions in the program code, so that the second communication apparatus performs one or more operations performed by the second communication apparatus in the method according to any one of the first aspect, the second aspect, and the third aspect.

According to a ninth aspect, this application provides a second communication apparatus applied to a network. The network includes a first communication apparatus, the second communication apparatus, and a third communication apparatus, and the third communication apparatus is connected to the first communication apparatus and the second communication apparatus by using a first path and a second path respectively. Optionally, both the first path and the second path are MTN paths. Optionally, the first communication apparatus and the second communication apparatus are also connected by using an MTN path. The second communication apparatus includes a plurality of communication interfaces and at least one processor. The plurality of communication interfaces are configured to perform a receiving and sending operation performed by the second communication apparatus in the method according to any one of the first aspect, the second aspect, and the third aspect, and the processor is configured to perform another operation other than the receiving and sending operation performed by the second communication apparatus in the method according to any one of the first aspect, the second aspect, and the third aspect.

According to a tenth aspect, this application provides a third communication apparatus applied to a network. The network includes a first communication apparatus, a second communication apparatus, and the third communication apparatus, and the third communication apparatus is connected to the first communication apparatus and the second communication apparatus by using a first path and a second path respectively. Optionally, both the first path and the second path are MTN paths. Optionally, the first communication apparatus and the second communication apparatus are also connected by using an MTN path. The third communication apparatus includes a transceiver unit and a processing unit. The transceiver unit is configured to perform a receiving and sending operation performed by the third communication apparatus in the method according to any one of the first aspect, the second aspect, and the third aspect, and the processing unit is configured to perform another operation other than the receiving and sending operation performed by the third communication apparatus in the method according to any one of the first aspect, the second aspect, and the third aspect. According to an eleventh aspect, this application provides a third communication apparatus applied to a network. The network includes a first communication apparatus, a second communication apparatus, and the third communication apparatus, and the third communication apparatus is connected to the first communication apparatus and the second communication apparatus by using a first path and a second path respectively. Optionally, both the first path and the second path are MTN paths. Optionally, the first communication apparatus and the second communication apparatus are also connected by using an MTN path. The third communication apparatus includes a memory and at least one processor. The memory is configured to store program code. The at least one processor is configured to run instructions in the program code, so that the third communication apparatus performs one or more operations performed by the third communication apparatus in the method according to any one of the first aspect, the second aspect, and the third aspect.

According to a twelfth aspect, this application provides a third communication apparatus applied to a network. The network includes a first communication apparatus, a second communication apparatus, and the third communication apparatus, and the third communication apparatus is connected to the first communication apparatus and the second communication apparatus by using a first path and a second path respectively. Optionally, both the first path and the second path are MTN paths. Optionally, the first communication apparatus and the second communication apparatus are also connected by using an MTN path. The third communication apparatus includes a plurality of communication interfaces and at least one processor. The plurality of communication interfaces are configured to perform a receiving and sending operation performed by the third communication apparatus in the method according to any one of the first aspect, the second aspect, and the third aspect, and the processor is configured to perform another operation other than the receiving and sending operation performed by the third communication apparatus in the method according to any one of the first aspect, the second aspect, and the third aspect.

According to a thirteenth aspect, this application provides a communication system. The communication system includes the first communication apparatus according to the fourth aspect, the fifth aspect, or the sixth aspect, the second communication apparatus according to the seventh aspect, the eighth aspect, or the ninth aspect, and the third communication apparatus according to the tenth aspect, the eleventh aspect, or the twelfth aspect. The communication system may perform one or more operations in the method according to any of the foregoing aspects.

According to a fourteenth aspect, this application provides a multi-homing system applied to a metro transport network MTN. The system includes at least one processor and a memory, the memory is configured to store instructions or a computer program, and the at least one processor is configured to execute the instructions or the computer program in the memory, so that the system performs one or more operations in the method according to any one of the first aspect, the second aspect, and the third aspect. In this application, the multi-homing system may be a network including several network devices, or may be a single network device. This is not specifically limited herein.

According to a fifteenth aspect, this application provides a computer-readable storage medium. The computer-readable storage medium stores instructions, and when the instructions are run on a computer, the computer is enabled to perform one or more operations in the method according to any one of the first aspect, the second aspect, and the third aspect.

According to a sixteenth aspect, this application provides a computer program product, including a computer program, where when the computer program is run on a computer, the computer is enabled to perform one or more operations in the method according to any one of the first aspect, the second aspect, and the third aspect.

BRIEF DESCRIPTION OF THE DRAWINGS

To describe the technical solutions in embodiments of this application or in a conventional technology more clearly, the following briefly describes the accompanying drawings used in describing embodiments or the conventional technology. It is clear that the accompanying drawings in the following descriptions show merely some embodiments of this application, and a person of ordinary skill in the art may still derive other accompanying drawings from these accompanying drawings without creative efforts.

FIG. 2b is a structural diagram of a 64 B/66 B code block according to an embodiment of this application;

FIG. 5a is a structural diagram of a DHC encapsulation format according to an embodiment of this application;

DETAILED DESCRIPTION OF ILLUSTRATIVE EMBODIMENTS

To enable a person skilled in the art to better understand the solutions in the present invention, the following clearly and describes the technical solutions in embodiments of the present invention with reference to the accompanying drawings in embodiments of the present invention. It is clear that the described embodiments are merely a part rather than all of embodiments of the present invention.

To facilitate understanding of the technical solutions provided in embodiments of this application, the following describes network elements and technologies in embodiments of this application.

Figure 2A:
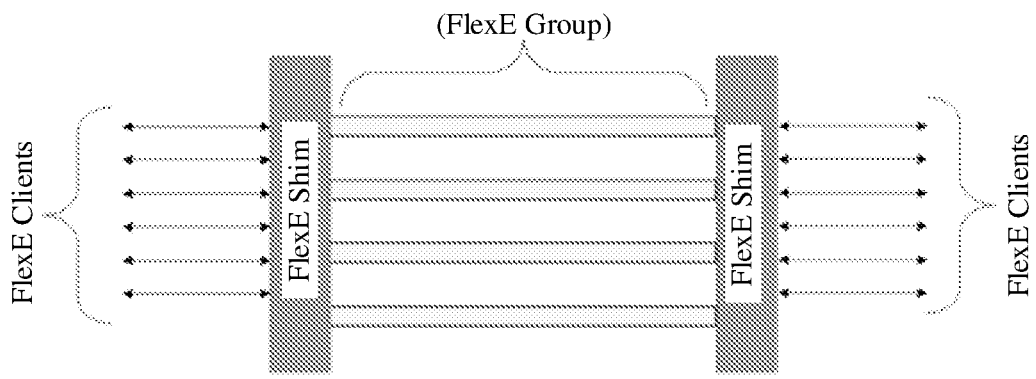
FIG. 2a is a structural diagram of a FlexE implementation according to an embodiment of this application.

The FlexE technology is a technology developed based on the standard Ethernet technology to meet requirements such as high-speed transmission and flexible bandwidth configuration. Based on IEEE 802.3, a FlexE shim layer is introduced in the FlexE technology to decouple a media access control (MAC) layer from a physical layer (PHY). A FlexE is defined based on a client/group architecture. As shown in FIG. 2a, mapping and transmission of any plurality of different sub-interfaces (FlexE Clients) on any PHY (FlexE Group) may be supported. In other words, the FlexE may bind one or more PHY links together to provide transmission channels of different rates. For example, a PHY link corresponding to each 100GBASE-R may be divided into data transmission channels corresponding to 20 slots, and a bandwidth corresponding to each slot is 5 Gbps. An Ethernet frame corresponding to a FlexE client is divided into a plurality of code blocks by using a 64 B/66 B encoding scheme, and each code block is scheduled, by using a FlexE shim, to several slots of one or more PHYs in a FlexE group for sending. 64 B/66 B encoding defined in IEEE 802.3 is to encode 64-bit data or control information into a 66-bit code block for transmission, where the first two bits of the 66-bit code block represent a synchronization header, and are mainly used for data alignment at a receive end and synchronization of a received data bit stream, as shown in FIG. 2b. There are two types of synchronization headers: "01" and "10", where "01" indicates that a subsequent 64-bit code block is a data code block, and "10" indicates that a subsequent 64-bit code block is a control code block. In the control code block, 8 bits next to the synchronization header are a type field, and the following 56 bits are control information, data, or a combination thereof. In addition, the Optical Internetworking Forum (Optical Internetworking Forum, OIF) further defines a FlexE overhead basic frame and a FlexE overhead multiframe, where the FlexE overhead multiframe includes 32 FlexE overhead basic frames, and the FlexE overhead basic frame includes 8 FlexE overhead code blocks. The FlexE determines the first FlexE overhead code block based on that a value of the 8-bit type field is 0x4B and an O code (bit 32 to bit 35) is 0x5.

A metro transport network (MTN) or a slicing packet network (SPN) is a new transport network that transmits data streams based on the FlexE technology. A technology used by the MTN (hereinafter referred to as an MTN technology) mainly complies with related standards of the International Telecommunication Union-Telecommunication Standardization Sector (ITU-T), and a technology used by the SPN (hereinafter referred to as an SPN technology) mainly complies with related standards of the China Communications Standards Association. Both the MTN technology and the SPN technology process data at a shim layer based on the FlexE technology. There is a slight difference between implementations of the two technologies at a path layer. For example, it is defined in the SPN technology that 6 bytes in an overhead code block may carry another message, and it is defined in the MTN technology that 3 bytes in an overhead code block may carry another message. However, in technical implementations related to the present invention, related implementations of the MTN technology is the same as that of the SPN technology. In this application, an MTN path refers to a path through which a packet is transmitted from one end of a network to another end of the network in the MTN network or the SPN network based on the MTN technology or the SPN technology. When a packet is transmitted along an MTN path, the packet may pass through a plurality of intermediate nodes. In both the MTN and the SPN, an Ethernet frame service may be forwarded from one end of the network to another end of the network through one hop or a plurality of hops in a format of a series of 64 B/66 B code blocks, and finally restored to an Ethernet frame. In a transmission process, each hop node in the network can receive the 64 B/66 B code blocks, and forward the 64 B/66 B code blocks to a next-hop node, so as to complete data stream forwarding. For related descriptions and explanations of the MTN technology in this application, for example, related implementations of an MTN interface and a frame format transmitted based on the MTN technology, refer to related descriptions in a related ITU-T standard or a draft standard (for example, "Draft new Recommendation G.8312 (ex_G.mtn)" released in September 2020). For related descriptions of the SPN technology, refer to a related SPN standard formulated by the China Communications Standards Association before this application date. With further development and evolution of the standards, explanations of technical terms related to the MTN technology and the SPN technology in this application are compatible with related standards as the standards evolve.

Figure 1:
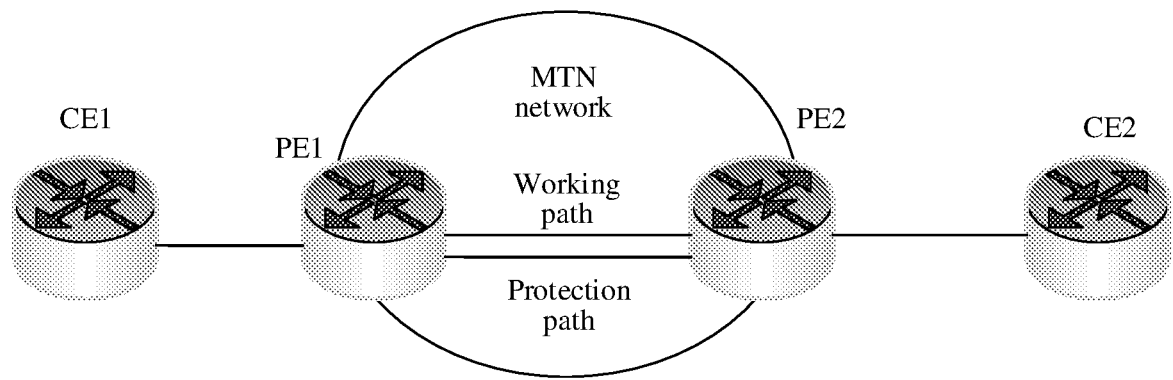
FIG. 1 is a schematic diagram of a conventional application scenario.

In a conventional communication system, as shown in FIG. 1, a service needs to be transmitted between a PE1 and a CE2 by using a PE2. In an actual application, an MTN working path and an MTN protection path that are independent of each other may be established between the PE1 and the PE2. Generally, a service is transmitted between the PE1 and the CE2 by using the MTN working path, and when the MTN working path is faulty, a service is transmitted between the PE1 and the CE2 by using the MTN protection path. However, when the PE2 is faulty, because both the MTN working path and the MTN protection path belong to the same node PE2, service transmission is interrupted. In addition, when the PE1 provides a service transmission service for a plurality of users at the same time, a service volume between the PE1 and the PE2 is large, and service transmission quality is affected.

Based on the foregoing problems, an embodiment of this application provides a communication system. The communication system includes a first communication apparatus, a second communication apparatus, and a third communication apparatus. The third communication apparatus is connected to the first communication apparatus and the second communication apparatus by using a first MTN path and a second MTN path respectively. That is, in this communication system, the third communication apparatus is connected to both the first communication apparatus and the second communication apparatus. Generally, the second MTN path between the third communication apparatus and the second communication apparatus may be set as an MTN working path, and the third communication apparatus transmits a service by using the second MTN path. When the second MTN path is unavailable, the third communication apparatus may transmit the service by using the first MTN path. Alternatively, in a load sharing case, the third communication apparatus may transmit, by using the first MTN path, a data stream corresponding to a second client, and the third communication apparatus may transmit, by using the second MTN path, a data stream corresponding to a first client, so as to reduce transmission load of the first MTN path and the second MTN path, and improve service transmission quality.

Figure 3A:
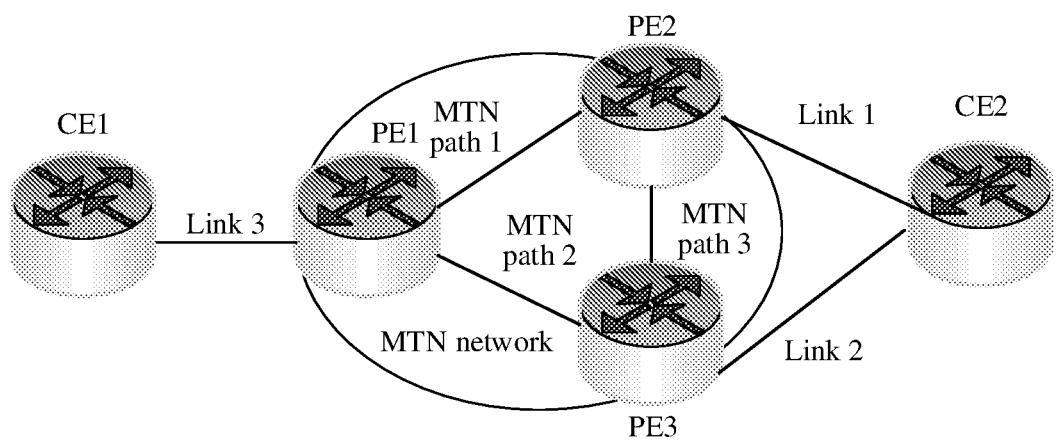
FIG. 3a is a schematic diagram of an application scenario according to an embodiment of this application.

Refer to a schematic diagram of an application scenario shown in FIG. 3a, in the MTN communication system, an example in which 5 network devices are included is used for description, which are respectively a customer edge (CE) device CE1, a customer edge device CE2, a provider edge (PE) device PE1, a provider edge device PE2, and a provider edge device PE3. The PE1 and the PE2 are connected by using an MTN path 1, the PE1 and the PE3 are connected by using an MTN path 2, the PE2 and the PE3 are connected by using an MTN path 3, the CE2 and the PE2 are connected by using a link 1, the CE2 and the PE3 are connected by using a link 2, and the CE1 and the PE1 are connected by using a link 3. The link 1 to the link 3 may be an Eth PHY link, a FlexE link, a link aggregation group (LAG) link, or the like. In the application scenario shown in FIG. 3a, for the PE1, the MTN path 1 between the PE1 and the PE2 may be configured as a working path, and the MTN path 2 between the PE1 and the PE3 may be configured as a protection path; or the MTN path 2 between the PE1 and the PE3 may be configured as a working path, and the MTN path 1 between the PE1 and the PE2 may be configured as a protection path. The protection path is provided for the PE1 to transmit a data stream by using the protection path when the working path cannot be used. For example, the protection path is the MTN path 2, the PE1 sends a packet to the PE3 by using the protection path, and the PE3 forwards the packet to the PE2 or the CE2. Alternatively, the PE1 receives, by using the protection path, a packet sent by the PE3, and forwards the packet to the CE1. For the CE2, the link 1 between the CE2 and the PE2 may be configured as a working link, and the link 2 between the CE2 and the PE3 may be configured as a protection link. Alternatively, the link 2 between the CE2 and the PE3 may be configured as a working link, and the link 1 between the CE2 and the PE2 may be configured as a protection link.

It should be noted that, in a specific implementation, a working path between the CE1 and the CE2 is in an active state, and a data stream is transmitted by using the working path such as CE1-PE1-PE2-CE2, while a protection path may be in an inactive state, that is, not used for transmitting a data stream. When the working path or the PE2 node is faulty, the protection path is started, and a data stream is transmitted by using the protection path.

Figure 3B:
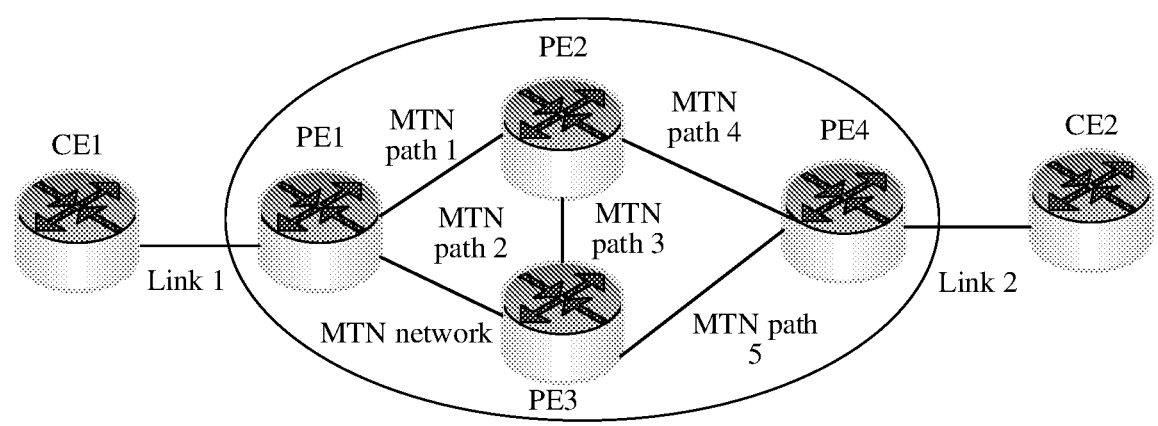
FIG. 3b is a schematic diagram of another application scenario according to an embodiment of this application.

Refer to a schematic diagram of another application scenario shown in FIG. 3b, an example in which 6 network devices are included is used for description, which are respectively a customer edge (CE) device CE1, a customer edge device CE2, a provider edge (PE) device PE1, a provider edge device PE2, a provider edge device PE3, and a provider edge device PE4. The PE1 and the PE2 are connected by using an MTN path 1, the PE1 and the PE3 are connected by using an MTN path 2, the PE2 and the PE3 are connected by using an MTN path 3, the PE2 and the PE4 are connected by using an MTN path 4, the PE3 and the PE4 are connected by using an MTN path 5, the CE1 and the PE1 are connected by using a link 1, and the CE2 and the PE4 are connected by using a link 2. The link 1 and the link 2 may be an Eth PHY link, a FlexE link, a link aggregation group (LAG) link, or the like. In the application scenario shown in FIG. 3b, for the PE1, the MTN path 1 between the PE1 and the PE2 may be configured as a working path, and the MTN path 2 between the PE1 and the PE3 may be configured as a protection path; or the MTN path 2 between the PE1 and the PE3 may be configured as a working path, and the MTN path 1 between the PE1 and the PE2 may be configured as a protection path. For the PE4, the MTN path 4 between the PE4 and the PE2 may be configured as a working path, and the MTN path 5 between the PE4 and the PE3 may be configured as a protection path; or the MTN path 5 between the PE4 and the PE3 may be configured as a working path, and the MTN path 4 between the PE4 and the PE2 may be configured as a protection path.

It should be noted that, when a transmission path between the CE1 and the CE2 is CE1-PE1-PE2-PE4-CE2, a working path in the transmission path is configured to be in an active state, and a data stream may be transmitted between the CE1 and the CE2 by using the working path, and a protection path PE1-PE3-PE4 is configured to be in an inactive state, that is, not used for transmitting a data stream. When the MTN path 1, the MTN path 4, or the PE2 node in the working path is faulty, a protection path corresponding to each path is started, and a data stream is transmitted by using the protection path.

Each network device may also be referred to as a node, and may be a device having a packet processing function in a network system, for example, may be a router or a switch.

It should be noted that the application scenarios of this application are merely examples for description, and should not constitute a limitation on the application scenarios of this application. For ease of understanding, in this application, only a dual-homing scenario is used as an example to describe application scenarios of this application and corresponding methods, apparatuses, and systems. However, this method is also applicable to other multi-homing scenarios, and details are not described herein again.

To facilitate understanding of a path switching method provided in embodiments of this application, the following separately describes the foregoing fault cases with reference to the accompanying drawings.

Figure 4:
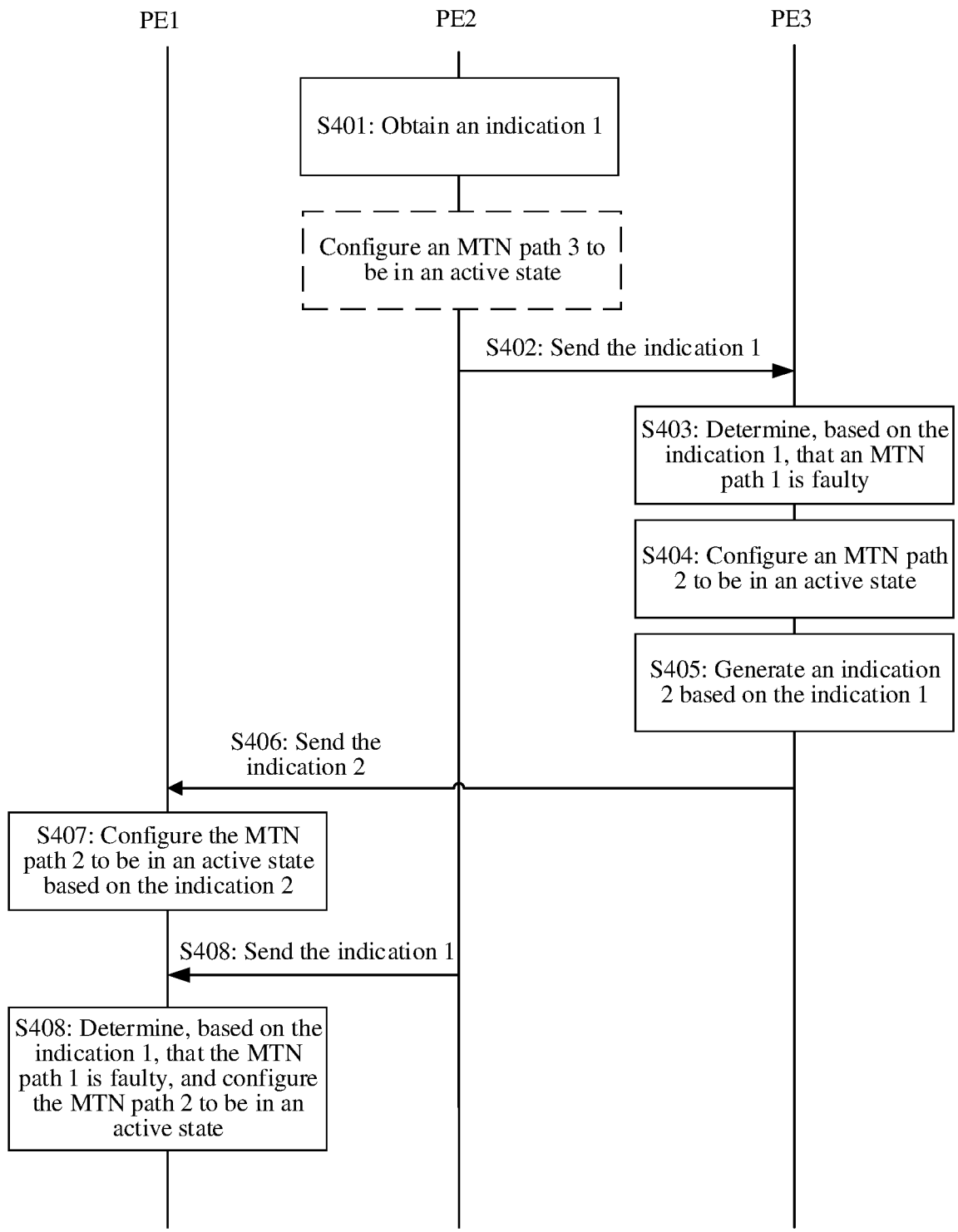
FIG. 4 is a flowchart of a multi-homing communication method in a network according to an embodiment of this application.

With reference to the application scenario shown in FIG. 3a or FIG. 3b, an example in which the MTN path 1 between the PE1 and the PE2 is a working path and the MTN path 2 between the PE1 and the PE3 is a protection path is used for description. FIG. 4 is a flowchart of a multi-homing communication method in a network according to an embodiment of this application. This embodiment describes operations performed by each network device when the MTN path 1 is faulty. The method 400 includes the following steps.

S401: The PE2 obtains an indication 1.

In the application scenario shown in FIG. 3a or FIG. 3b, a status of the MTN path 1 may be continuously monitored between the PE2 and the PE1 by using an operation, administration and maintenance (OAM) message at a path layer. Specifically, the PE1 may periodically send an OAM message to the PE2, so as to monitor a status of a path (for example, a forward path) from the PE1 to the PE2; and the PE2 may periodically send an OAM message to the PE1, so as to monitor a path (for example, a reverse path) from the PE2 to the PE1 based on the OAM message. When the PE2 does not receive, within a preset time, the OAM message sent by the PE1, it may indicate that a fault occurs on the forward path, and the PE2 may generate an indication 1 based on the fault, where the indication 1 indicates that the MTN path 1 is faulty. When the PE1 does not receive, within a preset time, the OAM message sent by the PE2, it indicates that a fault occurs on the reverse path, the PE1 may notify the PE2 of the fault occurring on the reverse path by using the OAM message, and the PE2 generates an indication 1 based on the OAM message, where the indication 1 indicates that the MTN path 1 is faulty. It should be noted that, in this embodiment, an example in which both a fault on the forward path and a fault on the reverse path of the MTN path 1 are determined as a fault on the MTN path 1 is used for description. In addition, when the forward path is faulty, because the PE1 cannot transmit a data stream to the PE2 by using the forward path, the MTN path 2 needs to be started. When the reverse path is faulty, because the PE2 cannot transmit a data stream to the PE1 by using the reverse path, the PE3 needs to be notified to start the MTN path 2 and the MTN path 3, so as to transmit a data stream to the PE1 by using the MTN path 2 and the MTN path 3.

For the MTN, an OAM message at the path layer may be carried by an overhead code block at the path layer. In an encapsulation format of an overhead code block at a path layer defined by the ITU-T, as shown in FIG. 2b, an overhead code block of a first path layer is determined based on that a value of an 8-bit type field is 0x4B and an O code (bit 32 to bit 35) is 0x0C, and 3 bytes after the 8-bit type field may carry an OAM message. For the SPN network, 6 bytes after the 8-bit type field may be used for carrying an OAM message.

In an implementation, when the MTN path 3 is established between the PE2 and the PE3, when the MTN path 1 is not faulty, the MTN path 3 is usually in an inactive state, that is, the PE2 does not use the MTN path 3 to transmit a data stream. When the MTN path 1 is faulty, the PE2 cannot use the MTN path 1 to transmit a data stream, and the MTN path 3 is switched from an inactive state to an active state, so that the PE2 can transmit a data stream by using the MTN path 3.

S402: The PE2 sends the indication 1.

When the MTN path 1 is faulty, the PE1 needs to switch from the MTN path 1 to the MTN path 2, so as to transmit, by using the MTN path 2, a data stream sent by the CE1, or receive, by using the MTN path 2, a data stream sent by the CE2. Similarly, when the MTN path 1 is faulty, the PE3 also needs to start the MTN path 2, that is, to enable the MTN path 2 to be in an active state, so as to forward, to the CE2 by using the MTN path 2, the data stream sent by the CE1, and forward, to the CE1 by using the MTN path 2, the data stream sent by the CE2. In this case, the PE2 may send the indication 1 to the PE3, and/or send the indication 1 to the PE1.

In an example, when the PE2 sends the indication 1 to only the PE3, for example, when both the forward path and the reverse path between the PE1 and the PE2 are faulty, refer to specific implementations of S403 to S407 for details.

For an example in which the PE2 sends the indication 1 to the PE3, in a case, the indication 1 may be carried in a dual-homing coordination (DHC) message. For details about the DHC message, refer to related descriptions of RFC 8185. In this application, when DHC is used for an MTN or an SPN, the DHC message may be encapsulated in an overhead code block at a path layer, and a structure of the overhead code block at the path layer is shown in FIG. 2*b*. Specifically, the DHC message may be encapsulated in one or more overhead code blocks. For example, when 3 bytes in one overhead code block may be used for carrying information, the DHC message may be carried by using two overhead code blocks; and when 6 byte in one overhead code block may be used for carrying information, the DHC message may be carried by using one overhead code block.

Figure 5A:
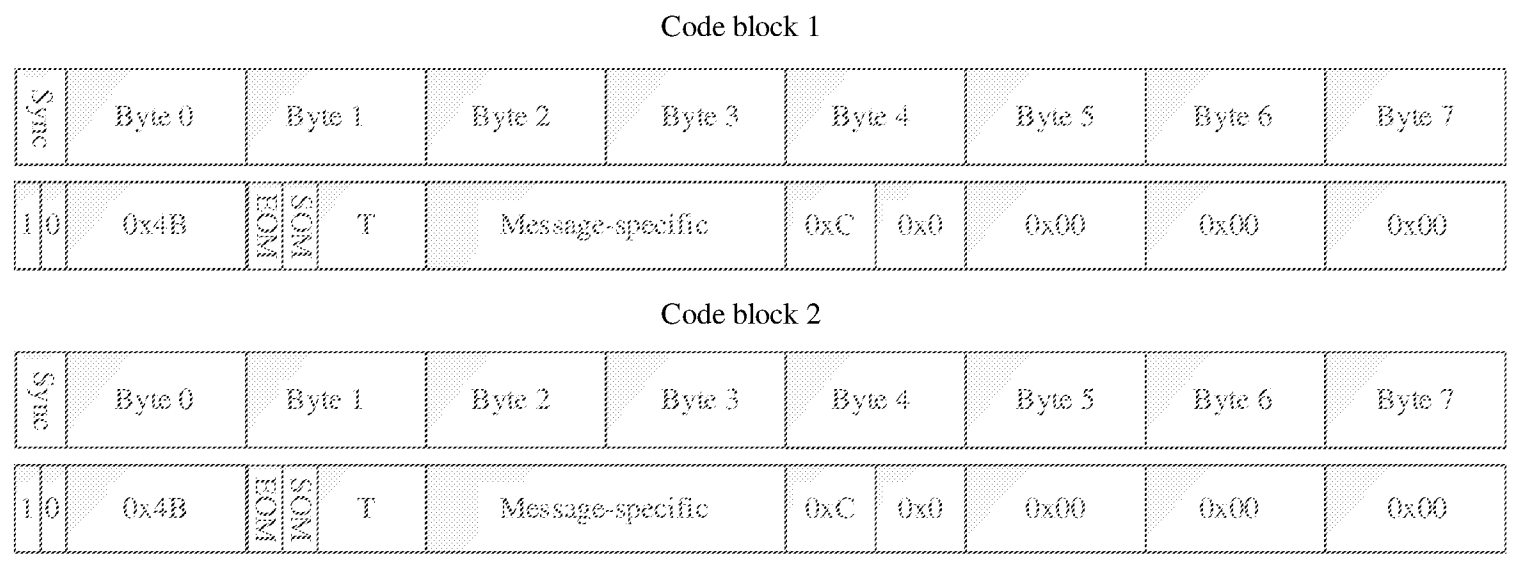

For ease of understanding, when the DHC message is carried by using two overhead code blocks, refer to FIG. 5*a*, a code block 1 and a code block 2 are included. Each code block includes a start of message (SOM) and an end of message (EOM) indicating the DHC message. Specifically, when SOM=1 and EOM=0, it indicates a start code block carrying the DHC message, for example, the code block 1; and when SOM=0 and EOM=1, it indicates an end code block carrying the DHC message, for example, the code block 2. T is used for indicating a type of a carried message, for example, T is equal to a type value corresponding to DHC. A part of content of the DHC message is carried in message-specific of the code block 1, and the other part of the content of the DHC message is carried in message-specific of the code block 2. The content of the DHC message may include a status indication (for example, 0-normal; and 1-faulty) of the MTN path 1, a switching indication (for example, 0-no switching, transmission is performed on the MTN path 1; and 1-switching, transmission is performed on the MTN path 2) of the MTN path 1, and the like.

Figure 5B:
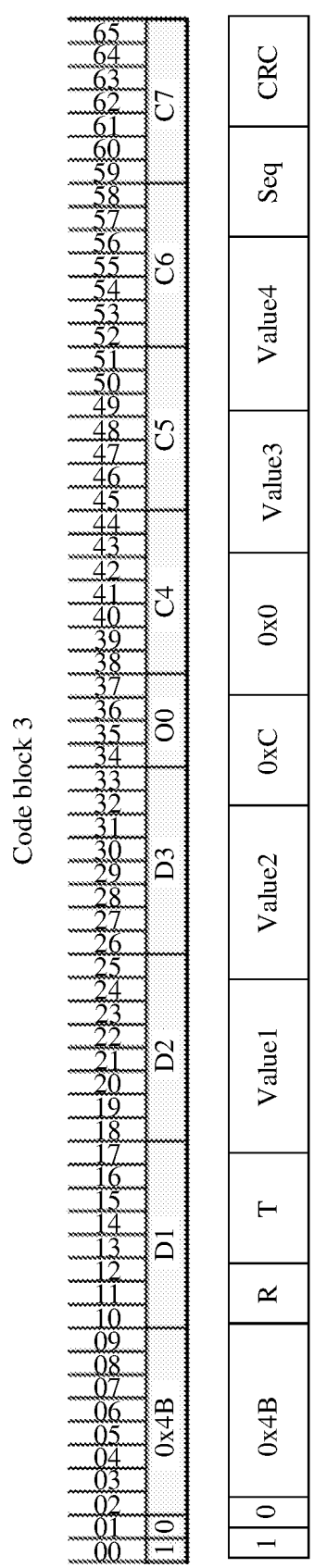
FIG. 5b is a structural diagram of another DHC encapsulation format according to an embodiment of this application.

When the DHC message is carried by using one overhead code block, refer to FIG. 5*b*, a code block 3 is included. T in the code block 3 is used for indicating a type of a carried message, for example, T is equal to a type value corresponding to DHC. A value 1 to a value 4 in the code block 3 are used for carrying content of the DHC message. Similarly, the content of the DHC message may include a status indication (for example, 0-normal; and 1-faulty) of the MTN path 1, a switching indication (for example, 0-no switching, transmission is performed on the MTN path 1; and 1-switching, transmission is performed on the MTN path 2) of the MTN path 1, and the like.

In another case, although the MTN path 3 is in an inactive state, an OAM message may also be periodically sent between the PE2 and the PE3 to monitor a status of the MTN path 3 between the PE2 and the PE3. In this case, the indication 1 may be carried in the OAM message sent by the PE2 to the PE3, and the PE3 determines, by parsing the OAM message, that the MTN path 1 is faulty.

The foregoing two cases are merely examples for describing a situation that the indication 1 is carried in different messages in this embodiment of this application, and this embodiment of this application includes but is not limited to the foregoing two possible implementations. Any other message that can carry the indication 1 may be used as an implementation in this embodiment of this application.

In another example, while sending the indication 1 to the PE3, the PE2 sends the indication 1 to the PE1. For example, the reverse path from the PE2 to the PE1 is normal. Refer to specific implementations of S403 and S408 to S409. It may be understood that, when the PE2 detects that the forward path from the PE1 to the PE2 is faulty, because the reverse path from the PE2 to the PE1 is normal, the PE2 may continue to send the OAM message to the PE1. In this case, the PE2 may carry the indication 1 by using the OAM message, so that the PE1 determines, by parsing the OAM message, that the MTN path 1 is faulty.

S403: The PE3 determines, based on the indication 1 sent by the PE2, that the MTN path 1 is faulty.

S404: The PE3 configures the MTN path 2 to be in an active state.

In this embodiment, after receiving the indication 1 sent by the PE2, the PE3 determines, by parsing the indication 1, that the MTN path 1 is faulty, and configures the MTN path 2 to be in an active state, so that the PE3 can receive or send a data stream by using the MTN path 2.

In an implementation, when the MTN path 3 is established between the PE3 and the PE2, when the MTN path 1 is not faulty, the MTN path 3 may be in an inactive state, that is, the PE3 does not use the MTN path 3 to transmit a data stream. When the MTN path 1 is faulty, the PE3 may configure the MTN path 3 to be in an active state, so that the PE3 can transmit a data stream by using the MTN path 3.

S405: The PE3 generates an indication 2 based on the indication 1.

When the PE3 determines, based on the indication 1, that the MTN path 1 is faulty, to enable the PE1 not to use the MTN path 1 to transmit a data stream, the PE3 may generate an indication 2. The indication 2 indicates the PE1 to switch from the MTN path 1 to the MTN path 2, that is, configure the MTN path 2 to be in an active state.

In a possible implementation, the indication 2 may be carried in an automatic protection switching (APS) message. The APS message may be encapsulated in an overhead code block at a path layer, and the overhead code block is a 64 B/66 B code block, where a specific structure is shown in FIG. 2*b*. The APS message may be encapsulated in one overhead code block, for example, 6 bytes in one overhead code block are used for carrying information, or may be encapsulated in two overhead code blocks, for example, 3 bytes in one overhead code block are used for carrying information.

In another possible implementation, the indication 2 may be carried in an OAM message sent by the PE3 to the PE1.

The PE1 obtains the indication 2 by parsing the OAM message, and then configures the MTN path 2 to be in an active state based on the indication 2.

S406: The PE3 sends the indication 2 to the PE1.

S407: The PE1 configures the MTN path 2 to be in an active state based on the indication 2.

After receiving the indication 2 sent by the PE3, the PE1 determines, by parsing the indication 2, that the MTN path 1 is faulty, and switches the MTN path 2 from an inactive state to an active state, so that the PE1 transmits a data stream by using the MTN path 2.

S408: The PE1 receives the indication 1 sent by the PE2.

S409: The PE1 determines, based on the indication 1, that the MTN path 1 is faulty, and configures the MTN path 2 to be in an active state.

When the reverse path from the PE2 to the PE1 works normally, the PE2 may directly send the indication 1 to the PE1, so that the PE1 determines, based on the indication 1, that the MTN path 1 is faulty, and switches the MTN path 2 from an inactive state to an active state, to transmit a data stream by using the MTN path 2. The indication 1 may be carried in the OAM message sent by the PE2 to the PE1.

Figure 6:
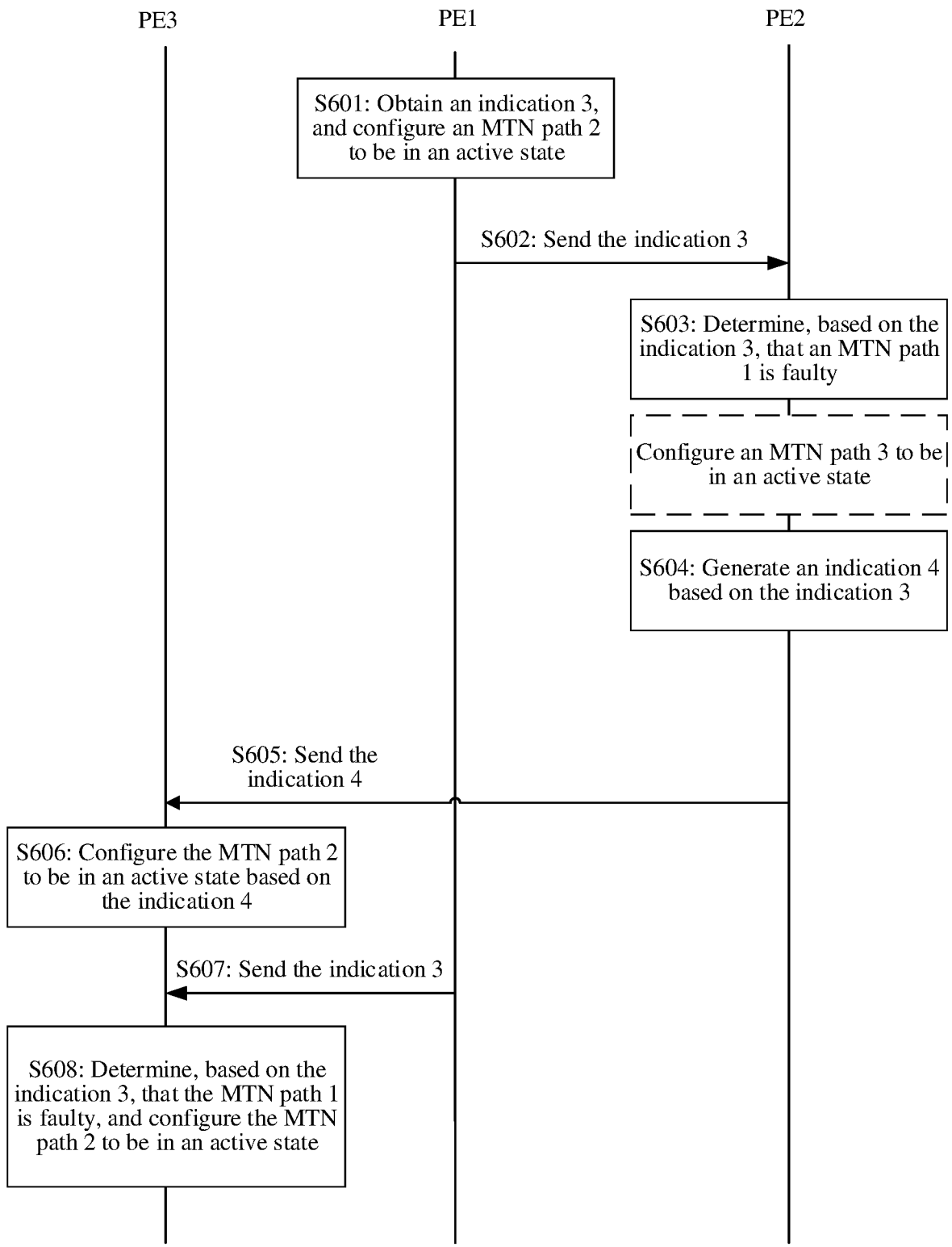
FIG. 6 is a flowchart of another multi-homing communication method in a network according to an embodiment of this application.

Refer to FIG. 6, an embodiment of this application provides a flowchart of another multi-homing communication method in a network. The method 600 may include the following steps.

S601: The PE1 obtains an indication 3, and configures the MTN path 2 to be in an active state.

It can be learned from the foregoing descriptions that, a status of the MTN path 1 between the PE2 and the PE1 may be continuously monitored by using an OAM message at a path layer. Specifically, the PE1 may periodically send an OAM message to the PE2, so as to monitor a status of a path (a forward path) from the PE1 to the PE2; and the PE2 may periodically send an OAM message to the PE1, so as to monitor a path (a reverse path) from the PE2 to the PE1 based on the OAM message. When the PE1 does not receive, within a preset time (for example, 3.5 continuous connection detection periods), any OAM message sent by the PE2, it indicates that a fault occurs on the reverse path, and the PE2 may generate an indication 3 based on the fault, where the indication 3 indicates that the MTN path 1 is faulty. When the PE2 does not receive, within a preset time, the OAM message sent by the PE1, it indicates that a fault occurs on the forward path, the PE2 may notify the PE1 of the fault occurring on the forward path by using the OAM message, and the PE1 generates an indication 3 based on the OAM message, where the indication 3 indicates that the MTN path 1 is faulty. It should be noted that, in this embodiment, an example in which both a fault on the forward path and a fault on the reverse path of the MTN path 1 are determined as a fault on the MTN path 1 is used for description.

It should be noted that, when the MTN path 1 is not faulty, the MTN path 2 may be in an inactive state. When the PE1 determines that the MTN path 1 is faulty, the PE1 cannot transmit a data stream by using the MTN path 1, and the MTN path 2 is switched from an inactive state to an active state.

S602: The PE1 sends the indication 3.

In the application scenario shown in FIG. 3a or FIG. 3b, when the MTN path 1 is faulty, the PE3 also needs to start the MTN path 2, that is, to configure the MTN2 path to be in an active state, so as to forward, by using the MTN path 2, the data stream sent by the CE1 or the CE2. In this case, the PE1 may send the indication 3 to the PE3. The indication 3 may be carried in an APS message. For a specific format and implementation of the APS message, refer to S402.

Alternatively, the PE1 sends the indication to only the PE2, and the PE2 sends the indication to the PE3. For example, when the forward path from the PE1 to the PE2 works normally, and the MTN path 3 is established between the PE2 and the PE3, when the MTN path 1 is faulty (a reverse path fault) and the PE2 is still used for forwarding a data stream, the PE2 needs to start the MTN path 3, so as to forward, by using the MTN path 3, the data stream sent by the CE1 or the CE2. In this case, the PE1 may send the indication 3 to the PE2. The indication 3 may be carried in an OAM message. The PE3 determines, by parsing the OAM message, that the MTN path 1 is faulty, and then configures the MTN path 3 to be in an active state.

For an implementation in which the PE1 sends the indication 3 to only the PE2, refer to S603 to S606; and for an implementation in which the PE1 sends the indication 3 to the PE3, refer to S607 and S608.

S603: The PE2 receives the indication 3 sent by the PE1, and determines, based on the indication 3, that the MTN path 1 is faulty.

In this embodiment, when the forward path from the PE1 to the PE2 works normally, the PE1 may send the indication 3 to the PE2, and after receiving the indication 3 sent by the PE1, the PE2 determines, by parsing the indication 3, that the MTN path 1 is faulty. When the MTN path 3 exists between the PE2 and the PE3, and the MTN path 3 needs to be used for transmitting a data stream, the PE2 may switch the MTN path 3 from an inactive state to an active state.

S604: The PE2 generates an indication 4 based on the indication 3.

When the PE2 determines, based on the indication 3, that the MTN path 1 is faulty, to enable the PE 3 to start the MTN path 2 in time, the PE2 generates an indication 4. The indication 4 indicates the PE3 to configure the MTN path 2 to be in an active state. The fourth indication may be carried in a dual-homing coordination DHC message. For related descriptions and an implementation of the DHC message, refer to S402. Alternatively, the indication 4 is carried in an OAM message sent by the PE2 to the PE3, and the PE3 determines, by parsing the OAM message, that the MTN path 1 is faulty.

S605: The PE2 sends the indication 4 to the PE3.

S606: The PE3 configures the MTN path 2 to be in an active state based on the indication 4.

In the application scenario shown in FIG. 3a or FIG. 3b, in a case, when the MTN path 3 is required for transmitting a data stream, the PE3 switches a status of the MTN path 3 corresponding to the PE3 from an inactive state to an active state.

In another case, when a data stream is transmitted by using a link 2 between the PE3 and the CE2, the PE3 switches a status of the path 2 corresponding to the PE3 from an inactive state to an active state.

S607: The PE3 receives the indication 3 sent by the PE1.

S608: The PE3 determines, based on the indication 3, that the MTN path 1 is faulty, and configures the MTN path 2 to be in an active state.

When the PE1 determines that the MTN path 1 is faulty, the PE1 may directly send the indication 3 to the PE3, so that the PE3 determines, based on the indication 3, that the MTN path 1 is faulty, and switches the status of the MTN path 2 from an inactive state to an active state. The indication 3 may be carried in an APS message, or the indication 3 may be carried in an OAM message.

The foregoing embodiments describe operations performed between devices when the MTN path 1 is unavailable. The following describes a case that the PE2 node is faulty with reference to the accompanying drawings.

Figure 7:
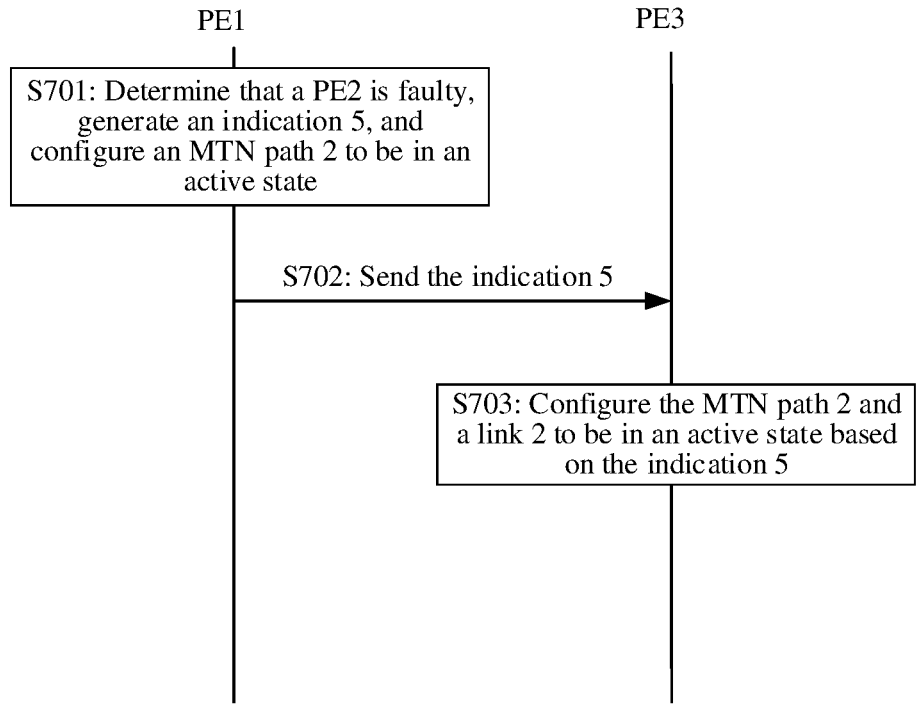
FIG. 7 is a flowchart of still another multi-homing communication method in a network according to an embodiment of this application.

FIG. 7 is a flowchart of a multi-homing communication method in a network according to an embodiment of this application. The method 700 may include the following steps.

S701: The PE1 determines that the PE2 is faulty, generates an indication 5, and configures the MTN path 2 to be in an active state.

In this embodiment, the PE1 may determine that the PE2 node is faulty in the following two manners. One manner is that the PE1 directly detects that the PE2 is faulty by using an OAM message on the MTN path 1. The other manner is that when the PE2 is faulty, both the PE1 and the PE3 cannot receive, within a preset time, an OAM message sent by the PE2. In this case, the PE1 may determine that the MTN path 1 is faulty (a reverse path fault), and the PE3 determines that the MTN path 3 is faulty and the PE3 sends an indication to the PE1. The PE1 may determine, based on the indication, that the MTN path 3 is faulty, and the PE1 may determine, based on a case that the PE1 cannot receive the OAM message sent by the PE2, that the PE2 node is faulty. Certainly, to ensure accuracy of the PE1 in determining the fault of the PE2, the PE1 may further determine the fault in another manner.

When determining that the PE2 is faulty, the PE1 may generate an indication 5, where the indication 5 indicates the PE3 to start the MTN path 2 and the path 2. The indication may be carried in an APS message, or carried in an OAM message.

Specifically, when the PE3 determines that the PE2 is faulty, to ensure that transmission of the data stream is not interrupted, the PE3 switches the path 2 from an inactive state to an active state, so that the PE3 transmits, by using the link 2, the data stream sent by the CE2 or the CE1.

S702: The PE1 sends the indication 5 to the PE3.

S703: The PE3 configures the MTN path 2 and the link 2 to be in an active state based on the indication 5.

With reference to the application scenario shown in FIG. 3a or FIG. 3b, when the PE2 node is faulty, the PE1 cannot transmit a data stream to the CE1 by using the MTN path 1 and the link 1. To ensure normal transmission of the data stream, the MTN path 2 and the link 2 need to be configured to be in an active state, so as to transmit the data stream by using the MTN path 2 and the link 2.

Figure 8:
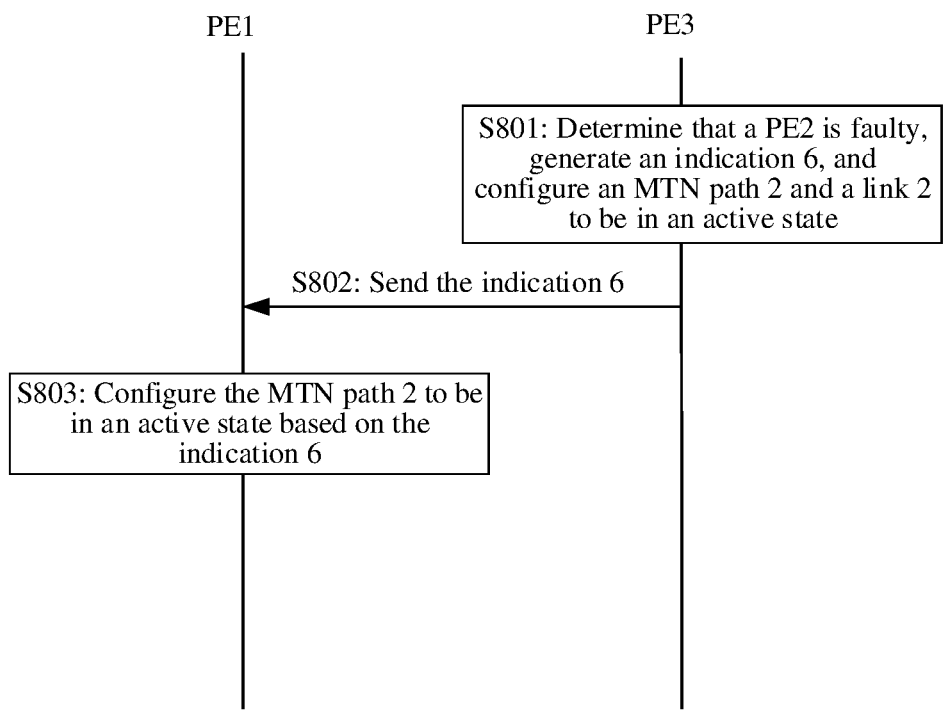
FIG. 8 is a flowchart of still another multi-homing communication method in a network according to an embodiment of this application.

FIG. 8 is a flowchart of a multi-homing communication method in a network according to an embodiment of this application. The method 800 may include the following steps.

S801: The PE3 determines that the PE2 is faulty, generates an indication 6, and configures the MTN path 2 and the link 2 to be in an active state.

In this embodiment, the PE3 may determine that the PE2 node is faulty in the following two manners. One manner is that the PE3 directly detects that the PE2 is faulty by using an OAM message on the MTN path 3. The other manner is that when the PE2 is faulty, both the PE1 and the PE3 cannot receive, within a preset time, an OAM message sent by the PE2. In this case, the PE1 may determine that the MTN path 1 is faulty (a reverse path fault), and the PE1 sends an indication to the PE3. The PE3 may determine, based on the indication, that the MTN path 1 is faulty, and the PE3 may determine, based on a case that the PE3 also cannot receive the OAM message sent by the PE2, that the PE2 node is faulty. Certainly, to ensure accuracy of the PE3 in determining the fault of the PE2, the PE3 may further determine the fault in another manner.

When determining that the PE2 is faulty, the PE3 may generate an indication 6, where the indication 6 indicates the PE1 to switch from the MTN path 1 to the MTN path 2. The indication may be carried in an APS message, or carried in an OAM message.

Specifically, when the PE3 determines that the PE2 is faulty, to ensure that transmission of the data stream is not interrupted, the PE3 switches the MTN path 2 and the link 2 from an inactive state to an active state, so that the PE3 transmits, by using the MTN path 2 and the link 2, the data stream sent by the CE2 or the CE1.

S802: The PE3 sends the indication 6 to the PE1.

S803: The PE1 configures the MTN path 2 to be in an active state based on the indication 6.

In this embodiment, when receiving the indication 6, the PE1 may determine, based on the indication 6, that the MTN path 1 is unavailable, and configure the MTN path 2 to be in an active state.

The foregoing embodiments describe operations performed by other network devices when the PE2 node is faulty. The following describes a case that the link 1 is faulty with reference to the accompanying drawings.

Figure 9:
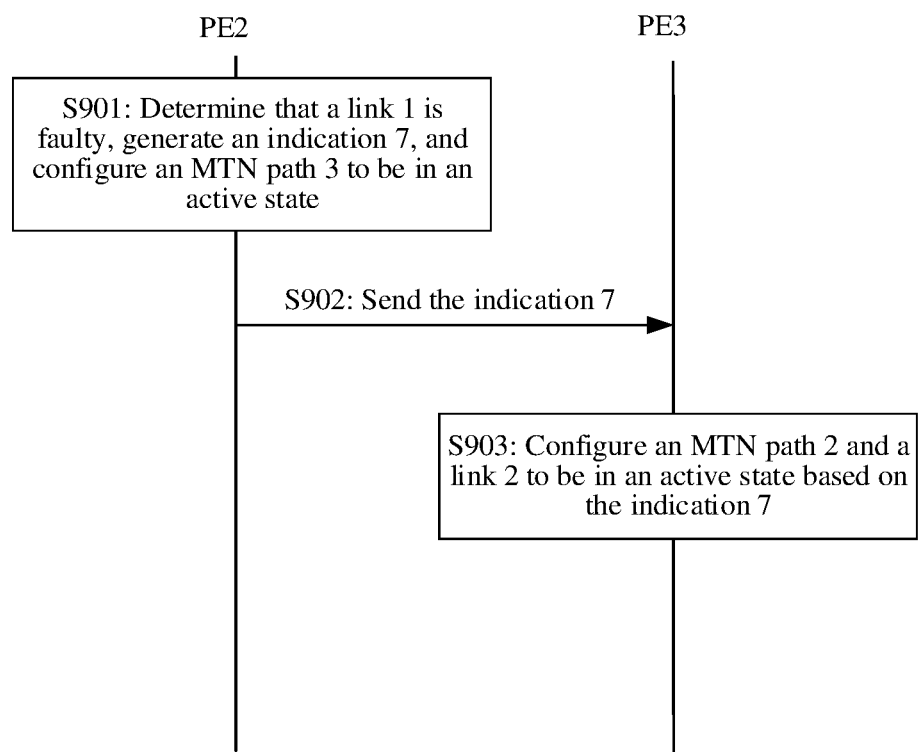
FIG. 9 is a flowchart of still another multi-homing communication method in a network according to an embodiment of this application.

FIG. 9 is a flowchart of a multi-homing communication method in a network according to an embodiment of this application. The method 900 may include the following steps.

S901: The PE2 determines that the link 1 is faulty, generates an indication 7, and configures the MTN path 3 to be in an active state.

As shown in FIG. 3, the PE2 and the CE2 may continuously monitor a status of the link 1 by using an OAM message at a link layer. Specifically, the PE2 may periodically send an OAM message to the CE2, so as to monitor a status of a link (a forward link) from the PE2 to the CE2. The CE2 may periodically send an OAM message to the PE2 to monitor a link (a reverse link) from the CE2 to the PE2 by using the OAM message. When the PE2 does not receive, within a preset time, the OAM message sent by the CE2, it indicates that a fault occurs on the forward link, and the PE2 may generate an indication 7 based on the fault, where the indication 7 indicates that the link 1 is faulty. When the CE2 does not receive, within a preset time, the OAM message sent by the PE2, it indicates that a fault occurs on the reverse link, the CE2 may notify the PE2 of the fault occurring on the reverse link by using the OAM message, and the PE2 generates an indication 7 based on the OAM message, where the indication 7 indicates that the link 1 is faulty. It should be noted that, in this embodiment, both a fault on the forward link and a fault on the reverse link of the link 1 are determined as a fault on the link 1.

In an implementation, when the PE2 determines that the link 1 is faulty but the MTN path 1 is not faulty, to enable the PE2 to normally transmit a data stream, the PE2 may configure the MTN path 3 to be in an active state, so that the PE2 transmits a data stream by using the MTN path 3.

S902: The PE2 sends the indication 7 to the PE3.

The indication 7 may be carried in a DHC message.

S903: The PE3 determines, based on the indication 7, that the link 1 is faulty, and configures the MTN path 3 and the link 2 to be an active state.

When the link 1 is faulty, the link 2 needs to be started to ensure that the CE2 can transmit a data stream. That is, the link 2 is configured to be in an active state. Further, to enable the PE3 to transmit a data stream to the CE1 and forward the data stream by using the PE2 node, the PE3 may further start the MTN path 3, that is, configure the MTN path 3 to be in an active state.

The foregoing embodiment is described by using FIG. 3a as an example. For a structural diagram of the communication system shown in FIG. 3b, for a solution to a path fault or a node fault, refer to the descriptions in the foregoing embodiments. For example, when the path between the PE4 and the PE2 in FIG. 3b is faulty, refer to the specific implementation of the foregoing method 400.

It should be noted that, in a specific implementation, each node may update a corresponding forwarding table by maintaining a path state table, so as to determine a forwarding path by using the forwarding table. The PE2 and the PE3 are used as an example for description. Refer to a PE2 path state table shown in Table 1 and a PE3 path state table shown in Table 2.

TABLE 1

Path state table corresponding to PE2

| MTN path 1 | Link 1 | MTN path 3 | Forwarding behavior |
|---|---|---|---|
| Active | Active | Active | MTN path 1<->Link 1 |
| Down | Active | Active | MTN path 3<->Link 1 |
| Active | Down | Active | MTN path 1<->MTN path 3 |
| Down | Down | Active | Discard |
| Down | Active | Down | Discard |

TABLE 2

Path state table corresponding to PE3

| MTN path 2 | Link 2 | MTN path 3 | Forwarding behavior |
|---|---|---|---|
| Inactive | Inactive | Active | Discard |
| Active | Inactive | Active | MTN path 3<->MTN path 2 |
| Inactive | Active | Active | Link 2<->MTN path 3 |
| Active | Active | Active | MTN path 2<->Link 2 |
| Active | Active | Down | MTN path 2<->Link 2 |

It can be learned from the foregoing two tables that, when the MTN path 1, the PE2 node, and the link 1 all work normally, both the MTN path 1 and the link 1 corresponding to the PE2 are configured to be in an active state, and the MTN path 3 may be configured to be in an inactive state or an active state. Generally, the MTN path 3 is configured to be in an active state, as shown in the first row in Table 1. A forwarding path in a forwarding table corresponding to the PE2 is MTN path 1<->Link 1, that is, bidirectional forwarding is implemented by using the MTN path 1 and the link 1. In this case, the MTN path 2 and the link 2 corresponding to the PE3 are in an inactive state, and the MTN path 3 is configured to be in an active state, as shown in the first row in Table 2. When the MTN path 1 is faulty, and the link 1 is still in an active state, the PE2 node may set the MTN path 3 to be in an active state, as shown in the second row in Table 1. A forwarding path in the forwarding table corresponding to the PE2 is MTN path 3<->Link 1. In this case, the MTN path 2 and the MTN path 3 corresponding to the PE3 are in an active state, and the link 2 is still in an inactive state, as shown in the second row in Table 2. A forwarding path in a forwarding table corresponding to the PE3 is MTN path 3<->MTN path 2, that is, bidirectional forwarding is implemented by using the MTN path 3 and the MTN path 2. When the link 1 is faulty, the MTN path 1 may still be in an active state, and the MTN path 3 is in an active state, as shown in the third row in Table 1. A forwarding path in the forwarding table corresponding to the PE2 is MTN path 1<->MTN path 3, that is, bidirectional forwarding is implemented by using the MTN path 1 and the MTN path 3. In this case, the MTN path 2 corresponding to the PE3 is still in an inactive state, and the link 2 and the MTN path 3 are in an active state, as shown in the third row in Table 2. A forwarding path in the forwarding table of the PE3 is Link 2<->MTN path 3, that is, bidirectional forwarding is implemented by using the link 2 and the MTN path 3. When both the MTN path 1 and the link 1 are faulty, or the PE2 node is faulty, the MTN path 3 may be in an inactive state or an active state. When the MTN path 3 is in an inactive state, a corresponding forwarding behavior is null, and no operation is performed. When the MTN path 3 is in an active state, a corresponding forwarding behavior is discard, as shown in the fourth row in Table 1. In this case, the MTN path 2 and the link 2 corresponding to the PE3 are in an active state, and the MTN path 3 may be in an active state or an inactive state. A forwarding path corresponding to the forwarding table of the PE3 is MTN path 2<->Link 1, that is, bidirectional forwarding is implemented by using the MTN path 2 and the link 1, as shown in the fourth row in Table 2. When both the MTN path 1 and the MTN path 3 are faulty, or the PE2 node is faulty, the link 1 may be in an inactive state or an active state. When the link 1 is in an inactive state, a corresponding forwarding behavior is null, and no operation is performed. When the link 1 is in an active state, a corresponding forwarding behavior is discard, as shown in the fifth row in Table 1. In this case, the MTN path 2 and the link 2 corresponding to the PE3 are in an active state, and the MTN path 3 is faulty. A forwarding path corresponding to the forwarding table of the PE3 is MTN path 2<->Link 2, that is, bidirectional forwarding is implemented by using the MTN path 2 and the link 2, as shown in the fifth row in Table 2.

Specifically, when the MTN path 1, the MTN path 2, or the MTN path 3 is an active/standby path, a status thereof may be divided into three states: an active state, a standby state, and a down state. The standby state may be equivalent to an inactive state. When the MTN path 1, the MTN path 2, or the MTN path 3 is a dual-homing path, the status may be divided into two states, which are respectively an up state and a down state. The up state may be equivalent to an active state.

It can be learned from the foregoing descriptions that, after each node switches a path by using signaling on a control plane for a path fault or a node fault, a forwarding behavior corresponding to each node changes, and finally a new forwarding path is formed to avoid the fault. The following provides descriptions with reference to the accompanying drawings.

Figure 10:
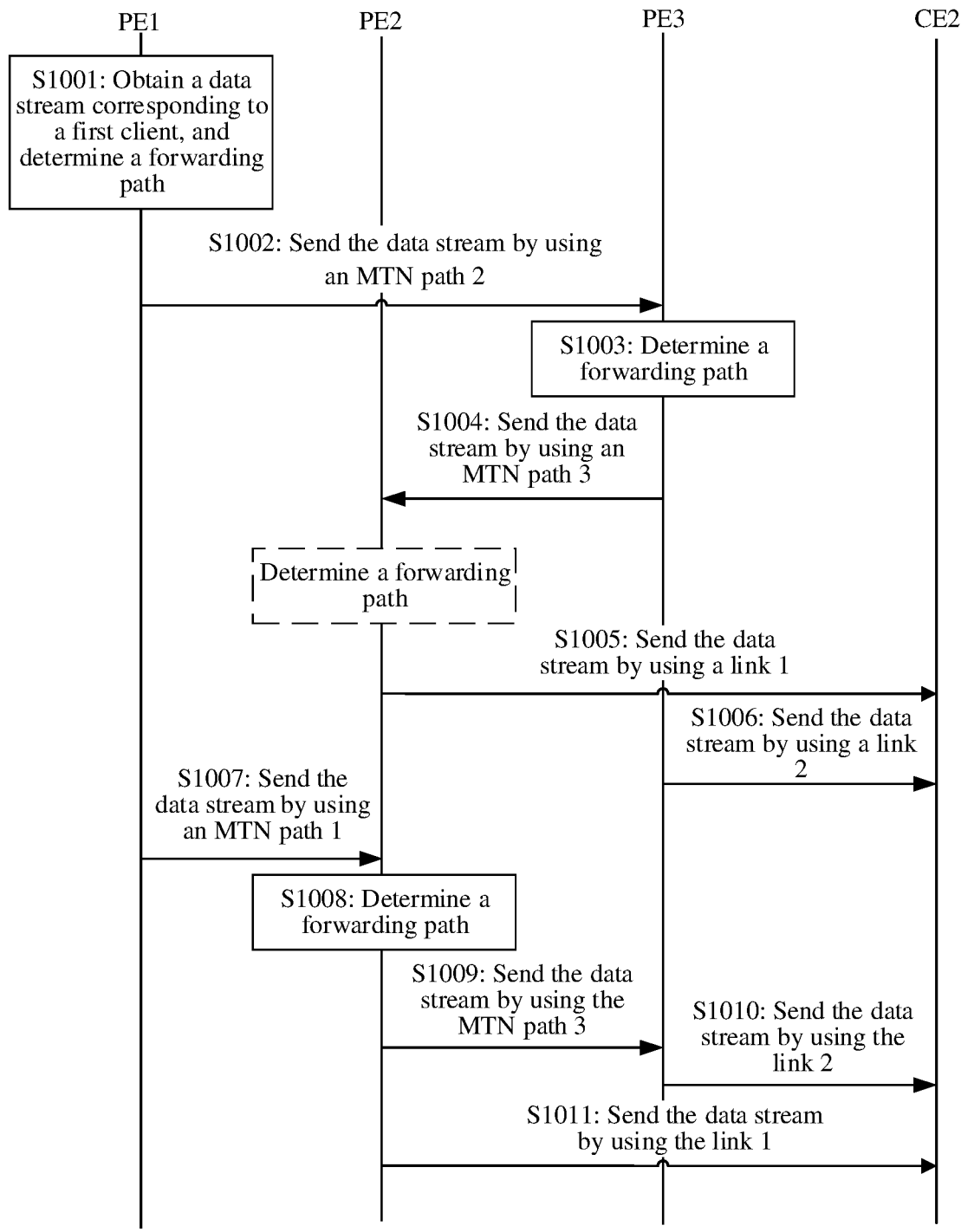
FIG. 10 is a flowchart of still another multi-homing communication method in a network according to an embodiment of this application.

The application scenario shown in FIG. 3a is used as an example. FIG. 10 is a flowchart of a multi-homing communication method in a network according to an embodiment of this application. The following uses a direction of a data stream from the CE1 to the CE2 as an example for description. The method 1000 may include the following steps.

S1001: The PE1 obtains a data stream corresponding to a first client, and determines a forwarding path based on the data stream.

S1002: When the forwarding path is the MTN path 2, the PE1 transmits the data stream to the PE3 by using the MTN path 2.

In this embodiment, the PE1 may receive the data stream corresponding to the first client that is sent by the CE1, and determine a corresponding forwarding path based on the data stream. Specifically, the PE1 may search a forwarding table for the forwarding path. When the forwarding path is the MTN path 2, it indicates that the MTN path 1 is unavailable, and the PE1 sends the data stream to the PE3 by using the MTN path 2.

That the MTN path 1 is unavailable may include the following cases: One case is that the MTN path 1 itself is faulty, and another case is that the MTN path 1 is unavailable due to a PE2 node fault, or the MTN path 1 is configured by a user as a protection path. When the MTN path 1 is faulty, for a specific implementation in which the PE1 determines that the MTN path 1 is faulty and switches from the MTN path 1 to the MTN path 2, refer to the detailed descriptions in the method 400 or the method 600. Same or similar parts are not described herein again in this embodiment. For a specific implementation in which the PE2 node is faulty, and the PE1 determines that the PE2 node is faulty and switches from the MTN path 1 to the MTN path 1, refer to the method 700 or the method 800.

S1003: The PE3 determines a forwarding path based on the data stream.

S1004: When the forwarding path is the MTN path 3, the PE3 forwards the data stream to the PE2 by using the MTN path 3.

In this embodiment, when the MTN path 1 is faulty, the PE3 may start the MTN path 3, that is, configure the MTN path 3 to be in an active state. For specific implementations in which the PE3 determines that the MTN path 1 is faulty and configures the MTN path 3 to be in an active state, refer to the method 400 or the method 600.

S1005: The PE2 forwards the data stream to the CE2 by using the link 1.

S1006: When the forwarding path is the link 2, the PE3 forwards the data stream to the CE2 by using the link 2.

In this embodiment, when the MTN path 1 is faulty, the PE3 may not start the MTN path 3, but start the link 2, that is, configure the link 2 to be in an active state. Alternatively, when the PE2 node is faulty or the link 1 is faulty, the PE3 configures the link 2 to be in an active state. For a manner in which the PE3 determines that the PE2 node is faulty, refer to the method 700 or the method 800; and for a manner in which the PE3 determines that the link 1 is faulty, refer to the method 900.

S1007: When the forwarding path is the MTN path 1, the PE1 transmits the data stream to the PE2 by using the MTN path 1.

In this embodiment, the PE1 may receive the data stream corresponding to the first client (client) that is sent by the CE1, and determine a corresponding forwarding path based on the data stream. Specifically, the PE1 searches a forwarding table for the forwarding path. When the forwarding path is a second MTN path, it indicates that the second MTN path is available, that is, in an active state. In this case, the PE1 sends the data stream to the PE2 by using the MTN path 1.

S1008: The PE2 determines a forwarding path based on the data stream.

S1009: When the forwarding path is the MTN path 3, the PE2 transmits the data stream to the PE3 by using the MTN path 3.

In this embodiment, when the forwarding path determined by the PE2 is the MTN path 3, it indicates that the link 1 is faulty, and the PE2 configures the MTN path 3 to be in an active state, so as to transmit the data stream by using the MTN path 3. For a specific implementation in which the PE2 determines that the link 1 is faulty and the PE2 configures the MTN path 3 to be in an active state, refer to related descriptions in the method 900.

S1010: The PE3 sends the data stream to the CE2 by using the link 2.

S1011: When the forwarding path is the link 1, the PE2 transmits the data stream to the CE2 by using the link 1.

For the application scenario shown in FIG. 3*a* or FIG. 3*b*, not only a problem of data stream transmission interruption caused by a path fault or a node fault can be resolved, but also load sharing of data streams can be implemented. For ease of understanding, the following provides descriptions with reference to the accompanying drawings.

Figure 11:
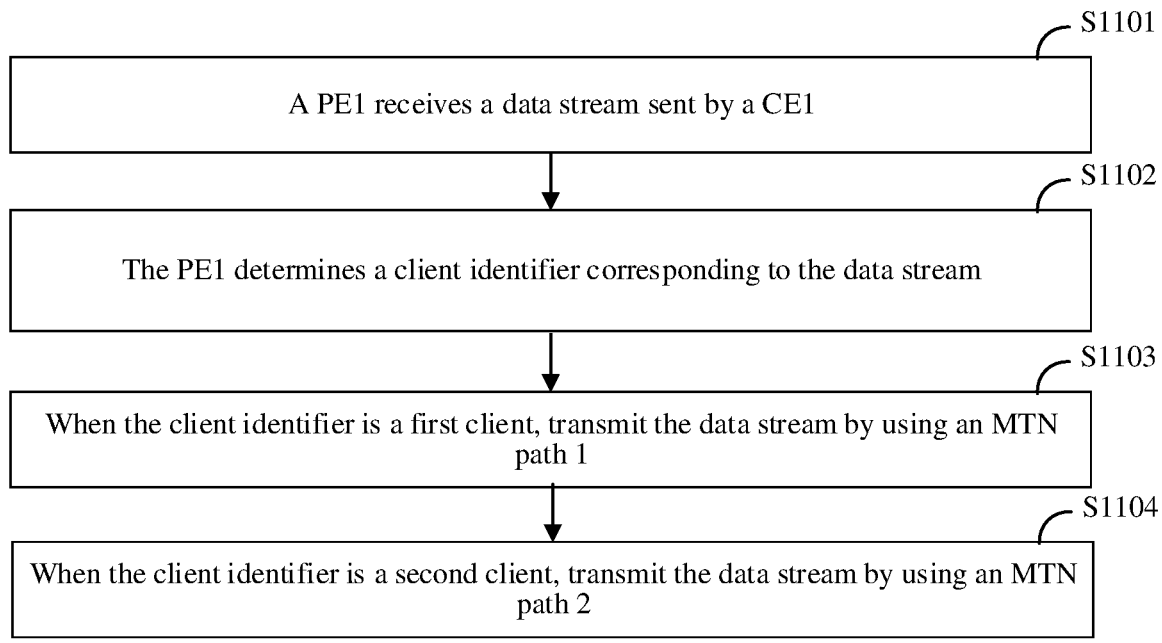
FIG. 11 is a flowchart of still another multi-homing communication method in a network according to an embodiment of this application.

FIG. 11 is a flowchart of a multi-homing communication method in a network according to an embodiment of this application. The method 1100 may include the following steps.

S1101: The PE1 receives a data stream sent by the CE1.

In the application scenario shown in FIG. 3 *a* or FIG. 3*b*, an example in which the CE1 sends a data stream to the CE2 is used for description. In this application scenario, the CE1 may provide services for a plurality of clients. For example, the CE1 corresponds to a client 1 and a client 2, and both the client 1 and the client 2 may send data streams to the CE2 by using the CE1.

S1102: The PE1 determines a client identifier corresponding to the data stream.

In this embodiment, when a client sends a data stream to the CE1, the data stream may include a client identifier, so that the client that sends the data stream can be indicated through the client identifier. In a specific implementation, forwarding paths corresponding to data streams of different clients may be preconfigured in the PE1. When receiving a data stream from the CE1, the PE1 determines a client identifier by parsing the data stream, so as to determine a forwarding path based on the client identifier and a correspondence between the client identifier and the forwarding path, so as to forward the data stream by using the forwarding path corresponding to the client identifier.

S1103: When the client identifier is a first client, the PE1 transmits the data stream by using the MTN path 1.

In this embodiment, when the client identifier is the first client, the PE1 may transmit the data stream by using the MTN path 1. That is, the PE1 transmits the data stream to the PE2 by using the MTN path 1. It should be noted that when the data stream received by the PE1 is an Ethernet frame, before the PE1 sends the data stream to the PE2, the PE1 divides the data stream into one or more code blocks of a size of 64 B/66 B, and then forwards the code blocks to the PE2 by using the MTN path 1.

S1104: When the client identifier is a second client, the PE1 transmits the data stream by using the MTN path 2.

In this embodiment, when the client identifier is the second client, the PE1 may transmit the data stream by using the MTN path 2. That is, the PE1 transmits the data stream to the PE3 by using the MTN path 2. It should be noted that when the data stream received by the PE1 is an Ethernet frame, before the PE1 sends the data stream to the PE3, the PE1 divides the data stream into one or more code blocks of a size of 64 B/66 B, and then forwards the code blocks to the PE3 by using the MTN path 2.

It may be understood that load sharing may also be performed for the PE2 and the PE3 nodes and the PE4 in FIG. 3*b*, and data streams of different clients are forwarded by using different forwarding paths. For specific implementations, refer to related descriptions of S1101 to S1104.

Figure 12A:
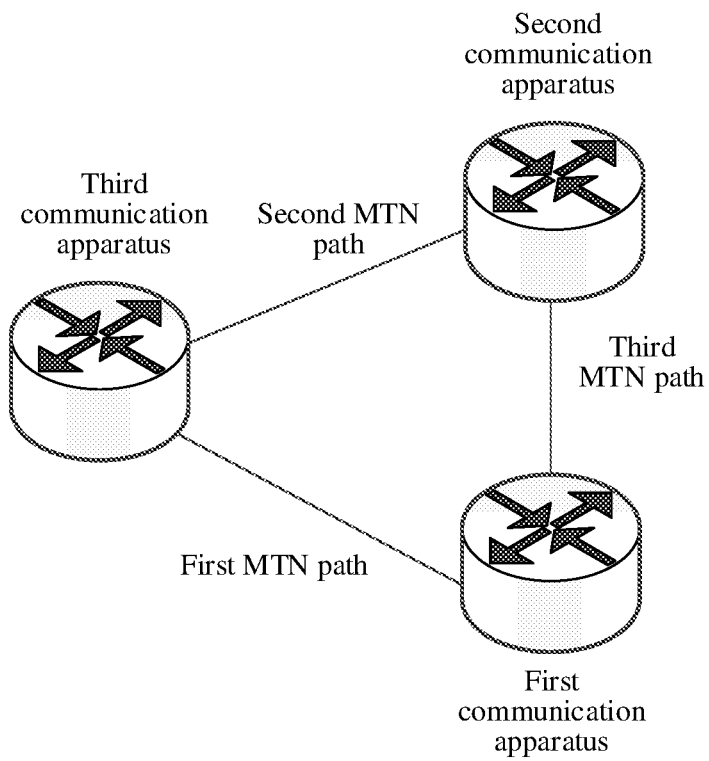
FIG. 12a is a structural diagram of a communication system according to an embodiment of this application.

FIG. 12*a* is a structural diagram of an MTN multi-homing communication system according to an embodiment of this application. The MTN communication system includes a first communication apparatus 101, a second communication apparatus 102, and a third communication apparatus 103. The third communication apparatus 103 is connected to the first communication apparatus 101 and the second communication apparatus 102 by using a first MTN path and a second MTN path respectively, and the first communication apparatus 101 is communicatively connected to the second communication apparatus by using a third MTN path. In an implementation, the MTN communication system shown in FIG. 12*a* may further include a fourth communication apparatus 104. The fourth communication apparatus 104 is connected to the first communication apparatus 101 and the second communication apparatus 102 by using a first path and a second path respectively, as shown in FIG. 12*b*.

Figure 12B:
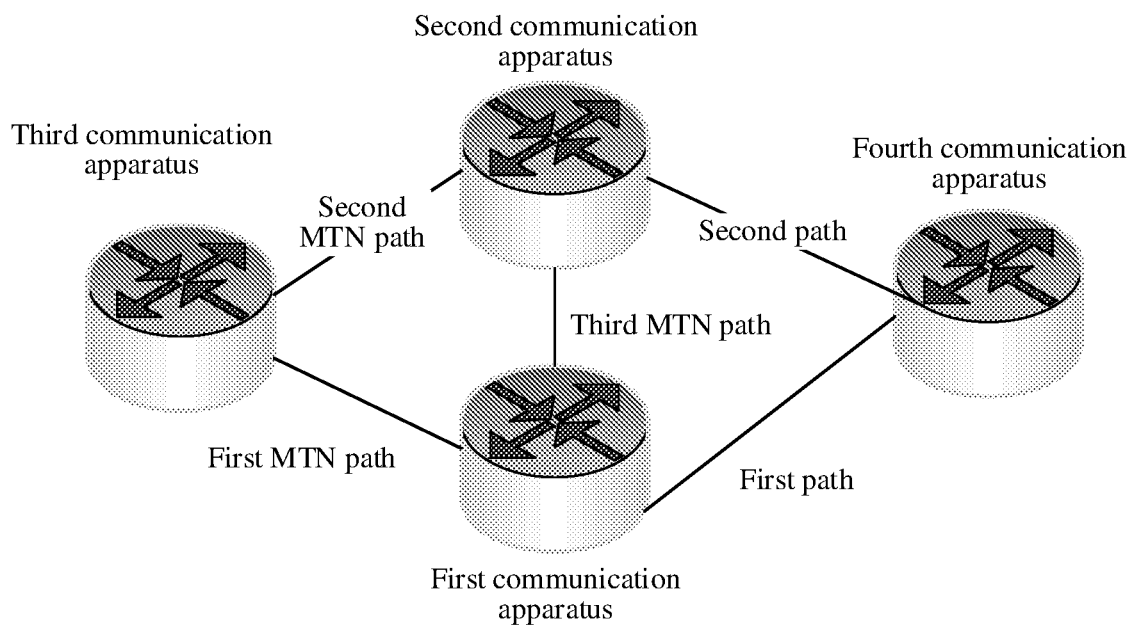
FIG. 12b is a structural diagram of another communication system according to an embodiment of this application.

The communication system shown in FIG. 12*a* or FIG. 12*b* may be applied to the network scenario shown in FIG. 3*a* or FIG. 3*b*. For example, the first communication apparatus 101, the second communication apparatus 102, and the third communication apparatus 103 may respectively correspond to the PE1, the PE2, and the PE3 shown in FIG. 3*a* or FIG. 3*b*. The first MTN path may be, for example, the MTN path 2, and the second MTN path may be, for example, the MTN path 1. The fourth communication apparatus 104 may be, for example, the CE2 shown in FIG. 3*a* or the PE4 shown in FIG. 3*b*. The communication system in FIG. 12*a* or FIG. 12*b* may be configured to perform the method in any one of the foregoing method embodiments.

Figure 13:
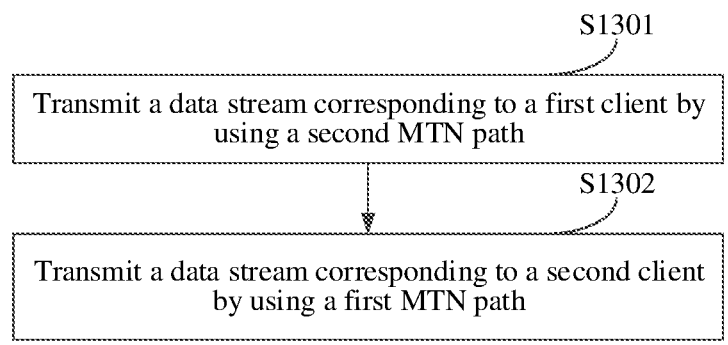
FIG. 13 is a flowchart of still another multi-homing communication method in a network according to an embodiment of this application.

FIG. 13 is a flowchart of a multi-homing communication method 1300 in a network according to an embodiment of this application. The network includes a first communication apparatus, a second communication apparatus, and a third communication apparatus. The third communication apparatus is connected to the first communication apparatus and the second communication apparatus by using a first MTN path and a second MTN path respectively. The method 1300 may be applied to the network architecture shown in FIG. 3*a*, FIG. 3*b*, FIG. 12*a*, or FIG. 12*b*. The method 1300 may be specifically configured to perform one or more operations in the method 400, the method 600, the method 700, the method 800, the method 1000, and the method 1100. The method 1300 includes the following step.

S1301: Transmit a data stream corresponding to a first client by using the second MTN path.

When the method 1300 is specifically used for implementing the method 1000, S1301 may be performed by the third communication apparatus or the second communication apparatus. The third communication apparatus may be, for example, the PE1 in FIG. 3*a*, the second communication apparatus may be, for example, the PE2 in FIG. 3*a*, and the second MTN path corresponds to the MTN path 1 in the method 1000. Alternatively, the third communication apparatus may be, for example, the PE2 in FIG. 3*a*, the second communication apparatus may be, for example, the PE3 in FIG. 3*a*, and the second MTN path corresponds to the MTN path 3 in the method 1000. Alternatively, the third communication apparatus may be, for example, the PE3 in FIG. 3*a*, the second communication apparatus may be, for example, the PE1 in FIG. 3*a*, and the second MTN path is the MTN path 2 in the method 1000.

For a load sharing scenario, the method 1300 may further include the following step.

S1302: Transmit a data stream corresponding to a second client by using the first MTN path.

For the MTN communication system shown in FIG. 12*a*, not only load sharing can be implemented, but also a problem that a data stream cannot be transmitted due to a path fault or a node fault can be resolved. For an implementation of load sharing, when the method 1300 specifically implements the method 1100, S1301 and S1302 may be performed by the third communication apparatus. The third communication apparatus is, for example, the PE1 in FIG. 3*a*, the first communication apparatus is, for example, the PE3 in FIG. 3*a*, the first MTN path corresponds to the MTN path 2 in the method 1100, and the second MTN path corresponds to the MTN path 1 in the method 1100. Alternatively, the third communication apparatus is, for example, the PE2 in FIG. 3*a*, the second communication apparatus is, for example, the PE1 in FIG. 3*a*, and the first MTN path corresponds to the MTN path 1 in the method 1100. Alternatively, the third communication apparatus is, for example, the PE3 in FIG. 3*a*, the second communication apparatus is, for example, the PE2 in FIG. 3*a*, and the first MTN path corresponds to the MTN path 3 in the method 1100.

Specifically, when the second MTN path is available, the data stream corresponding to the first client is transmitted by using the second MTN path; and when the second MTN path is unavailable, the data stream corresponding to the first client is transmitted by using the first MTN path.

When the method 1300 specifically implements the method 1000, the third communication apparatus may be, for example, the PE1 in FIG. 3*a*, the second communication apparatus may be, for example, the PE2 in FIG. 3*a*, the first communication apparatus may be, for example, the PE3 in FIG. 3*a*, the second MTN path corresponds to the MTN path 1 in the method 1000, and the first MTN path corresponds to the MTN path 2 in the method 1000. The third communication apparatus is, for example, the PE2 in FIG. 3*a*, the second communication apparatus is, for example, the PE3 in FIG. 3*a*, the first communication apparatus is, for example, the PE1 in FIG. 3*a*, the second MTN path corresponds to the MTN path 3 in the method 1000, and the first MTN path may correspond to the MTN path 1 in the method 1000. The third communication apparatus may be, for example, the PE3 in FIG. 3*a*, the second communication apparatus may be, for example, the PE1 in FIG. 3*a*, and the first communication apparatus may be, for example, the PE2 in FIG. 3*a*, the second MTN path corresponds to the MTN path 2 in the method 1000, and the first MTN path may correspond to the MTN path 3 in the method 1000.

In an implementation, before the data stream corresponding to the first client is transmitted by using the first MTN path, the method further includes: determining, based on a first indication sent by the second communication apparatus, that the second MTN path is faulty, where the first indication indicates that the second MTN path is faulty.

When the method 1300 specifically implements the method 400, the second MTN path may correspond to the MTN path 1 in the method 400, the second communication apparatus may be, for example, the PE2 in FIG. 3*a*, and the first indication may correspond to the indication 1 in the method 400.

Alternatively, the second communication apparatus may be, for example, the PE3 in FIG. 3*a*, the first indication may correspond to the indication 2 in the method 400, and the second MTN path may correspond to the MTN path 1 in the method 400.

When the method 1300 specifically implements the method 600, the second MTN path corresponds to the MTN path 1 in the method 600. The second communication apparatus may be, for example, the PE1 in FIG. 3*a*, and the first indication may correspond to the indication 3 in the method 600. Alternatively, the second communication apparatus may be, for example, the PE2 in FIG. 3*a*, and the first indication may correspond to the indication 4 in the method 600.

When the method 1300 specifically implements the method 700, the second communication apparatus may be, for example, the PE1 in FIG. 3*a*, the first indication may correspond to the indication 5 in the method 700, and the second MTN path may correspond to the MTN path 1 in the method 700.

When the method 1300 specifically implements the method 800, the second communication apparatus may be, for example, the PE3 in FIG. 3*a*, the first indication may correspond to the indication 6 in the method 800, and the second MTN path may correspond to the MTN path 1 in the method 800.

When the method 1300 specifically implements the method 900, the second communication apparatus may be, for example, the PE2 in FIG. 3*a*, the first indication may correspond to the indication 7 in the method 900, and the second MTN path is the link 1.

In an implementation, before the determining that the second MTN path is faulty, the method further includes: receiving, by the first communication apparatus, the first indication from the second communication apparatus.

When the method 1300 specifically implements the method 400, the second communication apparatus may be, for example, the PE2 in FIG. 3*a*, and the first indication may correspond to the indication 1 in the method 400. The first communication apparatus may be, for example, the PE3 in FIG. 3*a*, or the first communication apparatus may be the PE1 in FIG. 3*a*.

When the method 1300 specifically implements the method 600, the second communication apparatus may be, for example, the PE1 in FIG. 3*a*, the first indication may correspond to the indication 3 in the method 600, and the second MTN path may correspond to the MTN path 1 in the method 600. The first communication apparatus may be, for example, the PE2 in FIG. 3*a*, or the first communication apparatus may be, for example, the PE3 in FIG. 3*a*.

When the method 1300 specifically implements the method 700, the second communication apparatus may be, for example, the PE1 in FIG. 3*a*, the first communication apparatus may be, for example, the PE3 in FIG. 3*a*, and the first indication may correspond to the indication 5 in the method 700.

When the method 1300 specifically implements the method 800, the second communication apparatus may be, for example, the PE3 in FIG. 3*a*, the first communication apparatus may be, for example, the PE1 in FIG. 3*a*, and the first indication may correspond to the indication 6 in the method 800.

When the method 1300 specifically implements the method 900, the second communication apparatus may be, for example, the PE2 in FIG. 3*a*, the first communication apparatus may be, for example, the PE3 in FIG. 3*a*, and the first indication may correspond to the indication 7 in the method 900.

In an implementation, the first indication is carried in a dual-homing coordination DHC message.

For related descriptions of the DHC message, refer to related descriptions in the foregoing method embodiments. Details are not described herein again.

In an implementation, after the receiving the first indication, the method further includes: sending, by the first communication apparatus, a second indication to the third communication apparatus, to indicate the third communication apparatus to switch a transmission path of the data stream corresponding to the first client from the second MTN path to the first MTN path.

When the method 1300 specifically implements the method 400, the second indication may correspond to the indication 2 in the method 400, the first communication apparatus may correspond to the PE3 in the method 400, the third communication apparatus may correspond to the PE1 in the method 400, the second MTN path may correspond to the MTN path 1 in the method 400, and the first MTN path may correspond to the MTN path 2 in the method 400.

When the method 1300 specifically implements the method 600, the second indication may correspond to the indication 4 in the method 600, the first communication apparatus may correspond to the PE2 in the method 600, and the third communication apparatus may correspond to the PE3 in the method 600.

In an implementation, the second indication is carried in an automatic protection switching APS message.

For related descriptions of the APS message, refer to the related descriptions in the foregoing method embodiments. Details are not described herein again.

In an implementation, before the data stream corresponding to the first client is transmitted by using the first MTN path, the method further includes: receiving, by the third communication apparatus, the first indication from the second communication apparatus.

When the method 1300 specifically implements the method 400, the first indication may correspond to the indication 1 in the method 400, the second communication apparatus may correspond to the PE2 in the method 400, and the third communication apparatus may correspond to the PE1 in the method 400, or the third communication apparatus may correspond to the PE3 in the method 400.

When the method 1300 specifically implements the method 600, the second communication apparatus may be, for example, the PE1 in FIG. 3*a*, the first indication may correspond to the indication 3 in the method 600, and the second MTN path may correspond to the MTN path 1 in the method 600. The third communication apparatus may be, for example, the PE2 in FIG. 3*a*, or the third communication apparatus may be, for example, the PE3 in FIG. 3*a*.

When the method 1300 specifically implements the method 700, the second communication apparatus may be, for example, the PE1 in FIG. 3*a*, the third communication apparatus may be, for example, the PE3 in FIG. 3*a*, and the first indication may correspond to the indication 5 in the method 700.

When the method 1300 specifically implements the method 800, the second communication apparatus may be, for example, the PE3 in FIG. 3*a*, the third communication apparatus may be, for example, the PE1 in FIG. 3*a*, and the first indication may correspond to the indication 6 in the method 800.

When the method 1300 specifically implements the method 900, the second communication apparatus may be, for example, the PE2 in FIG. 3*a*, the third communication apparatus may be, for example, the PE3 in FIG. 3*a*, and the first indication may correspond to the indication 7 in the method 900.

In an implementation, the first indication is carried in an operation, administration and maintenance OAM message.

For related descriptions of the OAM message, refer to the related descriptions in the foregoing method embodiments. Details are not described herein again.

In an implementation, before the data stream corresponding to the first client is transmitted by using the first MTN path, the method further includes: receiving, by the third communication apparatus, an indication information sent by the first communication apparatus, where the indication information instructs the third communication apparatus to switch the second MTN path to the first MTN path.

When the method 1300 specifically implements the method 400, the first MTN path corresponds to the MTN path 2 in the method 400, and the second MTN path corresponds to the MTN path 1 in the method 400. The first communication apparatus may correspond to the PE2 in the method 40000, the third communication apparatus may correspond to the PE3 or the PE1 in the method 400, and the indication information may correspond to the indication 1 in the method 400. Alternatively, the first communication apparatus may correspond to the PE3 in the method 400, the third communication apparatus may correspond to the PE1 in the method 400, and the indication information may correspond to the indication 2 in the method 400.

When the method 1300 can implement the method 600, the first MTN path corresponds to the MTN path 2 in the method 600, and the second MTN path corresponds to the MTN path 1 in the method 600. The first communication apparatus may correspond to the PE1 in the method 600, the third communication apparatus corresponds to the PE2 or the PE3 in the method 600, and the indication information may correspond to the indication 3 in the method 600. Alternatively, the first communication apparatus may correspond to the PE2 in the method 600, the third communication apparatus may correspond to the PE3 in the method 600, and the indication information may correspond to the indication 4 in the method 600.

When the method 1300 specifically implements the method 700, the first communication apparatus may correspond to the PE1 in the method 700, the third communication apparatus may correspond to the PE3 in the method 700, the first MTN path corresponds to the MTN path 2 in the method 700, and the second MTN path corresponds to the MTN path 1 in the method 700. The indication information mentioned herein may correspond to the indication 5 in the method 700.

When the method 1300 specifically implements the method 800, the indication information mentioned herein may correspond to the indication 6 in the method 800, the third communication apparatus mentioned herein may correspond to the PE1 in the method 800, the first communication apparatus mentioned herein may correspond to the PE3 in the method 800, the second MTN path corresponds to the MTN path 1 in the method 800, and the first MTN path corresponds to the MTN path 2 in the method 800.

When the method 1300 specifically implements the method 900, the first communication apparatus may correspond to the PE2 in the method 900, the third communication apparatus may correspond to the PE3 in the method 900, the indication information corresponds to the indication 7 in the method 900, the first MTN path corresponds to the link 2 in the method 900, and the second MTN path corresponds to the link 1 in the method 900.

In an implementation, before the data stream corresponding to the first client is transmitted by using the first MTN path, the method further includes: determining, based on a third indication sent by the third communication apparatus, that the second MTN path is faulty, where the third indication indicates that the second MTN path is faulty.

When the method 1300 specifically implements the method 400, the second MTN path may correspond to the MTN path 1 in the method 400, the third communication apparatus may be, for example, the PE2 in FIG. 3a, the third indication may correspond to the indication 1 in the method 400. Alternatively, the third communication apparatus may be, for example, the PE3 in FIG. 3a, the third indication may correspond to the indication 2 in the method 400, and the second MTN path may correspond to the MTN path 1 in the method 400.

When the method 1300 specifically implements the method 600, the second MTN path corresponds to the MTN path 1 in the method 600. The third communication apparatus may be, for example, the PE1 in FIG. 3a, and the third indication may correspond to the indication 3 in the method 600. Alternatively, the third communication apparatus may be, for example, the PE2 in FIG. 3a, and the third indication may correspond to the indication 4 in the method 600.

When the method 1300 specifically implements the method 700, the third communication apparatus may be, for example, the PE1 in FIG. 3a, the third indication may correspond to the indication 5 in the method 700, and the second MTN path may correspond to the MTN path 1 in the method 700.

When the method 1300 specifically implements the method 800, the third communication apparatus may be, for example, the PE3 in FIG. 3a, the third indication may correspond to the indication 6 in the method 800, and the second MTN path may correspond to the MTN path 1 in the method 800.

When the method 1300 specifically implements the method 900, the third communication apparatus may be, for example, the PE2 in FIG. 3a, the third indication may correspond to the indication 7 in the method 900, and the second MTN path is the link 1.

In an implementation, the third indication is sent by the third communication apparatus to the first communication apparatus.

When the method 1300 specifically implements the method 400, the third communication apparatus may be, for example, the PE2 in FIG. 3a, and the third indication may correspond to the indication 1 in the method 400. The first communication apparatus may be, for example, the PE3 in FIG. 3a, or the first communication apparatus may be the PE1 in FIG. 3a.

When the method 1300 specifically implements the method 600, the third communication apparatus may be, for example, the PE1 in FIG. 3a, the third indication may correspond to the indication 3 in the method 600, and the second MTN path may correspond to the MTN path 1 in the method 600. The first communication apparatus may be, for example, the PE2 in FIG. 3a, or the first communication apparatus may be, for example, the PE3 in FIG. 3a.

When the method 1300 specifically implements the method 700, the third communication apparatus may be, for example, the PE1 in FIG. 3a, the first communication apparatus may be, for example, the PE3 in FIG. 3a, and the third indication may correspond to the indication 5 in the method 700.

When the method 1300 specifically implements the method 800, the third communication apparatus may be, for example, the PE3 in FIG. 3a, the first communication apparatus may be, for example, the PE1 in FIG. 3a, and the third indication may correspond to the indication 6 in the method 800.

When the method 1300 specifically implements the method 900, the third communication apparatus may be, for example, the PE2 in FIG. 3a, the first communication apparatus may be, for example, the PE3 in FIG. 3a, and the third indication may correspond to the indication 7 in the method 900.

In an implementation, the third indication is carried in an automatic protection switching APS message.

For related descriptions of the APS message, refer to the related descriptions in the foregoing method embodiments. Details are not described herein again.

In an implementation, the third indication is sent by the third communication apparatus to the second communication apparatus.

When the method 1300 specifically implements the method 400, the third communication apparatus may be, for example, the PE2 in FIG. 3*a*, and the third indication may correspond to the indication 1 in the method 400. The second communication apparatus may be, for example, the PE3 in FIG. 3*a*, or the second communication apparatus may be the PE1 in FIG. 3*a*.

When the method 1300 specifically implements the method 600, the third communication apparatus may be, for example, the PE1 in FIG. 3*a*, the third indication may correspond to the indication 3 in the method 600, and the second MTN path may correspond to the MTN path 1 in the method 600. The second communication apparatus may be, for example, the PE2 in FIG. 3*a*, or the second communication apparatus may be, for example, the PE3 in FIG. 3*a*.

When the method 1300 specifically implements the method 700, the third communication apparatus may be, for example, the PE1 in FIG. 3*a*, the second communication apparatus may be, for example, the PE3 in FIG. 3*a*, and the third indication may correspond to the indication 5 in the method 700.

When the method 1300 specifically implements the method 800, the third communication apparatus may be, for example, the PE3 in FIG. 3*a*, the second communication apparatus may be, for example, the PE1 in FIG. 3*a*, and the third indication may correspond to the indication 6 in the method 800.

When the method 1300 specifically implements the method 900, the third communication apparatus may be, for example, the PE2 in FIG. 3*a*, the second communication apparatus may be, for example, the PE3 in FIG. 3*a*, and the third indication may correspond to the indication 7 in the method 900.

In an implementation, the third indication is carried in an operation, administration and maintenance OAM message.

For related descriptions of the OAM message, refer to the related descriptions in the foregoing method embodiments. Details are not described herein again.

In an implementation, before the data stream corresponding to the first client is transmitted by using the first MTN path, the method further includes: sending, by the second communication apparatus, a first indication to the first communication apparatus or the third communication apparatus, where the first indication indicates that the second MTN path is faulty.

When the method 1300 specifically implements the method 400, the first indication mentioned herein may correspond to the indication 1 in the method 400, the second communication apparatus corresponds to the PE2 in the method 400, the first communication apparatus corresponds to the PE3 in the method 400, and the third communication apparatus corresponds to the PE1 in the method 400.

When the method 1300 specifically implements the method 600, the first indication mentioned herein may correspond to the indication 3 in the method 400, the second communication apparatus corresponds to the PE1 in the method 400, the first communication apparatus may correspond to the PE3 in the method 400, and the third communication apparatus may correspond to the PE1 in the method 400.

In an implementation, the first indication is carried in a dual-homing coordination DHC message or an operation, administration and maintenance OAM message.

For the DHC message and the OAM message mentioned herein, refer to the related descriptions in the foregoing method embodiments. Details are not described herein again.

In an implementation, the MTN communication system may further include a fourth communication apparatus 104. The fourth communication apparatus 104 is connected to the first communication apparatus 101 and the second communication apparatus 102 by using a first path and a second path respectively, as shown in FIG. 12*b*.

In an example, the fourth communication apparatus mentioned herein may correspond to the CE2 in FIG. 3*a*, the first communication apparatus is, for example, the PE3 in FIG. 3*a*, the second communication apparatus is, for example, the PE2 in FIG. 3*a*, the first path mentioned herein may correspond to the link 2 in FIG. 3*a*, and the second path mentioned herein may correspond to the link 1 in FIG. 3*a*.

In another example, the fourth communication apparatus mentioned herein may be, for example, the PE1 in FIG. 3*a*, the first communication apparatus may be, for example, the PE3 in FIG. 3*a*, the second communication apparatus may be, for example, the PE2 in FIG. 3*a*, the first path may correspond to the MTN path 2 in FIG. 3*a*, and the second path may correspond to the MTN path 1 in FIG. 3*a*.

In an implementation, the first communication apparatus and the second communication apparatus are communicatively connected by using a third MTN path, and the method further includes: when the second path is available and the second MTN path is unavailable, transmitting the data stream corresponding to the first client by using the first MTN path, the third MTN path, and the second path.

When the method 1300 specifically implements the method 1000, the fourth communication apparatus is, for example, the CE2 in FIG. 3*a*, the first communication apparatus is, for example, the PE3 in FIG. 3*a*, the second communication apparatus is, for example, the PE2 in FIG. 3*a*, the third communication apparatus is, for example, the PE1 in FIG. 3*a*, the first MTN path mentioned herein may correspond to the MTN path 2 in the method 1000, the third MTN path mentioned herein may correspond to the MTN path 3 in the method 1000, and the second path mentioned herein may correspond to the link 1 in the method 1000. Alternatively, the fourth communication apparatus is, for example, the PE1 in FIG. 3*a*, the first communication apparatus may be, for example, the PE3 in FIG. 3*a*, the second communication apparatus may be, for example, the PE2 in FIG. 3*a*, the third communication apparatus is, for example, the CE2 in FIG. 3*a*, the second path may correspond to the MTN path 1 in the method 1000, the first MTN path corresponds to the link 2 in the method 1000, and the third MTN path may correspond to the MTN path 3 in the method 1000.

In a possible implementation, the first communication apparatus and the second communication apparatus are communicatively connected by using a third MTN path, and the method further includes: when the second MTN path is available and the second path is unavailable, transmitting the data stream corresponding to the first client by using the second MTN path, the third MTN path, and the first path.

When the method 1300 specifically implements the method 1000, the fourth communication apparatus is, for example, the CE2 in FIG. 3*a*, the first communication apparatus is, for example, the PE3 in FIG. 3*a*, the second communication apparatus is, for example, the PE2 in FIG.

3*a*, the third communication apparatus is, for example, the PE1 in FIG. 3*a*, the second MTN path mentioned herein may correspond to the MTN path 1 in the method 1000, the second path mentioned herein may correspond to the link 1 in the method 1000, the third MTN path mentioned herein may correspond to the MTN path 3 in the method 1000, and the first path mentioned herein may correspond to the link 2 in the method 1000. Alternatively, the fourth communication apparatus is, for example, the PE1 in FIG. 3*a*, the first communication apparatus may be, for example, the PE3 in FIG. 3*a*, the second communication apparatus may be, for example, the PE2 in FIG. 3*a*, the third communication apparatus is, for example, the CE2 in FIG. 3*a*, the first path may correspond to the MTN path 2 in the method 1000, the second MTN path corresponds to the link 1 in the method 1000, and the third MTN path may correspond to the MTN path 3 in the method 1000.

In an implementation, the method further includes: when both the second path and the second MTN path are unavailable, transmitting the data stream corresponding to the first client by using the first MTN path and the first path.

When the method 1300 specifically implements the method 1000, the fourth communication apparatus is, for example, the CE2 in FIG. 3*a*, the first communication apparatus is, for example, the PE3 in FIG. 3*a*, the second communication apparatus is, for example, the PE2 in FIG. 3*a*, the third communication apparatus is, for example, the PE1 in FIG. 3*a*, the second path mentioned herein may correspond to the link 1 in the method 1000, the second MTN path mentioned herein may correspond to the MTN path 1 in the method 1000, the first MTN path mentioned herein may correspond to the MTN path 2 in the method 1000, and the first path mentioned herein may correspond to the link 2 in the method 1000. Alternatively, the fourth communication apparatus is, for example, the PE1 in FIG. 3*a*, the first communication apparatus may be, for example, the PE3 in FIG. 3*a*, the second communication apparatus may be, for example, the PE2 in FIG. 3*a*, the third communication apparatus is, for example, the CE2 in FIG. 3*a*, the first path may correspond to the MTN path 2 in the method 1000, the first MTN path corresponds to the link 2 in the method 1000, and the third MTN path may correspond to the MTN path 3 in the method 1000.

Figure 14:
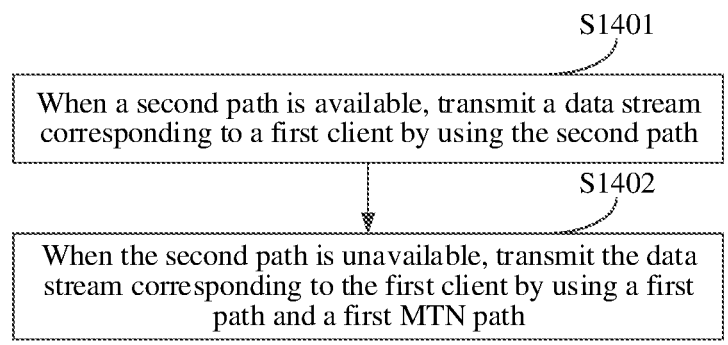
FIG. 14 is a flowchart of still another multi-homing communication method in a network according to an embodiment of this application.

FIG. 14 is a flowchart of a multi-homing communication method in a network according to an embodiment of this application. The multi-homing communication method 1400 shown in FIG. 14 may be applied to the MTN communication system shown in FIG. 3*a*, FIG. 3*b*, or FIG. 12*b*. The method may include the following step.

S1401: When the second path is available, transmit a data stream corresponding to a first client by using the second path.

For a scenario in which the second path is unavailable, the method 1400 may further include the following step.

S1402: When the second path is unavailable, transmit the data stream corresponding to the first client by using the first path and the first MTN path.

When the method 1400 specifically implements the method 1000, the third communication apparatus is the CE2 in the method 1000, the second communication apparatus is the PE2 in the method 1000, the first communication apparatus is the PE3 in the method 1000, the second path is the link 1 in the method 1000, the first path is the link 2 in the method 1000, and the first MTN path is the MTN path 3 in the method 1000. Alternatively, the third communication apparatus is the PE1 in the method 1000, the second communication apparatus is the PE2 in the method 1000, the first communication apparatus is the PE3 in the method 1000, the first path is the MTN path 2 in the method 1000, the second path is the MTN path 1 in the method 1000, and the first MTN path is the MTN path 3 in the method 1000.

In an implementation, when the second path is available, the transmitting a data stream corresponding to a first client by using the second path includes: transmitting the data stream corresponding to the first client by using the first MTN path and the second path.

When the method 1400 specifically implements the method 1000, the third communication apparatus is the CE2 in the method 1000, the second communication apparatus is the PE2 in the method 1000, the first communication apparatus is the PE3 in the method 1000, the first MTN path mentioned herein corresponds to the MTN path 3 in the method 1000, and the second path mentioned herein corresponds to the link 1 in the method 1000. Alternatively, the third communication apparatus is the PE1 in the method 1000, the second communication apparatus is the PE2 in the method 1000, the first communication apparatus is the PE3 in the method 1000, the second path is the MTN path 1 in the method 1000, and the first MTN path is the MTN path 3 in the method 1000.

In an implementation, when the second path is unavailable, the method further includes: determining, by the first communication apparatus based on an indication information sent by the second communication apparatus, that the second path is faulty, where the indication information indicates that the second path is faulty.

When the method 1400 specifically implements the method 400, the second communication apparatus may be, for example, the PE2 in FIG. 3*a*, and the indication information may correspond to the indication 1 in the method 400. The first communication apparatus may be, for example, the PE3 in FIG. 3*a*, or the first communication apparatus may be the PE1 in FIG. 3*a*.

When the method 1400 specifically implements the method 600, the second communication apparatus may be, for example, the PE1 in FIG. 3*a*, the indication information may correspond to the indication 3 in the method 600, and the second path may correspond to the MTN path 1 in the method 600. The first communication apparatus may be, for example, the PE2 in FIG. 3*a*, or the first communication apparatus may be, for example, the PE3 in FIG. 3*a*.

When the method 1400 specifically implements the method 700, the second communication apparatus may be, for example, the PE1 in FIG. 3*a*, the first communication apparatus may be, for example, the PE3 in FIG. 3*a*, and the indication information may correspond to the indication 5 in the method 700.

When the method 1400 specifically implements the method 800, the second communication apparatus may be, for example, the PE3 in FIG. 3*a*, the first communication apparatus may be, for example, the PE1 in FIG. 3*a*, and the indication information may correspond to the indication 6 in the method 800.

When the method 1400 specifically implements the method 900, the first communication apparatus mentioned herein corresponds to the PE3 in the method 900, the second communication apparatus mentioned herein corresponds to the PE2 in the method 900, and the indication information mentioned herein corresponds to the indication 7 in the method 900.

In an implementation, the indication information is carried in a dual-homing coordination DHC message.

For related descriptions of the DHC message, refer to the related descriptions in the foregoing method embodiments. Details are not described herein again.

In an implementation, the MTN communication system further includes a fourth communication apparatus. The fourth communication apparatus is connected to the first communication apparatus and the second communication apparatus by using the second MTN path and the third MTN path respectively.

When the method 1400 specifically implements the method 1000, the fourth communication apparatus mentioned herein may correspond to the PE1 in the method 1000, the first communication apparatus corresponds to the PE3 in the method 1000, the second communication apparatus corresponds to the PE2 in the method 1000, the second MTN path mentioned herein corresponds to the MTN path 2 in the method 1000, and the third MTN path mentioned herein corresponds to the MTN path 1 in the method 1000. Alternatively, the fourth communication apparatus is, for example, the CE2 in FIG. 3*a*, the first communication apparatus is, for example, the PE3 in FIG. 3*a*, the second communication apparatus is, for example, the PE2 in FIG. 3*a*, the third communication apparatus is, for example, the PE1 in FIG. 3*a*, the second MTN path mentioned herein may correspond to the link 2 in the method 1000, and the third MTN path mentioned herein may correspond to the link 1 in the method 1000.

In an implementation, when the second path is unavailable, the transmitting the data stream corresponding to the first client by using the first path and the first MTN path includes: when the third MTN path is available and the second path is unavailable, transmitting the data stream corresponding to the first client by using the third MTN path, the first MTN path, and the first path.

When the method 1400 specifically implements the method 1000, the fourth communication apparatus mentioned herein may correspond to the PE1 in the method 1000, the first communication apparatus corresponds to the PE3 in the method 1000, the second communication apparatus corresponds to the PE2 in the method 1000, the third MTN path mentioned herein corresponds to the MTN path 1 in the method 1000, the first MTN path mentioned herein corresponds to the MTN path 3 in the method 1000, and the first path mentioned herein corresponds to the link 2 in the method 1000. Alternatively, the fourth communication apparatus is, for example, the CE2 in FIG. 3*a*, the first communication apparatus is, for example, the PE3 in FIG. 3*a*, the second communication apparatus is, for example, the PE2 in FIG. 3*a*, the third communication apparatus is, for example, the PE1 in FIG. 3*a*, the first MTN path mentioned herein corresponds to the MTN path 3 in the method 1000, the first path mentioned herein corresponds to the MTN path 2 in the method 1000, and the third MTN path mentioned herein may correspond to the link 1 in the method 1000.

In an implementation, when the second path is available, the transmitting a data stream corresponding to a first client by using the second path includes: when the third MTN path is unavailable and the second path is available, transmitting the data stream corresponding to the first client by using the second MTN path, the first MTN path, and the second path.

When the method 1400 specifically implements the method 1000, the fourth communication apparatus corresponds to the PE1 in the method 1000, the second communication apparatus corresponds to the PE2 in the method 1000, the first communication apparatus corresponds to the PE1 in the method 1000, the third MTN path mentioned herein corresponds to the MTN path 1 in the method 1000, the first MTN path mentioned herein corresponds to the MTN path 3 in the method 1000, the second MTN path mentioned herein corresponds to the MTN path 2 in the method 1000, and the second path mentioned herein corresponds to the link 1 in the method 1000. Alternatively, when the fourth communication apparatus corresponds to the CE2 in the method 1000, the first communication apparatus corresponds to the PE3 in the method 1000, and the second communication apparatus corresponds to the PE2 in the method 1000, the second MTN path corresponds to the link 2 in the method 1000, the first MTN path corresponds to the MTN path 3 in the method 1000, and the second path corresponds to the MTN path 1 in the method 1000.

Figure 15:
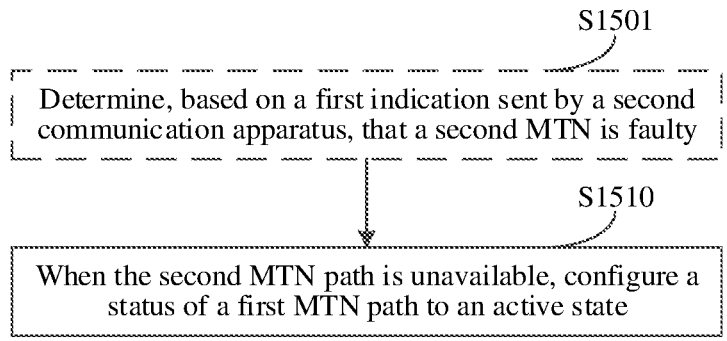
FIG. 15 is a flowchart of still another multi-homing communication method in a network according to an embodiment of this application.

FIG. 15 is a flowchart of still another multi-homing communication method in a network according to an embodiment of this application. The method 1500 may be applied to the MTN communication system shown in FIG. 12*a* or FIG. 12*b*. The method includes the following step.

S1510: When the second MTN path is unavailable, configure a status of the first MTN path to an active state.

In an implementation, before the configuring a status of the first MTN path to an active state, the method further includes the following step.

S1501: Determine, based on a first indication sent by the second communication apparatus, that the second MTN is faulty, where the first indication indicates that the second MTN path is faulty.

When the method 1500 specifically implements the method 400, the first indication mentioned herein may correspond to the indication 1 in the method 400, the second MTN path may correspond to the MTN path 1 in the method 400, and the second communication apparatus may correspond to the PE2 in the method 400. Alternatively, the second communication apparatus may be, for example, the PE3 in FIG. 3*a*, the first indication may correspond to the indication 2 in the method 400, and the second MTN path may correspond to the MTN path 1 in the method 400.

When the method 1500 specifically implements the method 600, the second MTN path corresponds to the MTN path 1 in the method 600. The second communication apparatus may be, for example, the PE1 in FIG. 3*a*, and the first indication may correspond to the indication 3 in the method 600. Alternatively, the second communication apparatus may be, for example, the PE2 in FIG. 3*a*, and the first indication may correspond to the indication 4 in the method 600.

When the method 1500 specifically implements the method 700, the second communication apparatus may be, for example, the PE1 in FIG. 3*a*, the first indication may correspond to the indication 5 in the method 700, and the second MTN path may correspond to the MTN path 1 in the method 700.

When the method 1500 specifically implements the method 800, the second communication apparatus may be, for example, the PE3 in FIG. 3*a*, the first indication may correspond to the indication 6 in the method 800, and the second MTN path may correspond to the MTN path 1 in the method 800.

When the method 1500 specifically implements the method 900, the second communication apparatus may be, for example, the PE2 in FIG. 3*a*, the first indication may correspond to the indication 7 in the method 900, and the second MTN path is the link 1.

In an implementation, before the determining that the second MTN path is faulty, the method further includes: receiving, by the first communication apparatus, the first indication from the second communication apparatus.

When the method 1500 specifically implements the method 400, the second communication apparatus may correspond to the PE2 in the method 400, and the first communication apparatus mentioned herein may correspond to the PE3 in the method 400, or the first communication apparatus may be the PE1 in FIG. 3*a*.

When the method 1500 specifically implements the method 600, the second communication apparatus may be, for example, the PE1 in FIG. 3*a*, the first indication may correspond to the indication 3 in the method 600, and the second MTN path may correspond to the MTN path 1 in the method 600. The first communication apparatus may be, for example, the PE2 in FIG. 3*a*, or the first communication apparatus may be, for example, the PE3 in FIG. 3*a*.

When the method 1500 specifically implements the method 700, the second communication apparatus may be, for example, the PE1 in FIG. 3*a*, the first communication apparatus may be, for example, the PE3 in FIG. 3*a*, and the first indication may correspond to the indication 5 in the method 700.

When the method 1500 specifically implements the method 800, the second communication apparatus may be, for example, the PE3 in FIG. 3*a*, the first communication apparatus may be, for example, the PE1 in FIG. 3*a*, and the first indication may correspond to the indication 6 in the method 800.

When the method 1500 specifically implements the method 900, the second communication apparatus may be, for example, the PE2 in FIG. 3*a*, the first communication apparatus may be, for example, the PE3 in FIG. 3*a*, and the first indication may correspond to the indication 7 in the method 900.

In an implementation, the first indication is carried in a dual-homing coordination DHC message.

For related descriptions of the DHC message, refer to the related descriptions in the foregoing method embodiments. Details are not described herein again.

In an implementation, after the receiving the first indication, the method further includes: sending, by the first communication apparatus, a second indication to the third communication apparatus, to indicate the third communication apparatus to configure the first MTN path to be in an active state.

When the method 1500 specifically implements the method 400, the second indication mentioned herein may correspond to the indication 2 in the method 400, the first communication apparatus corresponds to the PE3 in the method 400, and the third communication apparatus corresponds to the PE1 in the method 400.

When the method 1500 specifically implements the method 600, the second indication may correspond to the indication 4 in the method 600, the first communication apparatus may correspond to the PE2 in the method 600, and the third communication apparatus may correspond to the PE3 in the method 600.

In an implementation, the second indication is carried in an automatic protection switching APS message.

When the method 1500 specifically implements the method 400, the APS message mentioned herein may correspond to the APS message in the method 400. For related descriptions of the APS message, refer to the related descriptions in the foregoing method embodiments. Details are not described herein again.

In an implementation, before the determining that the second MTN path is faulty, the method further includes: receiving, by the third communication apparatus, the first indication from the second communication apparatus.

When the method 1500 specifically implements the method 400, the first indication may correspond to the indication 1 in the method 400, the second communication apparatus may correspond to the PE2 in the method 400, and the third communication apparatus may correspond to the PE1 in the method 400, or the third communication apparatus may correspond to the PE3 in the method 400.

When the method 1500 specifically implements the method 600, the second communication apparatus may be, for example, the PE1 in FIG. 3*a*, the first indication may correspond to the indication 3 in the method 600, and the second MTN path may correspond to the MTN path 1 in the method 600. The third communication apparatus may be, for example, the PE2 in FIG. 3*a*, or the third communication apparatus may be, for example, the PE3 in FIG. 3*a*.

When the method 1500 specifically implements the method 700, the second communication apparatus may be, for example, the PE1 in FIG. 3*a*, the third communication apparatus may be, for example, the PE3 in FIG. 3*a*, and the first indication may correspond to the indication 5 in the method 700.

When the method 1500 specifically implements the method 800, the second communication apparatus may be, for example, the PE3 in FIG. 3*a*, the third communication apparatus may be, for example, the PE1 in FIG. 3*a*, and the first indication may correspond to the indication 6 in the method 800.

When the method 1500 specifically implements the method 900, the second communication apparatus may be, for example, the PE2 in FIG. 3*a*, the third communication apparatus may be, for example, the PE3 in FIG. 3*a*, and the first indication may correspond to the indication 7 in the method 900.

In an implementation, the first indication is carried in an operation, administration and maintenance OAM message.

When the method 1500 specifically implements the method 400, the OAM message mentioned herein may correspond to the OAM message in the method 400. For related descriptions of the OAM message, refer to the related descriptions in the foregoing method embodiments. Details are not described herein again.

In an implementation, before the configuring the first MTN path to be in an active state, the method further includes: receiving, by the third communication apparatus, an indication information sent by the first communication apparatus, where the indication information instructs the third communication apparatus to configure the first MTN path to be in an active state.

When the method 1500 specifically implements the method 400, the first MTN path corresponds to the MTN path 2 in the method 400, and the second MTN path corresponds to the MTN path 1 in the method 400. The first communication apparatus may correspond to the PE2 in the method 700, the third communication apparatus may correspond to the PE3 or the PE1 in the method 700, and the indication information may correspond to the indication 1 in the method 700. Alternatively, the first communication apparatus may correspond to the PE3 in the method 700, the third communication apparatus may correspond to the PE1 in the method 700, and the indication information may correspond to the indication 2 in the method 700.

When the method 1500 can implement the method 600, the first MTN path corresponds to the MTN path 2 in the method 400, and the second MTN path corresponds to the MTN path 1 in the method 400. The first communication apparatus may correspond to the PE1 in the method 600, the third communication apparatus corresponds to the PE2 or the PE3 in the method 600, and the indication information may correspond to the indication 3 in the method 600. Alternatively, the first communication apparatus may correspond to the PE2 in the method 600, the third communication apparatus may correspond to the PE3 in the method 600, and the indication information may correspond to the indication 4 in the method 600.

When the method 1500 specifically implements the method 700, the first communication apparatus may correspond to the PE1 in the method 700, the third communication apparatus may correspond to the PE3 in the method 700, the first MTN path corresponds to the MTN path 2 in the method 700, and the second MTN path corresponds to the MTN path 1 in the method 700. The indication information mentioned herein may correspond to the indication 5 in the method 700.

When the method 1500 specifically implements the method 800, the indication information mentioned herein may correspond to the indication 6 in the method 800, the third communication apparatus mentioned herein may correspond to the PE1 in the method 800, the first communication apparatus mentioned herein may correspond to the PE3 in the method 800, the second MTN path corresponds to the MTN path 1 in the method 800, and the first MTN path corresponds to the MTN path 2 in the method 800.

When the method 1500 specifically implements the method 900, the first communication apparatus may correspond to the PE2 in the method 900, the third communication apparatus may correspond to the PE3 in the method 900, the indication information corresponds to the indication 7 in the method 900, the first MTN path corresponds to the link 2 in the method 900, and the second MTN path corresponds to the link 1 in the method 900.

In an implementation, before the configuring the first MTN path to be in an active state, the method further includes: determining, based on a third indication sent by the third communication apparatus, that the second MTN path is faulty, where the third indication indicates that the second MTN path is faulty.

When the method 1500 specifically implements the method 400, the second MTN path may correspond to the MTN path 1 in the method 400, the third communication apparatus may be, for example, the PE2 in FIG. 3a, and the third indication may correspond to the indication 1 in the method 400. Alternatively, the third communication apparatus may be, for example, the PE3 in FIG. 3a, the third indication may correspond to the indication 2 in the method 400, and the second MTN path may correspond to the MTN path 1 in the method 400.

When the method 1500 specifically implements the method 600, the second MTN path corresponds to the MTN path 1 in the method 600. The third communication apparatus may be, for example, the PE1 in FIG. 3a, and the third indication may correspond to the indication 3 in the method 600. Alternatively, the third communication apparatus may be, for example, the PE2 in FIG. 3a, and the third indication may correspond to the indication 4 in the method 600.

When the method 1500 specifically implements the method 700, the third communication apparatus may be, for example, the PE1 in FIG. 3a, the third indication may correspond to the indication 5 in the method 700, and the second MTN path may correspond to the MTN path 1 in the method 700.

When the method 1500 specifically implements the method 800, the third communication apparatus may be, for example, the PE3 in FIG. 3a, the third indication may correspond to the indication 6 in the method 800, and the second MTN path may correspond to the MTN path 1 in the method 800.

When the method 1500 specifically implements the method 900, the third communication apparatus may be, for example, the PE2 in FIG. 3a, the third indication may correspond to the indication 7 in the method 900, and the second MTN path is the link 1.

When the method 1500 specifically implements the method 600, the third indication mentioned herein may correspond to the indication 3 in the method 600, the third communication apparatus corresponds to the PE1 in the method 600, and the second MTN path corresponds to the MTN path 1 in the method 600.

In an implementation, the third indication is sent by the third communication apparatus to the first communication apparatus.

When the method 1500 specifically implements the method 400, the third communication apparatus may be, for example, the PE2 in FIG. 3a, and the third indication may correspond to the indication 1 in the method 400. The first communication apparatus may be, for example, the PE3 in FIG. 3a, or the first communication apparatus may be the PE1 in FIG. 3a.

When the method 1500 specifically implements the method 600, the third communication apparatus may be, for example, the PE1 in FIG. 3a, the third indication may correspond to the indication 3 in the method 600, and the second MTN path may correspond to the MTN path 1 in the method 600. The first communication apparatus may be, for example, the PE2 in FIG. 3a, or the first communication apparatus may be, for example, the PE3 in FIG. 3a.

When the method 1500 specifically implements the method 700, the third communication apparatus may be, for example, the PE1 in FIG. 3a, the first communication apparatus may be, for example, the PE3 in FIG. 3a, and the third indication may correspond to the indication 5 in the method 700.

When the method 1500 specifically implements the method 800, the third communication apparatus may be, for example, the PE3 in FIG. 3a, the first communication apparatus may be, for example, the PE1 in FIG. 3a, and the third indication may correspond to the indication 6 in the method 800.

When the method 1500 specifically implements the method 900, the third communication apparatus may be, for example, the PE2 in FIG. 3a, the first communication apparatus may be, for example, the PE3 in FIG. 3a, and the third indication may correspond to the indication 7 in the method 900.

In an implementation, the third indication is carried in an automatic protection switching APS message.

When the method 1500 specifically implements the method 600, the APS message mentioned herein may correspond to the APS message in the method 600. For related descriptions of the APS message, refer to the related descriptions in the foregoing method embodiments. Details are not described herein again.

In an implementation, the third indication is sent by the third communication apparatus to the second communication apparatus.

When the method 1500 specifically implements the method 400, the third communication apparatus may be, for example, the PE2 in FIG. 3a, and the third indication may correspond to the indication 1 in the method 400. The second communication apparatus may be, for example, the PE3 in FIG. 3*a*, or the second communication apparatus may be the PE1 in FIG. 3*a*.

When the method 1500 specifically implements the method 600, the third communication apparatus may be, for example, the PE1 in FIG. 3*a*, the third indication may correspond to the indication 3 in the method 600, and the second MTN path may correspond to the MTN path 1 in the method 600. The second communication apparatus may be, for example, the PE2 in FIG. 3*a*, or the second communication apparatus may be, for example, the PE3 in FIG. 3*a*.

When the method 1500 specifically implements the method 700, the third communication apparatus may be, for example, the PE1 in FIG. 3*a*, the second communication apparatus may be, for example, the PE3 in FIG. 3*a*, and the third indication may correspond to the indication 5 in the method 700.

When the method 1500 specifically implements the method 800, the third communication apparatus may be, for example, the PE3 in FIG. 3*a*, the second communication apparatus may be, for example, the PE1 in FIG. 3*a*, and the third indication may correspond to the indication 6 in the method 800.

When the method 1500 specifically implements the method 900, the third communication apparatus may be, for example, the PE2 in FIG. 3*a*, the second communication apparatus may be, for example, the PE3 in FIG. 3*a*, and the third indication may correspond to the indication 7 in the method 900.

In an implementation, the third indication is carried in an operation, administration and maintenance OAM message.

When the method 1500 specifically implements the method 600, the OAM message mentioned herein may correspond to the OAM message in the method 600. For related descriptions of the OAM message, refer to the related descriptions in the foregoing method embodiments. Details are not described herein again.

In an implementation, before the determining that the second MTN path is faulty, the method further includes: sending, by the second communication apparatus, a first indication to the first communication apparatus or the third communication apparatus, where the first indication indicates that the second MTN path is faulty.

When the method 1500 specifically implements the method 400, the first indication mentioned herein may correspond to the indication 1 in the method 400, the second communication apparatus corresponds to the PE2 in the method 400, the first communication apparatus corresponds to the PE3 in the method 400, and the third communication apparatus corresponds to the PE1 in the method 400.

When the method 1500 specifically implements the method 600, the first indication mentioned herein may correspond to the indication 3 in the method 400, the second communication apparatus corresponds to the PE1 in the method 400, the first communication apparatus may correspond to the PE3 in the method 400, and the third communication apparatus may correspond to the PE1 in the method 400.

In an implementation, the first indication is carried in a dual-homing coordination DHC message or an operation, administration and maintenance OAM message.

For the DHC message and the OAM message mentioned herein, refer to the related descriptions in the foregoing method embodiments. Details are not described herein again.

In an implementation, the MTN communication system further includes a fourth communication apparatus. The fourth communication apparatus is connected to the first communication apparatus and the second communication apparatus by using a first path and a second path respectively, as shown in FIG. 12*b*.

In an example, the fourth communication apparatus mentioned herein may correspond to the CE2 in FIG. 3*a*, the first communication apparatus is, for example, the PE3 in FIG. 3*a*, the second communication apparatus is, for example, the PE2 in FIG. 3*a*, the first path mentioned herein may correspond to the link 2 in FIG. 3*a*, and the second path mentioned herein may correspond to the link 1 in FIG. 3*a*.

In another example, the fourth communication apparatus mentioned herein may be, for example, the PE1 in FIG. 3*a*, the first communication apparatus may be, for example, the PE3 in FIG. 3*a*, the second communication apparatus may be, for example, the PE2 in FIG. 3*a*, the first path may correspond to the MTN path 2 in FIG. 3*a*, and the second path may correspond to the MTN path 1 in FIG. 3*a*.

In an implementation, the first communication apparatus and the second communication apparatus are communicatively connected by using a third MTN path, and the method further includes: when the second path is available, configuring the third MTN path to be in an active state.

When the method 1500 specifically implements the method 900, the fourth communication apparatus is, for example, the CE2 in FIG. 3*a*, the first communication apparatus is, for example, the PE3 in FIG. 3*a*, the second communication apparatus is, for example, the PE2 in FIG. 3*a*, the third communication apparatus is, for example, the PE1 in FIG. 3*a*, the third MTN path mentioned herein may correspond to the MTN path 3 in the method 900, and the second path mentioned herein may correspond to the link 1 in the method 900. Alternatively, the fourth communication apparatus is, for example, the PE1 in FIG. 3*a*, the first communication apparatus may be, for example, the PE3 in FIG. 3*a*, the second communication apparatus may be, for example, the PE2 in FIG. 3*a*, the third communication apparatus is, for example, the CE2 in FIG. 3*a*, the second path corresponds to the MTN path 1 in the method 900, and the third MTN path may correspond to the MTN path 3 in the method 900.

In a possible implementation, the first communication apparatus and the second communication apparatus are communicatively connected by using a third MTN path, and the method further includes: when the second path is unavailable, configuring the first path to be in an active state.

When the method 1500 specifically implements the method 900, the fourth communication apparatus is, for example, the CE2 in FIG. 3*a*, the first communication apparatus is, for example, the PE3 in FIG. 3*a*, the second communication apparatus is, for example, the PE2 in FIG. 3*a*, the third communication apparatus is, for example, the PE1 in FIG. 3*a*, the second path mentioned herein may correspond to the link 1 in the method 900, the third MTN path mentioned herein may correspond to the MTN path 3 in the method 900, and the first path mentioned herein may correspond to the link 2 in the method 900. Alternatively, the fourth communication apparatus is, for example, the PE1 in FIG. 3*a*, the first communication apparatus may be, for example, the PE3 in FIG. 3*a*, the second communication apparatus may be, for example, the PE2 in FIG. 3*a*, the third communication apparatus is, for example, the CE2 in FIG. 3*a*, and the first path corresponds to the MTN path 2 in the method 900.

For specific implementations of the method 1300, the method 1400, and the method 1500 above, refer to the foregoing description parts of the method 400, the method 600, the method 700, the method 800, the method 900, the method 1000, and the method 1100, and details are not described herein again.

Figure 16:
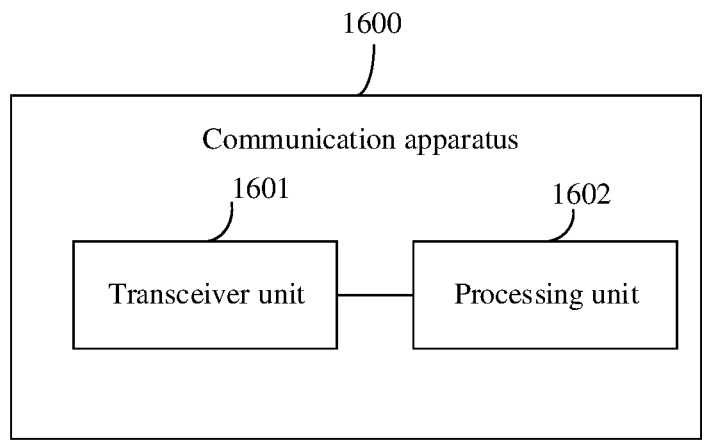
FIG. 16 is a structural diagram of a communication apparatus according to an embodiment of this application.

In addition, an embodiment of this application further provides a communication apparatus, as shown in FIG. 16. FIG. 16 is a schematic structural diagram of a communication apparatus according to an embodiment of this application. The communication apparatus 1600 includes a transceiver unit 1601 and a processing unit 1602. The communication apparatus 1600 may be configured to perform the method 400, the method 600 to the method 1100, and the method 1300 to the method 1500 in the foregoing examples.

In an example, the communication apparatus 1600 may perform the method 400 in the foregoing embodiments. When the communication apparatus 1600 is configured to perform the method 400 in the foregoing embodiments, the communication apparatus 1600 may be equivalent to the PE2 in the method 400. The transceiver unit 1601 is configured to perform a receiving and sending operation performed by the PE2 in the method 400. The processing unit 1602 is configured to perform an operation other than the receiving and sending operation performed by the PE2 in the method 400. For example, the processing unit 1602 is configured to obtain an indication 1, where the indication 1 indicates that the MTN path 1 is faulty, and the transceiver unit 1601 is configured to send the indication 1.

In an example, the communication apparatus 1600 may perform the method 400 in the foregoing embodiments. When the communication apparatus 1600 is configured to perform the method 400 in the foregoing embodiments, the communication apparatus 1600 may be equivalent to the PE3 in the method 400. The transceiver unit 1601 is configured to perform a receiving and sending operation performed by the PE3 in the method 400. The processing unit 1602 is configured to perform an operation other than the receiving and sending operation performed by the PE3 in the method 400. For example, the transceiver unit 1601 is configured to receive an indication 1 sent by the PE2, and the processing unit 1602 is configured to determine, based on the indication 1, that the MTN path 1 is faulty, and configure the MTN path 2 to be in an active state.

In an example, the communication apparatus 1600 may perform the method 400 in the foregoing embodiments. When the communication apparatus 1600 is configured to perform the method 400 in the foregoing embodiments, the communication apparatus 1600 may be equivalent to the PE1 in the method 400. The transceiver unit 1601 is configured to perform a receiving and sending operation performed by the PE1 in the method 400. The processing unit 1602 is configured to perform an operation other than the receiving and sending operation performed by the PE1 in the method 400. For example, the transceiver unit 1601 is configured to receive an indication 1 sent by the PE2, and the processing unit 1602 is configured to determine, based on the indication 1, that the MTN path 1 is faulty, and configure the MTN path 2 to be in an active state.

In an example, the communication apparatus 1600 may perform the method 600 in the foregoing embodiments. When the communication apparatus 1600 is configured to perform the method 600 in the foregoing embodiments, the communication apparatus 1600 may be equivalent to the PE1 in the method 600. The transceiver unit 1601 is configured to perform a receiving and sending operation performed by the PE1 in the method 600. The processing unit 1602 is configured to perform an operation other than the receiving and sending operation performed by the PE1 in the method 600. For example, the processing unit 1602 is configured to obtain an indication 3, and configure the MTN path 2 to be in an active state, and the transceiver unit 1601 is configured to send the indication 3.

In an example, the communication apparatus 1600 may perform the method 600 in the foregoing embodiments. When the communication apparatus 1600 is configured to perform the method 600 in the foregoing embodiments, the communication apparatus 1600 may be equivalent to the PE2 in the method 600. The transceiver unit 1601 is configured to perform a receiving and sending operation performed by the PE2 in the method 600. The processing unit 1602 is configured to perform an operation other than the receiving and sending operation performed by the PE2 in the method 600. For example, the transceiver unit 1601 is configured to receive an indication 3 sent by the PE1, and the processing unit 1602 is configured to determine, based on the indication 3, that the MTN path 1 is faulty.

In an example, the communication apparatus 1600 may perform the method 600 in the foregoing embodiments. When the communication apparatus 1600 is configured to perform the method 600 in the foregoing embodiments, the communication apparatus 1600 may be equivalent to the PE3 in the method 600. The transceiver unit 1601 is configured to perform a receiving and sending operation performed by the PE3 in the method 600. The processing unit 1602 is configured to perform an operation other than the receiving and sending operation performed by the PE3 in the method 600. For example, the transceiver unit 1601 is configured to receive an indication 3 sent by the PE1, and the processing unit 1602 is configured to determine, based on the indication 3, that the MTN path 1 is faulty, and configure the MTN path 2 to be in an active state.

In an example, the communication apparatus 1600 may perform the method 700 in the foregoing embodiments. When the communication apparatus 1600 is configured to perform the method 700 in the foregoing embodiments, the communication apparatus 1600 may be equivalent to the PE1 in the method 700. The transceiver unit 1601 is configured to perform a receiving and sending operation performed by the PE1 in the method 700. The processing unit 1602 is configured to perform an operation other than the receiving and sending operation performed by the PE1 in the method 700. For example, the processing unit 1602 is configured to generate an indication 5, and configure the MTN path 2 to be in an active state, and the transceiver unit 1601 is configured to send the indication 5.

In an example, the communication apparatus 1600 may perform the method 700 in the foregoing embodiments. When the communication apparatus 1600 is configured to perform the method 700 in the foregoing embodiments, the communication apparatus 1600 may be equivalent to the PE3 in the method 700. The transceiver unit 1601 is configured to perform a receiving and sending operation performed by the PE3 in the method 700. The processing unit 1602 is configured to perform an operation other than the receiving and sending operation performed by the PE3 in the method 700. For example, the transceiver unit 1601 is configured to receive an indication 5 sent by the PE1, and the processing unit 1602 is configured to configure the MTN path 2 and the link 2 to be in an active state based on the indication 5.

In an example, the communication apparatus 1600 may perform the method 800 in the foregoing embodiments. When the communication apparatus 1600 is configured to perform the method 800 in the foregoing embodiments, the communication apparatus 1600 may be equivalent to the PE3 in the method 800. The transceiver unit 1601 is configured to perform a receiving and sending operation performed by the PE3 in the method 800. The processing unit 1602 is configured to perform an operation other than the receiving and sending operation performed by the PE3 in the method 800. For example, the processing unit 1602 is configured to generate an indication 6, and configure the MTN path 2 and the link 2 to be in an active state, and the transceiver unit 1601 is configured to send the indication 6.

In an example, the communication apparatus 1600 may perform the method 800 in the foregoing embodiments. When the communication apparatus 1600 is configured to perform the method 800 in the foregoing embodiments, the communication apparatus 1600 may be equivalent to the PE1 in the method 800. The transceiver unit 1601 is configured to perform a receiving and sending operation performed by the PE1 in the method 800. The processing unit 1602 is configured to perform an operation other than the receiving and sending operation performed by the PE1 in the method 800. For example, the transceiver unit 1601 is configured to receive an indication 6 sent by the PE3, and the processing unit 1602 is configured to configure the MTN path 2 to be in an active state based on the indication 6.

In an example, the communication apparatus 1600 may perform the method 900 in the foregoing embodiments. When the communication apparatus 1600 is configured to perform the method 900 in the foregoing embodiments, the communication apparatus 1600 may be equivalent to the PE2 in the method 900. The transceiver unit 1601 is configured to perform a receiving and sending operation performed by the PE2 in the method 900. The processing unit 1602 is configured to perform an operation other than the receiving and sending operation performed by the PE2 in the method 900. For example, the processing unit 1602 is configured to determine that the link 1 is faulty, generate an indication 7, and configure the MTN path 3 to be in an active state, and the transceiver unit 1601 is configured to send the indication 7.

In an example, the communication apparatus 1600 may perform the method 900 in the foregoing embodiments. When the communication apparatus 1600 is configured to perform the method 900 in the foregoing embodiments, the communication apparatus 1600 may be equivalent to the PE3 in the method 900. The transceiver unit 1601 is configured to perform a receiving and sending operation performed by the PE3 in the method 900. The processing unit 1602 is configured to perform an operation other than the receiving and sending operation performed by the PE3 in the method 900. For example, the transceiver unit 1601 is configured to receive an indication 7 sent by the PE2, and the processing unit 1602 is configured to configure the MTN path 2 and the link 2 to be in an active state based on the indication 7.

In an example, the communication apparatus 1600 may perform the method 1000 in the foregoing embodiments. When the communication apparatus 1600 is configured to perform the method 1000 in the foregoing embodiments, the communication apparatus 1600 may be equivalent to the PE1 in the method 1000. The transceiver unit 1601 is configured to perform a receiving and sending operation performed by the PE1 in the method 1000. The processing unit 1602 is configured to perform an operation other than the receiving and sending operation performed by the PE1 in the method 1000. For example, the processing unit 1602 is configured to determine a forwarding path based on a data stream, and the transceiver unit 1601 is configured to send the data stream to the PE3 by using the MTN path 2.

In an example, the communication apparatus 1600 may perform the method 1000 in the foregoing embodiments. When the communication apparatus 1600 is configured to perform the method 1000 in the foregoing embodiments, the communication apparatus 1600 may be equivalent to the PE2 in the method 1000. The transceiver unit 1601 is configured to perform a receiving and sending operation performed by the PE2 in the method 1000. The processing unit 1602 is configured to perform an operation other than the receiving and sending operation performed by the PE2 in the method 1000. For example, the transceiver unit 1601 is configured to receive a data stream sent by the PE1, and the processing unit 1602 is configured to determine a forwarding path based on the data stream.

In an example, the communication apparatus 1600 may perform the method 1000 in the foregoing embodiments. When the communication apparatus 1600 is configured to perform the method 1000 in the foregoing embodiments, the communication apparatus 1600 may be equivalent to the PE3 in the method 1000. The transceiver unit 1601 is configured to perform a receiving and sending operation performed by the PE3 in the method 1000. The processing unit 1602 is configured to perform an operation other than the receiving and sending operation performed by the PE3 in the method 1000. For example, the transceiver unit 1601 is configured to receive a data stream sent by the PE1, and send the data stream to the CE2 by using the link 2, and the processing unit 1602 is configured to determine a forwarding path based on the data stream.

In an example, the communication apparatus 1600 may perform the method 1100 in the foregoing embodiments. When the communication apparatus 1600 is configured to perform the method 1100 in the foregoing embodiments, the communication apparatus 1600 may be equivalent to the PE1 in the method 1100. The transceiver unit 1601 is configured to perform a receiving and sending operation performed by the PE1 in the method 1100. The processing unit 1602 is configured to perform an operation other than the receiving and sending operation performed by the PE1 in the method 1100. For example, the transceiver unit 1601 is configured to receive a data stream sent by the CE1, and send the data stream by using the MTN path 1 or the MTN path 2, and the processing unit 1602 is configured to determine a client identifier corresponding to the data stream.

In an example, the communication apparatus 1600 may perform the method 1300 in the foregoing embodiments. When the communication apparatus 1600 is configured to perform the method 1300 in the foregoing embodiments, the communication apparatus 1600 may be equivalent to the first communication apparatus in the method 1300. The transceiver unit 1601 is configured to perform a receiving and sending operation performed by the first communication apparatus in the method 1300. The processing unit 1602 is configured to perform an operation other than the sending and receiving operation performed by the first communication apparatus in the method 1300. For example, the transceiver unit 1601 is configured to receive a first indication sent by the second communication apparatus, and send a third indication to the third communication apparatus, and the processing unit 1602 is configured to determine, based on the first indication, that the second MTN path is faulty.

In an example, the communication apparatus 1600 may perform the method 1300 in the foregoing embodiments. When the communication apparatus 1600 is configured to perform the method 1300 in the foregoing embodiments, the communication apparatus 1600 may be equivalent to the second communication apparatus in the method 1300. The transceiver unit 1601 is configured to perform a receiving and sending operation performed by the second communication apparatus in the method 1300. The processing unit 1602 is configured to perform an operation other than the sending and receiving operation performed by the second communication apparatus in the method 1300. For example, the transceiver unit 1601 is configured to send a first indication, and the processing unit 1602 is configured to determine that the second MTN path is faulty.

In an example, the communication apparatus 1600 may perform the method 1300 in the foregoing embodiments. When the communication apparatus 1600 is configured to perform the method 1300 in the foregoing embodiments, the communication apparatus 1600 may be equivalent to the third communication apparatus in the method 1300. The transceiver unit 1601 is configured to perform a receiving and sending operation performed by the third communication apparatus in the method 1300. The processing unit 1602 is configured to perform an operation other than the sending and receiving operation performed by the third communication apparatus in the method 1300. For example, the transceiver unit 1601 is configured to receive a first indication or a second indication, and the processing unit 1602 is configured to determine that the second MTN path is faulty, and switch the second MTN path to the first MTN path.

In an example, the communication apparatus 1600 may perform the method 1400 in the foregoing embodiments. When the communication apparatus 1600 is configured to perform the method 1400 in the foregoing embodiments, the communication apparatus 1600 may be equivalent to the first communication apparatus in the method 1400. The transceiver unit 1601 is configured to perform a receiving and sending operation performed by the first communication apparatus in the method 1400. The processing unit 1602 is configured to perform an operation other than the sending and receiving operation performed by the first communication apparatus in the method 1400. For example, the transceiver unit 1601 is configured to send a data stream to the second communication apparatus by using the third MTN path, and the processing unit 1602 is configured to determine that the second path is faulty, and configure the third MTN path to be in an active state.

In an example, the communication apparatus 1600 may perform the method 1400 in the foregoing embodiments. When the communication apparatus 1600 is configured to perform the method 1400 in the foregoing embodiments, the communication apparatus 1600 may be equivalent to the second communication apparatus in the method 1400. The transceiver unit 1601 is configured to perform a receiving and sending operation performed by the second communication apparatus in the method 1400. The processing unit 1602 is configured to perform an operation other than the sending and receiving operation performed by the second communication apparatus in the method 1400. For example, the transceiver unit 1601 is configured to receive, by using the third MTN path, a data stream sent by the first communication apparatus, and send the data stream to the fourth communication apparatus by using the second path, and the processing unit 1602 is configured to determine that the second MTN path is faulty, and configure the third MTN path to be in an active state.

In an example, the communication apparatus 1600 may perform the method 1400 in the foregoing embodiments. When the communication apparatus 1600 is configured to perform the method 1400 in the foregoing embodiments, the communication apparatus 1600 may be equivalent to the fourth communication apparatus in the method 1400. The transceiver unit 1601 is configured to perform a receiving and sending operation performed by the fourth communication apparatus in the method 1400. The processing unit 1602 is configured to perform an operation other than the sending and receiving operation performed by the fourth communication apparatus in the method 1400. For example, the transceiver unit 1601 is configured to send a data stream to the first communication apparatus by using the first path, and the processing unit 1602 is configured to determine that the second path is faulty, and configure the first path to be in an active state.

In an example, the communication apparatus 1600 may perform the method 1500 in the foregoing embodiments. When the communication apparatus 1600 is configured to perform the method 1500 in the foregoing embodiments, the communication apparatus 1600 may be equivalent to the first communication apparatus in the method 1500. The transceiver unit 1601 is configured to perform a receiving and sending operation performed by the first communication apparatus in the method 1500. The processing unit 1602 is configured to perform an operation other than the sending and receiving operation performed by the first communication apparatus in the method 1500. For example, the transceiver unit 1601 is configured to receive a first indication sent by the second communication apparatus, where the first indication indicates that the second MTN path is faulty, and the processing unit 1602 is configured to configure the first MTN path to be in an active state.

In an example, the communication apparatus 1600 may perform the method 1500 in the foregoing embodiments. When the communication apparatus 1600 is configured to perform the method 1500 in the foregoing embodiments, the communication apparatus 1600 may be equivalent to the second communication apparatus in the method 1500. The transceiver unit 1601 is configured to perform a receiving and sending operation performed by the second communication apparatus in the method 1500. The processing unit 1602 is configured to perform an operation other than the sending and receiving operation performed by the second communication apparatus in the method 1500. For example, the transceiver unit 1601 is configured to send a first indication, where the first indication indicates that the second MTN path is faulty, and the processing unit 1602 is configured to configure the third MTN path to be in an active state.

In an example, the communication apparatus 1600 may perform the method 1500 in the foregoing embodiments. When the communication apparatus 1600 is configured to perform the method 1500 in the foregoing embodiments, the communication apparatus 1600 may be equivalent to the third communication apparatus in the method 1500. The transceiver unit 1601 is configured to perform a receiving and sending operation performed by the third communication apparatus in the method 1500. The processing unit 1602 is configured to perform an operation other than the sending and receiving operation performed by the third communication apparatus in the method 1500. For example, the transceiver unit 1601 is configured to receive a first indication sent by the second communication apparatus, where the first indication indicates that the second MTN path is faulty, and the processing unit 1602 is configured to configure the first MTN path to be in an active state.

Figure 17:
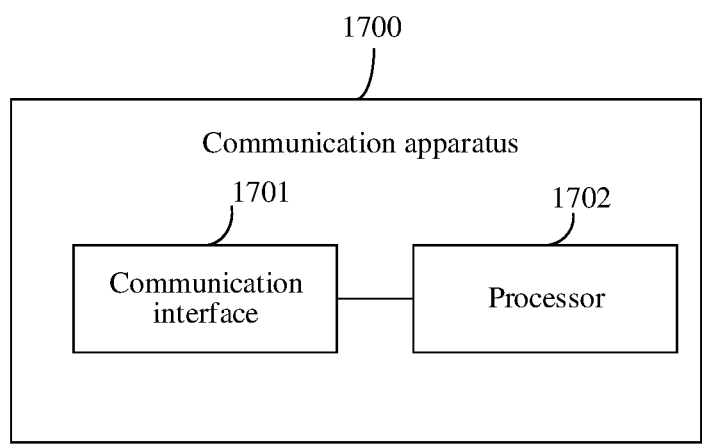
FIG. 17 is a structural diagram of another communication apparatus according to an embodiment of this application.

In addition, an embodiment of this application further provides a communication apparatus 1700. Refer to FIG. 17, FIG. 17 is a schematic structural diagram of a communication apparatus according to an embodiment of this application. The communication apparatus 1700 includes a communication interface 1701 and a processor 1702 connected to the communication interface 1701. The communication apparatus 1700 may be configured to perform the method 400, the method 600 to the method 1100, and the method 1300 to the method 1500 in the foregoing embodiments.

In an example, the communication apparatus 1700 may perform the method 400 in the foregoing embodiments. When the communication apparatus 1700 is configured to perform the method 400 in the foregoing embodiments, the communication apparatus 1700 may be equivalent to the PE2 in the method 400. The communication interface 1701 is configured to perform a receiving and sending operation performed by the PE2 in the method 400. The processor 1702 is configured to perform an operation other than the receiving and sending operation performed by the PE2 in the method 400. For example, the processor 1702 is configured to obtain an indication 1, where the indication 1 indicates that the MTN path 1 is faulty, and the communication interface 1701 is configured to send the indication 1.

In an example, the communication apparatus 1700 may perform the method 400 in the foregoing embodiments. When the communication apparatus 1700 is configured to perform the method 400 in the foregoing embodiments, the communication apparatus 1700 may be equivalent to the PE3 in the method 400. The communication interface 1701 is configured to perform a receiving and sending operation performed by the PE3 in the method 400. The processor 1702 is configured to perform an operation other than the receiving and sending operation performed by the PE3 in the method 400. For example, the communication interface 1701 is configured to receive an indication 1 sent by the PE2, and the processor 1702 is configured to determine, based on the indication 1, that the MTN path 1 is faulty, and configure the MTN path 2 to be in an active state.

In an example, the communication apparatus 1700 may perform the method 400 in the foregoing embodiments. When the communication apparatus 1700 is configured to perform the method 400 in the foregoing embodiments, the communication apparatus 1700 may be equivalent to the PE1 in the method 400. The communication interface 1701 is configured to perform a receiving and sending operation performed by the PE1 in the method 400. The processor 1702 is configured to perform an operation other than the receiving and sending operation performed by the PE1 in the method 400. For example, the communication interface 1701 is configured to receive an indication 1 sent by the PE2, and the processor 1702 is configured to determine, based on the indication 1, that the MTN path 1 is faulty, and configure the MTN path 2 to be in an active state.

In an example, the communication apparatus 1700 may perform the method 600 in the foregoing embodiments. When the communication apparatus 1700 is configured to perform the method 600 in the foregoing embodiments, the communication apparatus 1700 may be equivalent to the PE1 in the method 600. The communication interface 1701 is configured to perform a receiving and sending operation performed by the PE1 in the method 600. The processor 1702 is configured to perform an operation other than the receiving and sending operation performed by the PE1 in the method 600. For example, the processor 1702 is configured to obtain an indication 3, and configure the MTN path 2 to be in an active state, and the communication interface 1701 is configured to send the indication 3.

In an example, the communication apparatus 1700 may perform the method 600 in the foregoing embodiments. When the communication apparatus 1700 is configured to perform the method 600 in the foregoing embodiments, the communication apparatus 1700 may be equivalent to the PE2 in the method 600. The communication interface 1701 is configured to perform a receiving and sending operation performed by the PE2 in the method 600. The processor 1702 is configured to perform an operation other than the receiving and sending operation performed by the PE2 in the method 600. For example, the communication interface 1701 is configured to receive an indication 3 sent by the PE1, and the processor 1702 is configured to determine, based on the indication 3, that the MTN path 1 is faulty.

In an example, the communication apparatus 1700 may perform the method 600 in the foregoing embodiments. When the communication apparatus 1700 is configured to perform the method 600 in the foregoing embodiments, the communication apparatus 1700 may be equivalent to the PE3 in the method 600. The communication interface 1701 is configured to perform a receiving and sending operation performed by the PE3 in the method 600. The processor 1702 is configured to perform an operation other than the receiving and sending operation performed by the PE3 in the method 600. For example, the communication interface 1701 is configured to receive an indication 3 sent by the PE1, and the processor 1702 is configured to determine, based on the indication 3, that the MTN path 1 is faulty, and configure the MTN path 2 to be in an active state.

In an example, the communication apparatus 1700 may perform the method 700 in the foregoing embodiments. When the communication apparatus 1700 is configured to perform the method 700 in the foregoing embodiments, the communication apparatus 1700 may be equivalent to the PE1 in the method 700. The communication interface 1701 is configured to perform a receiving and sending operation performed by the PE1 in the method 700. The processor 1702 is configured to perform an operation other than the receiving and sending operation performed by the PE1 in the method 700. For example, the processor 1702 is configured to generate an indication 5, and configure the MTN path 2 to be in an active state, and the communication interface 1701 is configured to send the indication 5.

In an example, the communication apparatus 1700 may perform the method 700 in the foregoing embodiments. When the communication apparatus 1700 is configured to perform the method 700 in the foregoing embodiments, the communication apparatus 1700 may be equivalent to the PE3 in the method 700. The communication interface 1701 is configured to perform a receiving and sending operation performed by the PE3 in the method 700. The processor 1702 is configured to perform an operation other than the receiving and sending operation performed by the PE3 in the method 700. For example, the communication interface 1701 is configured to receive an indication 5 sent by the PE1, and the processor 1702 is configured to configure the MTN path 2 and the link 2 to be in an active state based on the indication 5.

In an example, the communication apparatus 1700 may perform the method 800 in the foregoing embodiments. When the communication apparatus 1700 is configured to perform the method 800 in the foregoing embodiments, the communication apparatus 1700 may be equivalent to the PE3 in the method 800. The communication interface 1701 is configured to perform a receiving and sending operation performed by the PE3 in the method 800. The processor 1702 is configured to perform an operation other than the receiving and sending operation performed by the PE3 in the method 800. For example, the processor 1702 is configured to generate an indication 6, and configure the MTN path 2 and the link 2 to be in an active state, and the communication interface 1701 is configured to send the indication 6.

In an example, the communication apparatus 1700 may perform the method 800 in the foregoing embodiments. When the communication apparatus 1700 is configured to perform the method 800 in the foregoing embodiments, the communication apparatus 1700 may be equivalent to the PE1 in the method 800. The communication interface 1701 is configured to perform a receiving and sending operation performed by the PE1 in the method 800. The processor 1702 is configured to perform an operation other than the receiving and sending operation performed by the PE1 in the method 800. For example, the communication interface 1701 is configured to receive an indication 6 sent by the PE3, and the processor 1702 is configured to configure the MTN path 2 to be in an active state based on the indication 6.

In an example, the communication apparatus 1700 may perform the method 900 in the foregoing embodiments. When the communication apparatus 1700 is configured to perform the method 900 in the foregoing embodiments, the communication apparatus 1700 may be equivalent to the PE2 in the method 900. The communication interface 1701 is configured to perform a receiving and sending operation performed by the PE2 in the method 900. The processor 1702 is configured to perform an operation other than the receiving and sending operation performed by the PE2 in the method 900. For example, the processor 1702 is configured to determine that the link 1 is faulty, generate an indication 7, and configure the MTN path 3 to be in an active state, and the communication interface 1701 is configured to send the indication 7.

In an example, the communication apparatus 1700 may perform the method 900 in the foregoing embodiments. When the communication apparatus 1700 is configured to perform the method 900 in the foregoing embodiments, the communication apparatus 1700 may be equivalent to the PE3 in the method 900. The communication interface 1701 is configured to perform a receiving and sending operation performed by the PE3 in the method 900. The processor 1702 is configured to perform an operation other than the receiving and sending operation performed by the PE3 in the method 900. For example, the communication interface 1701 is configured to receive an indication 7 sent by the PE2, and the processor 1702 is configured to configure the MTN path 2 and the link 2 to be in an active state based on the indication 7.

In an example, the communication apparatus 1700 may perform the method 1000 in the foregoing embodiments. When the communication apparatus 1700 is configured to perform the method 1000 in the foregoing embodiments, the communication apparatus 1700 may be equivalent to the PE1 in the method 1000. The communication interface 1701 is configured to perform a receiving and sending operation performed by the PE1 in the method 1000. The processor 1702 is configured to perform an operation other than the receiving and sending operation performed by the PE1 in the method 1000. For example, the processor 1702 is configured to determine a forwarding path based on a data stream, and the communication interface 1701 is configured to send the data stream to the PE3 by using the MTN path 2.

In an example, the communication apparatus 1700 may perform the method 1000 in the foregoing embodiments. When the communication apparatus 1700 is configured to perform the method 1000 in the foregoing embodiments, the communication apparatus 1700 may be equivalent to the PE2 in the method 1000. The communication interface 1701 is configured to perform a receiving and sending operation performed by the PE2 in the method 1000. The processor 1702 is configured to perform an operation other than the receiving and sending operation performed by the PE2 in the method 1000. For example, the communication interface 1701 is configured to receive a data stream sent by the PE1, and the processor 1702 is configured to determine a forwarding path based on the data stream.

In an example, the communication apparatus 1700 may perform the method 1000 in the foregoing embodiments. When the communication apparatus 1700 is configured to perform the method 1000 in the foregoing embodiments, the communication apparatus 1700 may be equivalent to the PE3 in the method 1000. The communication interface 1701 is configured to perform a receiving and sending operation performed by the PE3 in the method 1000. The processor 1702 is configured to perform an operation other than the receiving and sending operation performed by the PE3 in the method 1000. For example, the communication interface 1701 is configured to receive a data stream sent by the PE1, and send the data stream to the CE2 by using the link 2, and the processor 1702 is configured to determine a forwarding path based on the data stream.

In an example, the communication apparatus 1700 may perform the method 1100 in the foregoing embodiments. When the communication apparatus 1700 is configured to perform the method 1100 in the foregoing embodiments, the communication apparatus 1700 may be equivalent to the PE1 in the method 1100. The communication interface 1701 is configured to perform a receiving and sending operation performed by the PE1 in the method 1100. The processor 1702 is configured to perform an operation other than the receiving and sending operation performed by the PE1 in the method 1100. For example, the communication interface 1701 is configured to receive a data stream sent by the CE1, and send the data stream by using the MTN path 1 or the MTN path 2, and the processor 1702 is configured to determine a client identifier corresponding to the data stream.

In an example, the communication apparatus 1700 may perform the method 1300 in the foregoing embodiments. When the communication apparatus 1700 is configured to perform the method 1300 in the foregoing embodiments, the communication apparatus 1700 may be equivalent to the first communication apparatus in the method 1300. The communication interface 1701 is configured to perform a receiving and sending operation performed by the first communication apparatus in the method 1300. The processor 1702 is configured to perform an operation other than the receiving and sending operation performed by the first communication apparatus in the method 1300. For example, the communication interface 1701 is configured to receive a first indication sent by the second communication apparatus, and send a third indication to the third communication apparatus, and the processor 1702 is configured to determine, based on the first indication, that the second MTN path is faulty.

In an example, the communication apparatus 1700 may perform the method 1300 in the foregoing embodiments. When the communication apparatus 1700 is configured to perform the method 1300 in the foregoing embodiments, the communication apparatus 1700 may be equivalent to the second communication apparatus in the method 1300. The communication interface 1701 is configured to perform a receiving and sending operation performed by the second communication apparatus in the method 1300. The processor 1702 is configured to perform an operation other than the receiving and sending operation performed by the second communication apparatus in the method 1300. For example, the communication interface 1701 is configured to send a first indication, and the processor 1702 is configured to determine that the second MTN path is faulty.

In an example, the communication apparatus 1700 may perform the method 1300 in the foregoing embodiments. When the communication apparatus 1700 is configured to perform the method 1300 in the foregoing embodiments, the communication apparatus 1700 may be equivalent to the third communication apparatus in the method 1300. The communication interface 1701 is configured to perform a sending and receiving operation performed by the third communication apparatus in the method 1300. The processor 1702 is configured to perform an operation other than the sending and receiving operation performed by the third communication apparatus in the method 1300. For example, the communication interface 1701 is configured to receive a first indication or a second indication, and the processor 1702 is configured to determine that the second MTN path is faulty, and switch the second MTN path to the first MTN path.

In an example, the communication apparatus 1700 may perform the method 1400 in the foregoing embodiments. When the communication apparatus 1700 is configured to perform the method 1400 in the foregoing embodiments, the communication apparatus 1700 may be equivalent to the first communication apparatus in the method 1400. The communication interface 1701 is configured to perform a receiving and sending operation performed by the first communication apparatus in the method 1400. The processor 1702 is configured to perform an operation other than the receiving and sending operation performed by the first communication apparatus in the method 1400. For example, the communication interface 1701 is configured to send a data stream to the second communication apparatus by using the third MTN path, and the processor 1702 is configured to determine that the second path is faulty, and configure the third MTN path to be in an active state.

In an example, the communication apparatus 1700 may perform the method 1400 in the foregoing embodiments. When the communication apparatus 1700 is configured to perform the method 1400 in the foregoing embodiments, the communication apparatus 1700 may be equivalent to the second communication apparatus in the method 1400. The communication interface 1701 is configured to perform a receiving and sending operation performed by the second communication apparatus in the method 1400. The processor 1702 is configured to perform an operation other than the receiving and sending operation performed by the second communication apparatus in the method 1400. For example, the communication interface 1701 is configured to receive, by using the third MTN path, a data stream sent by the first communication apparatus, and send the data stream to the fourth communication apparatus by using the second path, and the processor 1702 is configured to determine that the second MTN path is faulty, and configure the third MTN path to be in an active state.

In an example, the communication apparatus 1700 may perform the method 1400 in the foregoing embodiments. When the communication apparatus 1700 is configured to perform the method 1400 in the foregoing embodiments, the communication apparatus 1700 may be equivalent to the fourth communication apparatus in the method 1400. The communication interface 1701 is configured to perform a sending and receiving operation performed by the fourth communication apparatus in the method 1400. The processor 1702 is configured to perform an operation other than the sending and receiving operation performed by the fourth communication apparatus in the method 1400. For example, the communication interface 1701 is configured to send a data stream to the first communication apparatus by using the first path, and the processor 1702 is configured to determine that the second path is faulty, and configure the first path to be in an active state.

In an example, the communication apparatus 1700 may perform the method 1500 in the foregoing embodiments. When the communication apparatus 1700 is configured to perform the method 1500 in the foregoing embodiments, the communication apparatus 1700 may be equivalent to the first communication apparatus in the method 1500. The communication interface 1701 is configured to perform a receiving and sending operation performed by the first communication apparatus in the method 1500. The processor 1702 is configured to perform an operation other than the receiving and sending operation performed by the first communication apparatus in the method 1500. For example, the communication interface 1701 is configured to receive a first indication sent by the second communication apparatus, where the first indication indicates that the second MTN path is faulty, and the processor 1702 is configured to configure the first MTN path to be in an active state.

In an example, the communication apparatus 1700 may perform the method 1500 in the foregoing embodiments. When the communication apparatus 1700 is configured to perform the method 1500 in the foregoing embodiments, the communication apparatus 1700 may be equivalent to the second communication apparatus in the method 1500. The communication interface 1701 is configured to perform a receiving and sending operation performed by the second communication apparatus in the method 1500. The processor 1702 is configured to perform an operation other than the receiving and sending operation performed by the second communication apparatus in the method 1500. For example, the communication interface 1701 is configured to send a first indication, where the first indication indicates that the second MTN path is faulty, and the processor 1702 is configured to configure the third MTN path to be in an active state.

In an example, the communication apparatus 1700 may perform the method 1500 in the foregoing embodiments. When the communication apparatus 1700 is configured to perform the method 1500 in the foregoing embodiments, the communication apparatus 1700 may be equivalent to the third communication apparatus in the method 1500. The communication interface 1701 is configured to perform a sending and receiving operation performed by the third communication apparatus in the method 1500. The processor 1702 is configured to perform an operation other than the sending and receiving operation performed by the third communication apparatus in the method 1500. For example, the communication interface 1701 is configured to receive a first indication sent by the second communication apparatus, where the first indication indicates that the second MTN path is faulty, and the processor 1702 is configured to configure the first MTN path to be in an active state.

Figure 18:
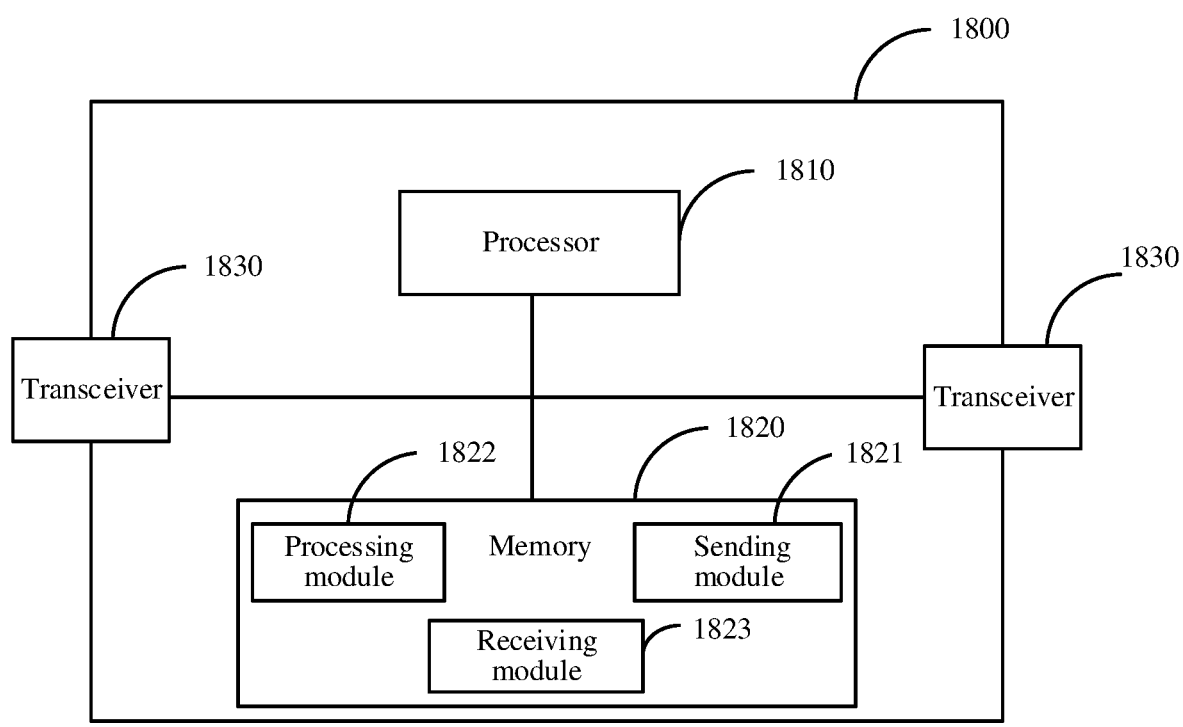
FIG. 18 is a structural diagram of still another communication apparatus according to an embodiment of this application.

In addition, an embodiment of this application further provides a communication apparatus 1800. Refer to FIG. 18, FIG. 18 is a schematic structural diagram of a communication apparatus according to an embodiment of this application.

The communication apparatus 1800 may be configured to perform the method 400, the method 600 to the method 1100, and the method 1300 to the method 1500 in the foregoing embodiments.

As shown in FIG. 18, the communication apparatus 1800 may include a processor 1810, a memory 1820 coupled to the processor 1810, and a transceiver 1830. The transceiver 1830 may be, for example, a communication interface, an optical module, or the like. The processor 1810 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof. The processor 1810 may be one processor, or may include a plurality of processors. The memory 1820 may include a volatile memory, for example, a random access memory (RAM). The memory may also include a nonvolatile memory, for example, a read-only memory (ROM), a flash memory, a hard disk drive (HDD), or a solid state disk (SSD). The memory 1820 may further include a combination of the foregoing types of memories. The memory 1820 may be one memory, or may include a plurality of memories. In an implementation, the memory 1820 stores computer-readable instructions, and the computer-readable instructions include a plurality of software modules, for example, a sending module 1821, a processing module 1822, and a receiving module 1823. After executing each software module, the processor 1810 may perform a corresponding operation based on an indication of each software module. In this embodiment, an operation performed by a software module is actually an operation performed by the processor 1810 based on an indication of the software module.

In an example, the communication apparatus 1800 may perform the method 400 in the foregoing embodiments. When the communication apparatus 1800 is configured to perform the method 400 in the foregoing embodiments, the communication apparatus 1800 may be equivalent to the PE2 in the method 400. The transceiver 1830 is configured to perform a receiving and sending operation performed by the PE2 in the method 400. The processor 1810 is configured to perform an operation other than the receiving and sending operation performed by the PE2 in the method 400. For example, the processor 1810 is configured to obtain an indication 1, where the indication 1 indicates that the MTN path 1 is faulty, and the transceiver 1830 is configured to send the indication 1.

In an example, the communication apparatus 1800 may perform the method 400 in the foregoing embodiments. When the communication apparatus 1800 is configured to perform the method 400 in the foregoing embodiments, the communication apparatus 1800 may be equivalent to the PE3 in the method 400. The transceiver 1830 is configured to perform a receiving and sending operation performed by the PE3 in the method 400. The processor 1810 is configured to perform an operation other than the receiving and sending operation performed by the PE3 in the method 400. For example, the transceiver 1830 is configured to receive an indication 1 sent by the PE2, and the processor 1810 is configured to determine, based on the indication 1, that the MTN path 1 is faulty, and configure the MTN path 2 to be in an active state.

In an example, the communication apparatus 1800 may perform the method 400 in the foregoing embodiments. When the communication apparatus 1800 is configured to perform the method 400 in the foregoing embodiments, the communication apparatus 1800 may be equivalent to the PE1 in the method 400. The transceiver 1830 is configured to perform a receiving and sending operation performed by the PE1 in the method 400. The processor 1810 is configured to perform an operation other than the receiving and sending operation performed by the PE1 in the method 400. For example, the transceiver 1830 is configured to receive an indication 1 sent by the PE2, and the processor 1810 is configured to determine, based on the indication 1, that the MTN path 1 is faulty, and configure the MTN path 2 to be in an active state.

In an example, the communication apparatus 1800 may perform the method 600 in the foregoing embodiments. When the communication apparatus 1800 is configured to perform the method 600 in the foregoing embodiments, the communication apparatus 1800 may be equivalent to the PE1 in the method 600. The transceiver 1830 is configured to perform a receiving and sending operation performed by the PE1 in the method 600. The processor 1810 is configured to perform an operation other than the receiving and sending operation performed by the PE1 in the method 600. For example, the processor 1810 is configured to obtain an indication 3, and configure the MTN path 2 to be in an active state, and the transceiver 1830 is configured to send the indication 3.

In an example, the communication apparatus 1800 may perform the method 600 in the foregoing embodiments. When the communication apparatus 1800 is configured to perform the method 600 in the foregoing embodiments, the communication apparatus 1800 may be equivalent to the PE2 in the method 600. The transceiver 1830 is configured to perform a receiving and sending operation performed by the PE2 in the method 600. The processor 1810 is configured to perform an operation other than the receiving and sending operation performed by the PE2 in the method 600. For example, the transceiver 1830 is configured to receive an indication 3 sent by the PE1, and the processor 1810 is configured to determine, based on the indication 3, that the MTN path 1 is faulty.

In an example, the communication apparatus 1800 may perform the method 600 in the foregoing embodiments. When the communication apparatus 1800 is configured to perform the method 600 in the foregoing embodiments, the communication apparatus 1800 may be equivalent to the PE3 in the method 600. The transceiver 1830 is configured to perform a receiving and sending operation performed by the PE3 in the method 600. The processor 1810 is configured to perform an operation other than the receiving and sending operation performed by the PE3 in the method 600. For example, the transceiver 1830 is configured to receive an indication 3 sent by the PE1, and the processor 1810 is configured to determine, based on the indication 3, that the MTN path 1 is faulty, and configure the MTN path 2 to be in an active state.

In an example, the communication apparatus 1800 may perform the method 700 in the foregoing embodiments. When the communication apparatus 1800 is configured to perform the method 700 in the foregoing embodiments, the communication apparatus 1800 may be equivalent to the PE1 in the method 700. The transceiver 1830 is configured to perform a receiving and sending operation performed by the PE1 in the method 700. The processor 1810 is configured to perform an operation other than the receiving and sending operation performed by the PE1 in the method 700. For example, the processor 1810 is configured to generate an indication 5, and configure the MTN path 2 to be in an active state, and the transceiver 1830 is configured to send the indication 5.

In an example, the communication apparatus 1800 may perform the method 700 in the foregoing embodiments.

When the communication apparatus 1800 is configured to perform the method 700 in the foregoing embodiments, the communication apparatus 1800 may be equivalent to the PE3 in the method 700. The transceiver 1830 is configured to perform a receiving and sending operation performed by the PE3 in the method 700. The processor 1810 is configured to perform an operation other than the receiving and sending operation performed by the PE3 in the method 700. For example, the transceiver 1830 is configured to receive an indication 5 sent by the PE1, and the processor 1810 is configured to configure the MTN path 2 and the link 2 to be in an active state based on the indication 5.

In an example, the communication apparatus 1800 may perform the method 800 in the foregoing embodiments. When the communication apparatus 1800 is configured to perform the method 800 in the foregoing embodiments, the communication apparatus 1800 may be equivalent to the PE3 in the method 800. The transceiver 1830 is configured to perform a receiving and sending operation performed by the PE3 in the method 800. The processor 1810 is configured to perform an operation other than the receiving and sending operation performed by the PE3 in the method 800. For example, the processor 1810 is configured to generate an indication 6, and configure the MTN path 2 and the link 2 to be in an active state, and the transceiver 1830 is configured to send the indication 6.

In an example, the communication apparatus 1800 may perform the method 800 in the foregoing embodiments. When the communication apparatus 1800 is configured to perform the method 800 in the foregoing embodiments, the communication apparatus 1800 may be equivalent to the PE1 in the method 800. The transceiver 1830 is configured to perform a receiving and sending operation performed by the PE1 in the method 800. The processor 1810 is configured to perform an operation other than the receiving and sending operation performed by the PE1 in the method 800. For example, the transceiver 1830 is configured to receive an indication 6 sent by the PE3, and the processor 1810 is configured to configure the MTN path 2 to be in an active state based on the indication 6.

In an example, the communication apparatus 1800 may perform the method 900 in the foregoing embodiments. When the communication apparatus 1800 is configured to perform the method 900 in the foregoing embodiments, the communication apparatus 1800 may be equivalent to the PE2 in the method 900. The transceiver 1830 is configured to perform a receiving and sending operation performed by the PE2 in the method 900. The processor 1810 is configured to perform an operation other than the receiving and sending operation performed by the PE2 in the method 900. For example, the processor 1810 is configured to determine that the link 1 is faulty, generate an indication 7, and configure the MTN path 3 to be in an active state, and the transceiver 1830 is configured to send the indication 7.

In an example, the communication apparatus 1800 may perform the method 900 in the foregoing embodiments. When the communication apparatus 1800 is configured to perform the method 900 in the foregoing embodiments, the communication apparatus 1800 may be equivalent to the PE3 in the method 900. The transceiver 1830 is configured to perform a receiving and sending operation performed by the PE3 in the method 900. The processor 1810 is configured to perform an operation other than the receiving and sending operation performed by the PE3 in the method 900. For example, the transceiver 1830 is configured to receive an indication 7 sent by the PE2, and the processor 1810 is configured to configure the MTN path 2 and the link 2 to be in an active state based on the indication 7.

In an example, the communication apparatus 1800 may perform the method 1000 in the foregoing embodiments. When the communication apparatus 1800 is configured to perform the method 1000 in the foregoing embodiments, the communication apparatus 1800 may be equivalent to the PE1 in the method 1000. The transceiver 1830 is configured to perform a receiving and sending operation performed by the PE1 in the method 1000. The processor 1810 is configured to perform an operation other than the receiving and sending operation performed by the PE1 in the method 1000. For example, the processor 1810 is configured to determine a forwarding path based on a data stream, and the transceiver 1830 is configured to send the data stream to the PE3 by using the MTN path 2.

In an example, the communication apparatus 1800 may perform the method 1000 in the foregoing embodiments. When the communication apparatus 1800 is configured to perform the method 1000 in the foregoing embodiments, the communication apparatus 1800 may be equivalent to the PE2 in the method 1000. The transceiver 1830 is configured to perform a receiving and sending operation performed by the PE2 in the method 1000. The processor 1810 is configured to perform an operation other than the receiving and sending operation performed by the PE2 in the method 1000. For example, the transceiver 1830 is configured to receive a data stream sent by the PE1, and the processor 1810 is configured to determine a forwarding path based on the data stream.

In an example, the communication apparatus 1800 may perform the method 1000 in the foregoing embodiments. When the communication apparatus 1800 is configured to perform the method 1000 in the foregoing embodiments, the communication apparatus 1800 may be equivalent to the PE3 in the method 1000. The transceiver 1830 is configured to perform a receiving and sending operation performed by the PE3 in the method 1000. The processor 1810 is configured to perform an operation other than the receiving and sending operation performed by the PE3 in the method 1000. For example, the transceiver 1830 is configured to receive a data stream sent by the PE1, and send the data stream to the CE2 by using the link 2, and the processor 1810 is configured to determine a forwarding path based on the data stream.

In an example, the communication apparatus 1800 may perform the method 1100 in the foregoing embodiments. When the communication apparatus 1800 is configured to perform the method 1100 in the foregoing embodiments, the communication apparatus 1800 may be equivalent to the PE1 in the method 1100. The transceiver 1830 is configured to perform a receiving and sending operation performed by the PE1 in the method 1100. The processor 1810 is configured to perform an operation other than the receiving and sending operation performed by the PE1 in the method 1100. For example, the transceiver 1830 is configured to receive a data stream sent by the CE1, and send the data stream by using the MTN path 1 or the MTN path 2, and the processor 1810 is configured to determine a client identifier corresponding to the data stream.

In an example, the communication apparatus 1800 may perform the method 1300 in the foregoing embodiments. When the communication apparatus 1800 is configured to perform the method 1300 in the foregoing embodiments, the communication apparatus 1800 may be equivalent to the first communication apparatus in the method 1300. The transceiver 1830 is configured to perform a receiving and sending operation performed by the first communication apparatus in the method 1300. The processor 1810 is configured to perform an operation other than the receiving and sending operation performed by the first communication apparatus in the method 1300. For example, the transceiver 1830 is configured to receive a first indication sent by the second communication apparatus, and send a third indication to the third communication apparatus, and the processor 1810 is configured to determine, based on the first indication, that the second MTN path is faulty.

In an example, the communication apparatus 1800 may perform the method 1300 in the foregoing embodiments. When the communication apparatus 1800 is configured to perform the method 1300 in the foregoing embodiments, the communication apparatus 1800 may be equivalent to the second communication apparatus in the method 1300. The transceiver 1830 is configured to perform a receiving and sending operation performed by the second communication apparatus in the method 1300. The processor 1810 is configured to perform an operation other than the receiving and sending operation performed by the second communication apparatus in the method 1300. For example, the transceiver 1830 is configured to send a first indication, and the processor 1810 is configured to determine that the second MTN path is faulty.

In an example, the communication apparatus 1800 may perform the method 1300 in the foregoing embodiments. When the communication apparatus 1800 is configured to perform the method 1300 in the foregoing embodiments, the communication apparatus 1800 may be equivalent to the third communication apparatus in the method 1300. The transceiver 1830 is configured to perform a receiving and sending operation performed by the third communication apparatus in the method 1300. The processor 1810 is configured to perform an operation other than the sending and receiving operation performed by the third communication apparatus in the method 1300. For example, the transceiver 1830 is configured to receive a first indication or a second indication, and the processor 1810 is configured to determine that the second MTN path is faulty, and switch the second MTN path to the first MTN path.

In an example, the communication apparatus 1800 may perform the method 1400 in the foregoing embodiments. When the communication apparatus 1800 is configured to perform the method 1400 in the foregoing embodiments, the communication apparatus 1800 may be equivalent to the first communication apparatus in the method 1400. The transceiver 1830 is configured to perform a receiving and sending operation performed by the first communication apparatus in the method 1400. The processor 1810 is configured to perform an operation other than the receiving and sending operation performed by the first communication apparatus in the method 1400. For example, the transceiver 1830 is configured to send a data stream to the second communication apparatus by using the third MTN path, and the processor 1810 is configured to determine that the second path is faulty, and configure the third MTN path to be in an active state.

In an example, the communication apparatus 1800 may perform the method 1400 in the foregoing embodiments. When the communication apparatus 1800 is configured to perform the method 1400 in the foregoing embodiments, the communication apparatus 1800 may be equivalent to the second communication apparatus in the method 1400. The transceiver 1830 is configured to perform a receiving and sending operation performed by the second communication apparatus in the method 1400. The processor 1810 is configured to perform an operation other than the receiving and sending operation performed by the second communication apparatus in the method 1400. For example, the transceiver 1830 is configured to receive, by using the third MTN path, a data stream sent by the first communication apparatus, and send the data stream to the fourth communication apparatus by using the second path, and the processor 1810 is configured to determine that the second MTN path is faulty, and configure the third MTN path to be in an active state.

In an example, the communication apparatus 1800 may perform the method 1400 in the foregoing embodiments. When the communication apparatus 1800 is configured to perform the method 1400 in the foregoing embodiments, the communication apparatus 1800 may be equivalent to the fourth communication apparatus in the method 1400. The transceiver 1830 is configured to perform a receiving and sending operation performed by the fourth communication apparatus in the method 1400. The processor 1810 is configured to perform an operation other than the sending and receiving operation performed by the fourth communication apparatus in the method 1400. For example, the transceiver 1830 is configured to send a data stream to the first communication apparatus by using the first path, and the processor 1810 is configured to determine that the second path is faulty, and configure the first path to be in an active state.

In an example, the communication apparatus 1800 may perform the method 1500 in the foregoing embodiments. When the communication apparatus 1800 is configured to perform the method 1500 in the foregoing embodiments, the communication apparatus 1800 may be equivalent to the first communication apparatus in the method 1500. The transceiver 1830 is configured to perform a receiving and sending operation performed by the first communication apparatus in the method 1500. The processor 1810 is configured to perform an operation other than the receiving and sending operation performed by the first communication apparatus in the method 1500. For example, the transceiver 1830 is configured to receive a first indication sent by the second communication apparatus, where the first indication indicates that the second MTN path is faulty, and the processor 1810 is configured to configure the first MTN path to be in an active state.

In an example, the communication apparatus 1800 may perform the method 1500 in the foregoing embodiments. When the communication apparatus 1800 is configured to perform the method 1500 in the foregoing embodiments, the communication apparatus 1800 may be equivalent to the second communication apparatus in the method 1500. The transceiver 1830 is configured to perform a receiving and sending operation performed by the second communication apparatus in the method 1500. The processor 1810 is configured to perform an operation other than the receiving and sending operation performed by the second communication apparatus in the method 1500. For example, the transceiver 1830 is configured to send a first indication, where the first indication indicates that the second MTN path is faulty, and the processor 1810 is configured to configure the third MTN path to be in an active state.

In an example, the communication apparatus 1800 may perform the method 1500 in the foregoing embodiments. When the communication apparatus 1800 is configured to perform the method 1500 in the foregoing embodiments, the communication apparatus 1800 may be equivalent to the third communication apparatus in the method 1500. The transceiver 1830 is configured to perform a receiving and sending operation performed by the third communication apparatus in the method 1500. The processor 1810 is configured to perform an operation other than the sending and receiving operation performed by the third communication apparatus in the method 1500. For example, the transceiver 1830 is configured to receive a first indication sent by the second communication apparatus, where the first indication indicates that the second MTN path is faulty, and the processor 1810 is configured to configure the first MTN path to be in an active state.

An embodiment of this application further provides a computer-readable storage medium. The computer-readable storage medium stores instructions, and when the instructions are run on a computer, the computer is enabled to perform the steps performed by the first communication apparatus in the foregoing embodiments.

An embodiment of this application further provides a computer-readable storage medium. The computer-readable storage medium stores instructions, and when the instructions are run on a computer, the computer is enabled to perform the steps performed by the second communication apparatus in the foregoing embodiments.

An embodiment of this application further provides a computer-readable storage medium. The computer-readable storage medium stores instructions, and when the instructions are run on a computer, the computer is enabled to perform the steps performed by the third communication apparatus in the foregoing embodiments.

An embodiment of this application further provides a computer-readable storage medium. The computer-readable storage medium stores instructions, and when the instructions are run on a computer, the computer is enabled to perform the steps performed by the fourth communication apparatus in the foregoing embodiments.

An embodiment of this application further provides a communication system, including any first communication apparatus, any second communication apparatus, any third communication apparatus, and any fourth communication apparatus mentioned in the foregoing embodiments. The communication system is configured to perform one or more operations in any method mentioned in the foregoing embodiments.

An embodiment of this application further provides a communication system, including at least one memory and at least one processor. The at least one memory stores instructions. The at least one processor executes the instructions, so that the communication system performs any one or more operations in the method (for example, the method 400, the method 600, and the method 700) in any one of the foregoing embodiments of this application.

In the specification, claims, and accompanying drawings of this application, the terms "first", "second", "third", "fourth", and so on (if existent) are intended to distinguish between similar objects but do not necessarily describe a specific order or sequence. It should be understood that data termed in such a way are interchangeable in proper circumstances so that embodiments described herein can be implemented in other orders than the order illustrated or described herein. In addition, the terms "include" and "have" and any other variants are intended to cover non-exclusive inclusion. For example, a process, method, system, product, or device that includes a series of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division of units is merely logical service division and there may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The storage medium includes any medium that can store program code, such as a USB flash drive, a removable hard disk, a read-only memory (ROM), a random access memory (RAM), a magnetic disk, or an optical disc.

A person skilled in the art should be aware that in the foregoing one or more examples, services described in the present invention may be implemented by hardware, software, firmware, or any combination thereof. When the services are implemented by using software, the services may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and beneficial effects of the present invention are further described in detail in the foregoing specific implementations. It should be understood that the foregoing descriptions are merely specific implementations of the present invention.

The foregoing embodiments are merely intended for describing the technical solutions of this application instead of limiting this application. Although this application is described in detail with reference to the foregoing embodiments, a person of ordinary skill in the art should understand that modifications can still be made to the technical solutions described in the foregoing embodiments or equivalent replacements can be made to some technical features thereof, and such modifications or replacements do not make the essence of corresponding technical solutions depart from the scope of the technical solutions of embodiments of this application.

What is claimed is:

1. A method in a network, the network comprising a first communication apparatus, a second communication apparatus, and a third communication apparatus, the third communication apparatus being connected to the first communication apparatus using a first metro transport network (MTN) path and the third communication apparatus being connected to the second communication apparatus using a second MTN path, and the method comprising:
   transmitting, using flexible Ethernet (FlexE), a data stream corresponding to a first client using the second MTN path, wherein the data stream corresponding to the first client is transmitted using the first MTN path when the second MTN path becomes faulty.

2. The method according to claim 1, further comprising:
   after the second MTN path is unavailable, transmitting, using FlexE, the data stream corresponding to the first client using the first MTN path.

3. The method according to claim 2, wherein before transmitting the data stream corresponding to the first client using the first MTN path, the method further comprises:
   determining, based on a first indication sent by the second communication apparatus, that the second MTN path is faulty, wherein the first indication indicates that the second MTN path is faulty.

4. The method according to claim 3, further comprising:
   sending, by the first communication apparatus, a second indication to the third communication apparatus, the second indication indicating to the third communication apparatus to switch a transmission path of the data stream corresponding to the first client from the second MTN path to the first MTN path.

5. The method according to claim 3, wherein before determining that the second MTN path is faulty, the method comprises:
   receiving, by the third communication apparatus, the first indication from the second communication apparatus.

6. The method according to claim 2, wherein before transmitting the data stream corresponding to the first client using the first MTN path, the method further comprises:
   receiving, by the third communication apparatus, indication information sent by the first communication apparatus, wherein the indication information instructs the third communication apparatus to switch the second MTN path to the first MTN path.

7. The method according to claim 2, wherein before transmitting the data stream corresponding to the first client using the first MTN path, the method further comprises:
   determining, based on a third indication sent by the third communication apparatus, that the second MTN path is faulty, wherein the third indication indicates that the second MTN path is faulty.

8. The method according to claim 7, wherein the third indication is sent by the third communication apparatus to the first communication apparatus.

9. The method according to claim 2, wherein before transmitting the data stream corresponding to the first client using the first MTN path, the method further comprises:
   sending, by the second communication apparatus, a first indication to the first communication apparatus or the third communication apparatus, wherein the first indication indicates that the second MTN path is faulty.

10. The method according to claim 1, further comprising:
    transmitting, using FlexE, a data stream corresponding to a second client by using the first MTN path.

11. A method in a network, the network comprising a first communication apparatus, a second communication apparatus, and a third communication apparatus, the third communication apparatus being connected to the first communication apparatus by using a first path and the third communication apparatus being connected to the second communication apparatus using a second path, the first communication apparatus and the second communication apparatus being connected using a first metro transport network (MTN) path, and the method comprising:
    when the second path is available, transmitting a data stream corresponding to a first client using the second path; and
    when the second path is unavailable, transmitting the data stream corresponding to the first client using the first path and the first MTN path.

12. The method according to claim 11, wherein when the second path is available, transmitting the data stream corresponding to the first client using the second path comprises:
    transmitting the data stream corresponding to the first client using the first MTN path and the second path.

13. The method according to claim 11, further comprising:
    when the second path is unavailable, determining, by the first communication apparatus based on indication information sent by the second communication apparatus, that the second path is faulty, wherein the indication information indicates that the second path is faulty.

14. A third communication apparatus, comprising:
    at least one processor; and
    a memory storing instructions; and
    wherein the at least one processor is configured to execute the instructions, and execution of the instructions causes the third communication apparatus to:
        transmit, using flexible Ethernet (FlexE), a data stream corresponding to a first client using a second metro transport network (MTN) path, wherein the third communication apparatus is multi-homing connected to a first communication apparatus and a second communication apparatus using a first MTN path between the third communication apparatus and the first communication apparatus and the second MTN path between the third communication apparatus and the second communication apparatus, and wherein the data stream corresponding to the first client is transmitted using the first MTN path when the second MTN path becomes faulty.

15. The third communication apparatus according to claim 14, wherein execution of the instructions causes the third communication apparatus to:
    after the second MTN path is unavailable, transmit, using FlexE, the data stream corresponding to the first client using the first MTN path.

16. The third communication apparatus according to claim 14, wherein execution of the instructions causes the third communication apparatus to:
   before transmitting the data stream corresponding to the first client using the first MTN path, determine, based on a first indication sent by the second communication apparatus, that the second MTN path is faulty, wherein the first indication indicates that the second MTN path is faulty.

17. The third communication apparatus according to claim 16, wherein execution of the instructions causes the third communication apparatus to:
   receive a second indication from the first communication apparatus; and
   switch, according to the second indication, a transmission path of the data stream corresponding to the first client from the second MTN path to the first MTN path.

18. The third communication apparatus according to claim 15, wherein execution of the instructions causes the third communication apparatus to:
   send a third indication to the first communication apparatus, wherein the third indication indicates that the second MTN path is faulty.

19. The third communication apparatus according to claim 15, wherein execution of the instructions causes the third communication apparatus to:
   send a third indication to the second communication apparatus, wherein the third indication indicates that the second MTN path is faulty.

20. The third communication apparatus according to claim 14, wherein execution of the instructions causes the third communication apparatus to:
   transmit, via FlexE, a data stream corresponding to a second client by using the first MTN path.

* * * * *